(12) United States Patent
Goldstein

(10) Patent No.: US 12,363,223 B2
(45) Date of Patent: Jul. 15, 2025

(54) REAL-TIME VOICE PAGING VOICE AUGMENTED CALLER ID/RING TONE ALIAS

(71) Applicant: ST R&DTech, LLC, Delray Beach, FL (US)

(72) Inventor: Steven Wayne Goldstein, Delray Beach, FL (US)

(73) Assignee: ST R&DTech LLC, Delray Beach, FL (US)

( * ) Notice: Subject to any disclaimer, the term of this patent is extended or adjusted under 35 U.S.C. 154(b) by 0 days.

(21) Appl. No.: 18/397,478

(22) Filed: Dec. 27, 2023

(65) Prior Publication Data

US 2024/0333836 A1 Oct. 3, 2024

Related U.S. Application Data

(63) Continuation of application No. 17/537,884, filed on Nov. 30, 2021, now Pat. No. 11,917,100, which is a
(Continued)

(51) Int. Cl.
| | |
|---|---|
| *H04M 3/42* | (2006.01) |
| *H04M 1/57* | (2006.01) |
| *H04M 1/72433* | (2021.01) |
| *H04M 1/72439* | (2021.01) |
| *H04M 15/06* | (2006.01) |
| *H04N 7/14* | (2006.01) |

(Continued)

(52) U.S. Cl.
CPC ....... *H04M 3/42051* (2013.01); *H04M 1/576* (2013.01); *H04M 1/72433* (2021.01); *H04M 1/72439* (2021.01); *H04M 3/42059* (2013.01); *H04N 7/141* (2013.01); *H04W 4/12* (2013.01); *H04M 1/57* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 3,876,843 A | 4/1975 | Moen | |
| 4,054,749 A | 10/1977 | Suzuki et al. | |

(Continued)

FOREIGN PATENT DOCUMENTS

| | | |
|---|---|---|
| EP | 0495653 A1 | 7/1992 |
| EP | 1385324 A1 | 1/2004 |

(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

(Continued)

*Primary Examiner* — Quoc D Tran
(74) *Attorney, Agent, or Firm* — Akerman LLP; Peter A. Chiabotti

(57) ABSTRACT

A communication device and method can include one or more processors operatively coupled to memory and an audible output device, where the one or more processors initiates a call from a calling party that includes an audio clip associated with the call.

9 Claims, 8 Drawing Sheets

Telephone Call with Ring Tone Voice Alias

Related U.S. Application Data continuation of application No. 17/002,981, filed on Aug. 26, 2020, now Pat. No. 11,272,052, which is a continuation of application No. 16/593,742, filed on Oct. 4, 2019, now Pat. No. 10,812,652, which is a continuation of application No. 14/923,632, filed on Oct. 27, 2015, now Pat. No. 10,440,176, which is a continuation of application No. 14/511,154, filed on Oct. 9, 2014, now Pat. No. 9,172,794, which is a continuation of application No. 14/493,270, filed on Sep. 22, 2014, now Pat. No. 9,167,082, said application No. 14/923,632 is a continuation of application No. 14/886,133, filed on Oct. 19, 2015, now Pat. No. 9,578,164, which is a continuation of application No. 14/493,270, filed on Sep. 22, 2014, now Pat. No. 9,167,082.

(60) Provisional application No. 61/880,963, filed on Sep. 22, 2013, provisional application No. 61/889,002, filed on Oct. 9, 2013.

(51) Int. Cl.
*H04W 4/12* (2009.01)
*H04W 88/02* (2009.01)

(56) References Cited

U.S. PATENT DOCUMENTS

| | | |
|---|---|---|
| 4,088,849 A | 5/1978 | Usami et al. |
| 4,455,677 A | 6/1984 | Fox |
| 4,827,458 A | 5/1989 | D'Alayer de Costemore D'Arc |
| 4,891,841 A | 1/1990 | Bohn |
| 4,947,432 A | 8/1990 | Topholm |
| 4,947,440 A | 8/1990 | Bateman et al. |
| 5,027,410 A | 6/1991 | Williamson et al. |
| 5,182,774 A | 1/1993 | Bourk |
| 5,202,927 A | 4/1993 | Topholm |
| 5,208,867 A | 5/1993 | Stites, III |
| 5,267,321 A | 11/1993 | Langberg |
| 5,276,740 A | 1/1994 | Inanaga et al. |
| 5,317,273 A | 5/1994 | Hanson |
| 5,327,506 A | 7/1994 | Stites |
| 5,524,056 A | 6/1996 | Killion et al. |
| 5,550,923 A | 8/1996 | Hotvet |
| 5,577,511 A | 11/1996 | Killion |
| 5,606,621 A | 2/1997 | Reiter et al. |
| 5,636,351 A | 6/1997 | Lee |
| 5,647,011 A | 7/1997 | Garvis |
| 5,732,216 A | 3/1998 | Logan et al. |
| 5,740,262 A | 4/1998 | Yoshida et al. |
| 5,748,754 A | 5/1998 | Maag et al. |
| 5,826,064 A | 10/1998 | Loring et al. |
| 5,862,065 A | 1/1999 | Muthusamy |
| 5,903,868 A | 5/1999 | Yuen et al. |
| 5,923,624 A | 7/1999 | Groeger |
| 5,930,751 A | 7/1999 | Cohrs et al. |
| 5,933,510 A | 8/1999 | Bryant |
| 5,946,050 A | 8/1999 | Wolff |
| 6,005,525 A | 12/1999 | Kivela |
| 6,011,851 A | 1/2000 | Connor et al. |
| 6,021,207 A | 2/2000 | Puthuff et al. |
| 6,021,325 A | 2/2000 | Hall |
| 6,028,514 A | 2/2000 | Lemelson et al. |
| 6,048,320 A | 4/2000 | Brainard, II |
| 6,056,698 A | 5/2000 | Iseberg |
| 6,067,361 A | 5/2000 | Kohut et al. |
| 6,118,877 A | 9/2000 | Lindemann |
| 6,163,338 A | 12/2000 | Johnson et al. |
| 6,163,508 A | 12/2000 | Kim et al. |
| 6,226,389 B1 | 5/2001 | Lemelson et al. |
| 6,298,323 B1 | 10/2001 | Kaemmerer |
| 6,359,993 B2 | 3/2002 | Brimhall |
| 6,400,652 B1 | 6/2002 | Goldberg et al. |
| 6,408,272 B1 | 6/2002 | White et al. |
| 6,415,034 B1 | 7/2002 | Hietanen |
| 6,567,524 B1 | 5/2003 | Svean et al. |
| 6,606,598 B1 | 8/2003 | Holthouse |
| 6,639,987 B2 | 10/2003 | McIntosh |
| RE38,351 E | 12/2003 | Iseberg et al. |
| 6,661,901 B1 | 12/2003 | Svean et al. |
| 6,671,379 B2 | 12/2003 | Nemirovski |
| 6,687,377 B2 | 2/2004 | Voix et al. |
| 6,728,385 B2 | 4/2004 | Kval et al. |
| 6,731,926 B1 * | 5/2004 | Link, II .......... H04M 3/537 455/412.2 |
| 6,748,238 B1 | 6/2004 | Lau |
| 6,754,359 B1 | 6/2004 | Svean et al. |
| 6,760,754 B1 | 7/2004 | Isaacs et al. |
| 6,782,106 B1 | 8/2004 | Kong et al. |
| 6,804,638 B2 | 10/2004 | Fiedler |
| 6,804,643 B1 | 10/2004 | Kiss |
| 6,826,286 B1 | 11/2004 | Arndt et al. |
| 7,035,675 B2 | 4/2006 | Yamada |
| 7,039,195 B1 | 5/2006 | Svean |
| 7,039,585 B2 | 5/2006 | Wilmot |
| 7,050,592 B1 | 5/2006 | Iseberg |
| 7,072,482 B2 | 7/2006 | Van et al. |
| 7,107,109 B1 | 9/2006 | Nathan et al. |
| 7,130,620 B2 | 10/2006 | Forman et al. |
| 7,158,643 B2 | 1/2007 | Lavoie et al. |
| 7,158,933 B2 | 1/2007 | Balan |
| 7,177,433 B2 | 2/2007 | Sibbald |
| 7,209,569 B2 | 4/2007 | Boesen |
| 7,280,849 B1 | 10/2007 | Bailey |
| 7,430,299 B2 | 9/2008 | Armstrong et al. |
| 7,433,714 B2 | 10/2008 | Howard et al. |
| 7,450,730 B2 | 11/2008 | Berg et al. |
| 7,464,029 B2 | 12/2008 | Visser |
| 7,477,756 B2 | 1/2009 | Wickstrom et al. |
| 7,562,020 B2 | 7/2009 | Le et al. |
| 7,574,917 B2 | 8/2009 | Von Dach |
| 7,610,044 B2 | 10/2009 | Sindoni |
| 7,715,577 B2 | 5/2010 | Allen et al. |
| 7,729,912 B1 | 6/2010 | Bacchiani et al. |
| 7,756,285 B2 | 7/2010 | Sjursen et al. |
| 7,774,202 B2 | 8/2010 | Spengler et al. |
| 7,778,434 B2 | 8/2010 | Juneau et al. |
| 7,801,726 B2 | 9/2010 | Ariu |
| 7,844,248 B2 | 11/2010 | Sotack |
| 7,861,008 B2 | 12/2010 | Batson et al. |
| 7,903,825 B1 | 3/2011 | Melanson |
| 7,903,826 B2 | 3/2011 | Boersma |
| 7,920,557 B2 | 4/2011 | Moote |
| 7,983,907 B2 | 7/2011 | Visser |
| 8,014,553 B2 | 9/2011 | Radivojevic et al. |
| 8,018,337 B2 | 9/2011 | Jones et al. |
| 8,045,840 B2 | 10/2011 | Murata |
| 8,081,780 B2 | 12/2011 | Goldstein et al. |
| 8,086,093 B2 | 12/2011 | Stuckman |
| 8,107,614 B2 | 1/2012 | Sobti et al. |
| 8,111,839 B2 | 2/2012 | Goldstein et al. |
| 8,140,325 B2 | 3/2012 | Kanevsky |
| 8,150,044 B2 | 4/2012 | Goldstein et al. |
| 8,160,261 B2 | 4/2012 | Schulein |
| 8,160,273 B2 | 4/2012 | Visser |
| 8,162,846 B2 | 4/2012 | Epley |
| 8,180,078 B2 | 5/2012 | Zellner |
| 8,208,642 B2 | 6/2012 | Edwards |
| 8,209,181 B2 | 6/2012 | Heckerman et al. |
| 8,218,736 B1 * | 7/2012 | McClintock ...... H04M 1/72433 455/412.2 |
| 8,218,784 B2 | 7/2012 | Schulein |
| 8,254,591 B2 | 8/2012 | Goldstein et al. |
| 8,315,400 B2 | 11/2012 | Goldstein et al. |
| 8,401,198 B2 | 3/2013 | Oh et al. |
| 8,401,200 B2 | 3/2013 | Tiscareno |
| 8,477,955 B2 | 7/2013 | Engle et al. |
| 8,488,799 B2 | 7/2013 | Goldstein et al. |
| 8,493,204 B2 | 7/2013 | Wong et al. |
| 8,522,916 B2 | 9/2013 | Keady |
| 8,577,062 B2 | 11/2013 | Goldstein |
| 8,594,341 B2 | 11/2013 | Rothschild |

(56) References Cited

U.S. PATENT DOCUMENTS

| | | |
|---|---|---|
| 8,611,560 B2 | 12/2013 | Goldstein |
| 8,625,818 B2 | 1/2014 | Stultz |
| 8,644,886 B1 | 2/2014 | Delaney et al. |
| 8,718,305 B2 | 5/2014 | Usher |
| 8,750,295 B2 | 6/2014 | Liron |
| 8,774,433 B2 | 7/2014 | Goldstein |
| 8,798,278 B2 | 8/2014 | Isabelle |
| 8,855,343 B2 | 10/2014 | Usher |
| 8,917,894 B2 | 12/2014 | Goldstein |
| 8,976,951 B1 | 3/2015 | Trandal et al. |
| 8,983,081 B2 | 3/2015 | Bayley |
| 9,020,116 B2 | 4/2015 | Rondeau et al. |
| 9,037,458 B2 | 5/2015 | Park et al. |
| 9,053,697 B2 | 6/2015 | Park |
| 9,094,510 B2 | 7/2015 | Rondeau et al. |
| 9,123,343 B2 | 9/2015 | Kurki-Suonio |
| 9,124,982 B2 | 9/2015 | Goldstein et al. |
| 9,135,797 B2 | 9/2015 | Couper et al. |
| 9,191,740 B2 | 11/2015 | McIntosh |
| 9,196,247 B2 | 11/2015 | Harada |
| 9,270,244 B2 | 2/2016 | Usher et al. |
| 9,491,542 B2 | 11/2016 | Usher |
| 9,609,424 B2 | 3/2017 | Goldstein |
| 9,628,896 B2 | 4/2017 | Ichimura |
| 10,365,883 B2 | 7/2019 | Goldstein et al. |
| 10,848,827 B2 | 11/2020 | Sengupta et al. |
| 10,966,015 B2 | 3/2021 | Usher |
| 10,979,836 B2 | 4/2021 | Usher et al. |
| 11,039,259 B2 | 6/2021 | Goldstein et al. |
| 11,057,701 B2 | 7/2021 | Goldstein et al. |
| 11,217,237 B2 | 1/2022 | Usher et al. |
| 11,244,666 B2 | 2/2022 | Goldstein et al. |
| 11,277,682 B2 | 3/2022 | Usher |
| 11,393,486 B1 | 7/2022 | Woodruff et al. |
| 11,610,587 B2 | 3/2023 | Goldstein et al. |
| 11,659,315 B2 | 5/2023 | Perez et al. |
| 11,665,493 B2 | 5/2023 | Usher et al. |
| 11,710,473 B2 | 7/2023 | Goldstein et al. |
| 11,750,965 B2 | 9/2023 | Usher et al. |
| 11,917,100 B2 * | 2/2024 | Goldstein ......... H04M 1/72433 |
| 2001/0012349 A1 | 8/2001 | Karnowski |
| 2001/0046304 A1 | 11/2001 | Rast |
| 2002/0018798 A1 | 2/2002 | Sewing et al. |
| 2002/0026311 A1 | 2/2002 | Okitsu |
| 2002/0076057 A1 | 6/2002 | Voix |
| 2002/0098878 A1 | 7/2002 | Mooney |
| 2002/0106091 A1 | 8/2002 | Furst et al. |
| 2002/0110224 A1 | 8/2002 | Kovales et al. |
| 2002/0111798 A1 | 8/2002 | Huang |
| 2002/0116541 A1 | 8/2002 | Parker et al. |
| 2002/0118798 A1 | 8/2002 | Langhart et al. |
| 2002/0165719 A1 | 11/2002 | Wang |
| 2003/0032415 A1 | 2/2003 | Cho et al. |
| 2003/0032447 A1 | 2/2003 | Bulthuis |
| 2003/0033152 A1 | 2/2003 | Cameron |
| 2003/0130016 A1 | 7/2003 | Matsuura |
| 2003/0138118 A1 | 7/2003 | Stahl |
| 2003/0152359 A1 | 8/2003 | Kim |
| 2003/0161097 A1 | 8/2003 | Le et al. |
| 2003/0165246 A1 | 9/2003 | Kvaloy et al. |
| 2003/0165319 A1 | 9/2003 | Barber |
| 2003/0198359 A1 | 10/2003 | Killion et al. |
| 2003/0224720 A1 | 12/2003 | Jung |
| 2004/0042103 A1 | 3/2004 | Mayer |
| 2004/0086138 A1 | 5/2004 | Kuth |
| 2004/0109668 A1 | 6/2004 | Stuckman |
| 2004/0109579 A1 | 7/2004 | Izuchi |
| 2004/0125965 A1 | 7/2004 | Alberth et al. |
| 2004/0179694 A1 | 9/2004 | Alley |
| 2004/0190737 A1 | 9/2004 | Kuhnel et al. |
| 2004/0196992 A1 | 10/2004 | Ryan |
| 2004/0202339 A1 | 10/2004 | O'Brien |
| 2004/0202340 A1 | 10/2004 | Armstrong et al. |
| 2004/0203351 A1 | 10/2004 | Shearer et al. |
| 2004/0264938 A1 | 12/2004 | Felder |
| 2005/0028212 A1 | 2/2005 | Laronne |
| 2005/0049854 A1 | 3/2005 | Reding et al. |
| 2005/0058313 A1 | 3/2005 | Victorian |
| 2005/0068171 A1 | 3/2005 | Kelliher |
| 2005/0071158 A1 | 3/2005 | Byford |
| 2005/0077102 A1 | 4/2005 | Banter et al. |
| 2005/0078838 A1 | 4/2005 | Simon |
| 2005/0096899 A1 | 5/2005 | Padhi et al. |
| 2005/0102142 A1 | 5/2005 | Soufflet et al. |
| 2005/0117726 A1 | 6/2005 | DeMent et al. |
| 2005/0123146 A1 | 6/2005 | Voix et al. |
| 2005/0157891 A1 | 7/2005 | Johansen |
| 2005/0182620 A1 | 8/2005 | Kabi et al. |
| 2005/0207605 A1 | 9/2005 | Dehe |
| 2005/0281423 A1 | 12/2005 | Armstrong |
| 2005/0283369 A1 | 12/2005 | Clauser et al. |
| 2005/0288057 A1 | 12/2005 | Lai et al. |
| 2006/0018496 A1 | 1/2006 | Niederdrank et al. |
| 2006/0064037 A1 | 3/2006 | Shalon et al. |
| 2006/0067551 A1 | 3/2006 | Cartwright et al. |
| 2006/0083390 A1 | 4/2006 | Kaderavek |
| 2006/0083395 A1 | 4/2006 | Allen et al. |
| 2006/0092043 A1 | 5/2006 | Lagassey |
| 2006/0094474 A1 | 5/2006 | Zatloukal et al. |
| 2006/0111085 A1 | 5/2006 | Lee |
| 2006/0116175 A1 | 6/2006 | Chu |
| 2006/0120545 A1 | 6/2006 | Rasmussen |
| 2006/0140358 A1 * | 6/2006 | Grubb ............... H04M 3/42221 379/88.17 |
| 2006/0140425 A1 | 6/2006 | Berg |
| 2006/0153394 A1 | 7/2006 | Beasley |
| 2006/0167687 A1 | 7/2006 | Kates |
| 2006/0173563 A1 | 8/2006 | Borovitski |
| 2006/0182287 A1 | 8/2006 | Schulein |
| 2006/0182295 A1 | 8/2006 | Dijkstra et al. |
| 2006/0188075 A1 | 8/2006 | Peterson |
| 2006/0188105 A1 | 8/2006 | Baskerville et al. |
| 2006/0195322 A1 | 8/2006 | Broussard et al. |
| 2006/0204014 A1 | 9/2006 | Iseberg et al. |
| 2006/0223547 A1 | 10/2006 | Chin et al. |
| 2006/0241948 A1 | 10/2006 | Abrash et al. |
| 2006/0262944 A1 | 11/2006 | Rasmussen et al. |
| 2006/0264176 A1 | 11/2006 | Hong |
| 2006/0287014 A1 | 12/2006 | Matsuura |
| 2007/0003090 A1 | 1/2007 | Anderson |
| 2007/0014423 A1 | 1/2007 | Darbut et al. |
| 2007/0021148 A1 | 1/2007 | Mahini |
| 2007/0021958 A1 | 1/2007 | Visser et al. |
| 2007/0027676 A1 | 2/2007 | Chambers et al. |
| 2007/0036377 A1 | 2/2007 | Stirnemann |
| 2007/0041589 A1 | 2/2007 | Patel et al. |
| 2007/0043563 A1 | 2/2007 | Comerford et al. |
| 2007/0086600 A1 | 4/2007 | Boesen |
| 2007/0127660 A1 | 6/2007 | Roberts et al. |
| 2007/0133760 A1 | 6/2007 | Cotignola et al. |
| 2007/0143820 A1 | 6/2007 | Pawlowski |
| 2007/0172087 A1 | 7/2007 | Olsen |
| 2007/0177743 A1 | 8/2007 | Mertens |
| 2007/0189544 A1 | 8/2007 | Rosenberg |
| 2007/0201705 A1 | 8/2007 | Dorogusker et al. |
| 2007/0218878 A1 | 9/2007 | Khawand et al. |
| 2007/0223717 A1 | 9/2007 | Boersma |
| 2007/0255435 A1 | 11/2007 | Cohen |
| 2007/0281744 A1 | 12/2007 | Andreasson |
| 2007/0291953 A1 | 12/2007 | Ngia et al. |
| 2008/0037801 A1 | 2/2008 | Alves et al. |
| 2008/0063168 A1 | 3/2008 | Haley et al. |
| 2008/0079571 A1 | 4/2008 | Samadani |
| 2008/0089530 A1 | 4/2008 | Bostick et al. |
| 2008/0091421 A1 | 4/2008 | Gustavsson |
| 2008/0101638 A1 | 5/2008 | Ziller |
| 2008/0107297 A1 | 5/2008 | Fischer et al. |
| 2008/0129520 A1 | 6/2008 | Lee |
| 2008/0137873 A1 | 6/2008 | Goldstein |
| 2008/0145032 A1 | 6/2008 | Lindroos |
| 2008/0162133 A1 | 7/2008 | Couper et al. |
| 2008/0165988 A1 | 7/2008 | Terlizzi et al. |
| 2008/0175411 A1 | 7/2008 | Greve |
| 2008/0181419 A1 | 7/2008 | Goldstein et al. |

(56) References Cited

U.S. PATENT DOCUMENTS

| | | |
|---|---|---|
| 2008/0240458 A1 | 10/2008 | Goldstein et al. |
| 2009/0010456 A1 | 1/2009 | Goldstein et al. |
| 2009/0024234 A1 | 1/2009 | Archibald |
| 2009/0076821 A1 | 3/2009 | Brenner |
| 2009/0122996 A1 | 5/2009 | Klein |
| 2009/0131119 A1 | 5/2009 | Chang et al. |
| 2009/0286515 A1 | 5/2009 | Othmer |
| 2010/0061564 A1 | 3/2010 | Clemow et al. |
| 2010/0119077 A1 | 5/2010 | Platz et al. |
| 2010/0296668 A1 | 11/2010 | Lee et al. |
| 2010/0328224 A1 | 12/2010 | Kerr et al. |
| 2011/0026724 A1 | 2/2011 | Doclo |
| 2011/0055256 A1 | 3/2011 | Phillips |
| 2011/0096939 A1 | 4/2011 | Ichimura |
| 2011/0116643 A1 | 5/2011 | Tiscareno |
| 2011/0187640 A1 | 8/2011 | Jacobsen et al. |
| 2011/0264447 A1 | 10/2011 | Visser et al. |
| 2011/0293103 A1 | 12/2011 | Park et al. |
| 2011/0299695 A1 | 12/2011 | Nicholson |
| 2013/0219345 A1 | 8/2013 | Saukko et al. |
| 2014/0023203 A1 | 1/2014 | Rotschild |
| 2014/0122092 A1 | 5/2014 | Goldstein |
| 2014/0126748 A1 | 5/2014 | Usher et al. |
| 2014/0163976 A1 | 6/2014 | Park |
| 2014/0166122 A1 | 6/2014 | Goldstein et al. |
| 2014/0270200 A1 | 9/2014 | Usher et al. |
| 2015/0170645 A1 | 6/2015 | Di et al. |
| 2015/0195641 A1 | 7/2015 | Di et al. |
| 2015/0215701 A1 | 7/2015 | Usher |
| 2016/0019024 A1 | 1/2016 | Suzuki et al. |
| 2016/0058378 A1 | 3/2016 | Wisby et al. |
| 2016/0104452 A1 | 4/2016 | Guan et al. |
| 2016/0249128 A1 | 8/2016 | Goldstein |
| 2018/0115818 A1 | 4/2018 | Asada et al. |
| 2018/0160211 A1 | 6/2018 | Kirsch et al. |
| 2020/0379717 A1 | 12/2020 | Mazur et al. |
| 2020/0380945 A1 | 12/2020 | Woodruff et al. |

FOREIGN PATENT DOCUMENTS

| | | |
|---|---|---|
| EP | 1401240 | 3/2004 |
| EP | 1385324 | 4/2004 |
| EP | 1519625 A2 | 3/2005 |
| EP | 1640972 | 3/2006 |
| EP | 1640972 A1 | 3/2006 |
| EP | 2001211 | 12/2008 |
| JP | H0877468 | 3/1996 |
| JP | H10162283 | 6/1998 |
| JP | 2002-204500 A | 7/2002 |
| JP | 3353701 | 12/2002 |
| WO | WO9326085 | 12/1993 |
| WO | 01/89083 A1 | 11/2001 |
| WO | 2004114722 | 12/2004 |
| WO | 2006/036262 A2 | 4/2006 |
| WO | 2006/037156 A1 | 4/2006 |
| WO | 2006054698 | 5/2006 |
| WO | 2006/097099 A1 | 9/2006 |
| WO | 2007/073818 A1 | 7/2007 |
| WO | 2007092660 | 8/2007 |
| WO | 2008050583 | 5/2008 |
| WO | 2008/067454 A2 | 6/2008 |
| WO | 2009/023633 A1 | 2/2009 |
| WO | 2009023784 | 2/2009 |
| WO | 2012097150 | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.
Mauro Dentino, John M. McCool, and Bernard Widrow, Adaptive Filtering in the Frequency Domain, Proceedings of the IEEE, vol. 66, No. 12, Dec. 1978.
Samsung Electronics Co., Ltd., and Samsung Electronics, America, Inc., v. Staton Techiya, LLC, IPR2022-00282, Dec. 21, 2021.
Samsung Electronics Co., Ltd., and Samsung Electronics, America, Inc., v. Staton Techiya, LLC, IPR2022-00242, Dec. 23, 2021.
Samsung Electronics Co., Ltd., and Samsung Electronics, America, Inc., v. Staton Techiya, LLC, IPR2022-00243, Dec. 23, 2021.
Samsung Electronics Co., Ltd., and Samsung Electronics, America, Inc., v. Staton Techiya, LLC, IPR2022-00234, Dec. 21, 2021.
Samsung Electronics Co., Ltd., and Samsung Electronics, America, Inc., v. Staton Techiya, LLC, IPR2022-00253, Jan. 18, 2022.
Samsung Electronics Co., Ltd., and Samsung Electronics, America, Inc., v. Staton Techiya, LLC, IPR2022-00324, Jan. 13, 2022.
Samsung Electronics Co., Ltd., and Samsung Electronics, America, Inc., v. Staton Techiya, LLC, IPR2022-00281, Jan. 18, 2022.
Samsung Electronics Co., Ltd., and Samsung Electronics, America, Inc., v. Staton Techiya, LLC, IPR2022-00302, Jan. 13, 2022.
Samsung Electronics Co., Ltd., and Samsung Electronics, America, Inc., v. Staton Techiya, LLC, IPR2022-00369, Feb. 18, 2022.
Samsung Electronics Co., Ltd., and Samsung Electronics, America, Inc., v. Staton Techiya, LLC, IPR2022-00388, Feb. 18, 2022.
Samsung Electronics Co., Ltd., and Samsung Electronics, America, Inc., v. Staton Techiya, LLC, IPR2022-00410, Feb. 18, 2022.
Samsung Electronics Co., Ltd., and Samsung Electronics, America, Inc., v. Staton Techiya, LLC, IPR2022-01078, Jun. 9, 2022.
Samsung Electronics Co., Ltd., and Samsung Electronics, America, Inc., v. Staton Techiya, LLC, IPR2022-01099, Jun. 9, 2022.
Samsung Electronics Co., Ltd., and Samsung Electronics, America, Inc., v. Staton Techiya, LLC, IPR2022-01106, Jun. 9, 2022.
Samsung Electronics Co., Ltd., and Samsung Electronics, America, Inc., v. Staton Techiya, LLC, IPR2022-01098, Jun. 9, 2022.
90/015,146, Samsung Electronics Co., Ltd. and Samsung Electronics, America, Inc., Request for Ex Parte Reexamination of U.S. Pat. No. 10,979,836.
90/019,169, Samsung Electronics Co., Ltd. and Samsung Electronics, America, Inc., Request for Ex Parte Reexamination of U.S. Pat. No. 11,244,666.
'400 Patent Family Tree, Exhibit—1009, Filed on Dec. 10, 2021—Cited in IPR2022-00282, challenging U.S. Pat. No. 8,315,400.
Nov. 3, 2022 [16] Notice of Deposition of David Kleinschmidt, Exhibit—16, Filed on Nov. 3, 2022—Cited in IPR2022-00282, challenging U.S. Pat. No. 8,315,400.
Aarts, Exhibit—1015, Filed on Jan. 14, 2022—Cited in IPR2022-00410, challenging U.S. Pat. No. 10,979,836.
Adaptive Filtering (Dentino), Exhibit—1012, Filed on Dec. 10, 2021—Cited in IPR2022-00282, challenging U.S. Pat. No. 8,315,400.
Adaptive Filtering Algorithims (Diniz), Exhibit—1013, Filed on Dec. 10, 202—Cited in IPR2022-00282, challenging U.S. Pat. No. 8,315,400.
Adaptive Noise Cancelling (Widrow), Exhibit—1011, Filed on Dec. 10, 2021—Cited in IPR2022-00282, challenging U.S. Pat. No. 8,315,400.
AirPods (1st generation)—Technical Specifications, Exhibit—2009, Filed on Sep. 13, 2022—Cited in IPR2022-00243, challenging U.S. Pat. No. 8,111,839.
Amended Complaint, Techiya v. Samsung, E.D. Tex., Exhibit—1014, Filed on Jan. 14, 2022—Cited in IPR2022-00410, challenging U.S. Pat. No. 10,979,836.
Amended Complaint, Techiya v. Samsung, E.D. Tex., Exhibit—1014, Filed on Dec. 21, 2021—Cited in IPR2022-00302, challenging U.S. Pat. No. 9,609,424.
Amended Complaint, Techiya v. Samsung, E.D. Tex., Exhibit—1017, Filed on Jan. 4, 2022—Cited in IPR2022-00388, challenging U.S. Pat. No. 10,966,015.
Amended Complaint, Techiya v. Samsung, E.D. Tex., Exhibit—1017, Filed on Dec. 30, 2021—Cited in IPR2022-00369, challenging U.S. Pat. No. 10,405,082.
Amended Docket Control Order, DN 156 from E.D. Tex. 21-cv-00413, Exhibit—1029, Filed on Nov. 15, 2022—Cited in IPR2022-01098, challenging U.S. Pat. No. 11,217,237.

(56) References Cited

OTHER PUBLICATIONS

Amended Docket Control Order, DN 156 from E.D. Tex., Exhibit—1023, Filed on Nov. 10, 2022—Cited in IPR2022-01099, challenging U.S. Pat. No. 11,244,666.
Amended Docket Control Order, DN 156 from E.D. Tex., Exhibit—1026, Filed on Nov. 10, 2022—Cited in IPR2022-01078, challenging U.S. Pat. No. 11,057,701.
Amended Docket Control Order, DN 156 from E.D. Tex., Exhibit—1032, Filed on Nov. 10, 2022—Cited in IPR2022-01106, challenging U.S. Pat. No. 11,039,259.
Amended Notice of Deposition of Les E. Atlas, Ph.D., Exhibit—15, Filed on Mar. 14, 2023—Cited in IPR2022-01106, challenging U.S. Pat. No. 11,039,259.
Amendment in U.S. Appl. No. 11/616,973, dated Apr. 13, 2015, Exhibit—2009, Filed on Oct. 11, 2022—Cited in IPR2022-01106, challenging U.S. Pat. No. 11,039,259.
Anderson Declaration ISO MSJ of No Infringement of '259 Patent, Exhibit—2019, Filed on Aug. 14, 2023—Cited in IPR2022-01106, challenging U.S. Pat. No. 11,039,259.
Anderson Non-Infringement Report (excerpt, redacted), Exhibit—2020, Filed on Aug. 14, 2023—Cited in IPR2022-01106, challenging U.S. Pat. No. 11,039,259.
Anderson Rebuttal Report (Redacted, Excerpt), Exhibit—2017, Filed on Apr. 10, 2023—Cited in IPR2022-01106, challenging U.S. Pat. No. 11,039,259.
Android Central, The History of True Wireless Earbuds, Exhibit—2009, Filed on Oct. 17, 2022—Cited in IPR2022-00324, challenging U.S. Pat. No. 8,254,591.
Android Central, The History of True Wireless Earbuds, Exhibit—2011, Filed on Sep. 13, 2022—Cited in IPR2022-00243, challenging U.S. Pat. No. 8,111,839.
C.V. of Richard Stern, Ph.D., Exhibit—1003, Filed on Jan. 4, 2022—Cited in IPR2022-00388, challenging U.S. Pat. No. 10,966,015.
C.V. of Richard Stern, Ph.D., Exhibit—1003, Filed on Dec. 10, 2021—Cited in IPR2022-00282, challenging U.S. Pat. No. 8,315,400.
CDC, What Noises Cause Hearing Loss?, Exhibit—2009, Filed on Sep. 13, 2022—Cited in IPR2022-00242, challenging U. S. Pat. No. 8,111,839.
Christopher J. Struck CV, Exhibit—2002, Filed on Apr. 13, 2022—Cited in IPR2022-00302, challenging U.S. Pat. No. 9,609,424.
Claim Construction Order, Exhibit—2008, Filed on Feb. 22, 2023—Cited in IPR2022-00253, challenging U.S. Pat. No. 9,491,542.
Claim Construction Order, Exhibit—2008, Filed on Apr. 18, 2023—Cited in IPR2022-00281, challenging U.S. Pat. No. 9,270,244.
Claim Construction Order, Exhibit—2013, Filed on Apr. 10, 2023—Cited in IPR2022-01106, challenging U.S. Pat. No. 11,039,259.
Complaint, DN 1 from E.D. Tex. 21-cv-00413, Exhibit—1022, Filed on Nov. 10, 2022—Cited in IPR2022-01099, challenging U.S. Pat. No. 11,244,666.
Complaint, DN 1 from E.D. Tex. 21-cv-00413, Exhibit—1025, Filed on Nov. 10, 2022—Cited in IPR2022-01078, challenging U.S. Pat. No. 11,057,701.
Complaint, DN 1 from E.D. Tex. 21-cv-00413, Exhibit—1028, Filed on Nov. 15, 2022—Cited in IPR2022-01098, challenging U.S. Pat. No. 11,217,237.
Complaint, DN 1 from E.D. Tex. 21-cv-00413, Exhibit—1031, Filed on Nov. 10, 2022—Cited in IPR2022-01106, challenging U.S. Pat. No. 11,039,259.
Complaint, E.D. Tex. 22-53, Exhibit—1020, Filed on Jun. 14, 2022—Cited in IPR2022-00369, challenging U.S. Pat. No. 10,405,082.
Complaint, E.D. Tex. 22-53, Exhibit—1020, Filed on Jun. 14, 2022—Cited in IPR2022-00388, challenging U.S. Pat. No. 10,966,015.
Complaint, E.D. Tex. 22-53, Exhibit—1021, Filed on Jun. 14, 2022—Cited in IPR2022-00410, challenging U.S. Pat. No. 10,979,836.
Complaint, E.D. Tex., 22-cv-53, Exhibit—1024, Filed on May 10, 2022—Cited in IPR2022-00302, challenging U.S. Pat. No. 9,609,424.
Complaint, E.D. Tex., 22-cv-53, Exhibit—1032, Filed on May 11, 2022—Cited in IPR2022-00324, challenging U.S. Pat. No. 8,254,591.
Complaint, *Techiya* v. *Samsung, E.D. Tex.*, Exhibit—1008, Filed on Jan. 14, 2022—Cited in IPR2022-00410, challenging U.S. Pat. No. 10,979,836.
Complaint, *Techiya* v. *Samsung, E.D. Tex.*, Exhibit—1008, Filed on Dec. 21, 2021—Cited in IPR2022-00302, challenging U.S. Pat. No. 9,609,424.
Consolidation Order, E.D. Tex. 21-413 & 22-53, Exhibit—1021, Filed on Jun. 14, 2022—Cited in IPR2022-00369, challenging U.S. Pat. No. 10,405,082.
Consolidation Order, E.D. Tex. 21-413 & 22-53, Exhibit—1021, Filed on Jun. 14, 2022—Cited in IPR2022-00388, challenging U.S. Pat. No. 10,966,015.
Consolidation Order, E.D. Tex. 21-413 & 22-53, Exhibit—1022, Filed on Jun. 14, 2022—Cited in IPR2022-00410, challenging U.S. Pat. No. 10,979,836.
Consolidation Order, E.D. Tex., Exhibit—1025, Filed on May 10, 2022—Cited in IPR2022-00302, challenging U.S. Pat. No. 9,609,424.
Consolidation Order, E.D. Tex., Exhibit—1033, Filed on May 11, 2022—Cited in IPR2022-00324, challenging U.S. Patent 45 No. 8,254,591.
Corrected Declaration of Richard Stern, Ph.D., Exhibit—1002, Filed on Jan. 4, 2022—Cited in IPR2022-00388, challenging U.S. Pat. No. 10,966,015.
Corrected Declaration of Richard Stern, Ph.D., Exhibit—1002, Filed on Dec. 10, 2021—Cited in IPR2022-00282, challenging U.S. Pat. No. 8,315,400.
Corrected Petition for Inter Partes Review of U.S. Pat. No. 8,111,839, Exhibit—11, Filed on Feb. 3, 2022—Cited in IPR2022-00243, challenging U.S. Pat. No. 8,111,839.
Corrected Petition for Inter Partes Review of U.S. Pat. No. 8,111,839, Exhibit—12, Filed on Feb. 3, 2022—Cited in IPR2022-00242, challenging U.S. Pat. No. 8,111,839.
Corrected Petition for IPR of U.S. Pat. No. 8,315,400, Exhibit—4, Filed on Dec. 10, 2021—Cited in IPR2022-00282, challenging U.S. Pat. No. 8,315,400.
Curriculum Vitae of Christopher J. Struck, Exhibit—2002, Filed on Oct. 7, 2022—Cited in IPR2022-01078, challenging U.S. Pat. No. 11,057,701.
Curriculum Vitae of Christopher J. Struck, Exhibit—2002, Filed on Oct. 7, 2022—Cited in IPR2022-01098, challenging U.S. Pat. No. 11,217,237.
Curriculum Vitae of David Kleinschmidt, Exhibi—2002, Filed on Oct. 11, 2022—Cited in IPR2022-01106, challenging U.S. Pat. No. 11,039,259.
Curriculum Vitae of David Kleinschmidt, Exhibit—2002, Filed on Oct. 7, 2022—Cited in IPR2022-01099, challenging U.S. Pat. No. 11,244,666.
CV for Marshall Buck, Ph.D., Exhibit—2002, Filed on May 18, 2022—Cited in IPR2022-00369, challenging U.S. Pat. No. 10,405,082.
CV of Chris Kyriakakis, Ph.D., Exhibit—1003, Filed on Dec. 21, 2021—Cited in IPR2022-00302, challenging U.S. Pat. No. 9,609,424.
CV of Christopher J. Struck, Exhibit—2002, Filed on May 18, 2022—Cited in IPR2022-00410, challenging U.S. Pat. No. 10,979,836.
CV of Daniel P. Anagnos, Exhibit—2002, Filed on Mar. 23, 2022—Cited in IPR2022-00242, challenging U.S. Pat. No. 8,111,839.
CV of Daniel P. Anagnos, Exhibit—2002, Filed on Mar. 23, 2022—Cited in IPR2022-00243, challenging U.S. Pat. No. 8,111,839.
CV of Daniel P. Anagnos; Exhibit—2002, Filed on Mar. 21, 2022—Cited in IPR2022-00234, challenging U.S. Pat. No. 9,124,982.
CV of Dr. Chris Kyriakakis, Exhibit—1003, Filed on Jan. 14, 2022—Cited in IPR2022-00410, challenging U.S. Pat. No. 10,979,836.
CV of Les E. Atlas, Ph.D., Exhibit—1003, Filed on Dec. 20, 2021—Cited in IPR2022-00324, challenging U.S. Pat. No. 8,254,591.
CV of Les E. Atlas, Ph.D., Exhibit—1004, Filed on Dec. 13, 2021—Cited in IPR2022-00242, challenging U.S. Pat. No. 8,111,839.
CV of Les E. Atlas, Ph.D., Exhibit—1004, Filed on Dec. 13, 2021—Cited in IPR2022-00243, challenging U.S. Pat. No. 8,111,839.
CV of Marshall Buck, Ph.D., Exhibit—2002, Filed on May 18, 2022—Cited in IPR2022-00388, challenging U.S. Pat. No. 10,966,015.
CV of Nathaniel Polish, Ph.D., Exhibit—1003, Filed on Dec. 17, 2021—Cited in IPR2022-00253, challenging U.S. Pat. No. 9,491,542.
CV of Nathaniel Polish, Ph.D., Exhibit—1003, Filed on Dec. 21, 2021—Cited in IPR2022-00281, challenging U.S. Pat. No. 9,270,244.

(56) References Cited

OTHER PUBLICATIONS

CV of of Les E. Atlas, Ph.D.; Exhibit—1003, Filed on Dec. 13, 2021—Cited in IPR2022-00234, challenging U.S. Pat. No. 9,124,982.
CV of Richard Stern, Ph.D., Exhibit—1003, Filed on Dec. 30, 2021—Cited in IPR2022-00369, challenging U.S. Pat. No. 10,405,082.
Daniel P. Anagnos CV, Exhibit—2002, Filed on Apr. 13, 2022—Cited in IPR2022-00324, challenging U.S. Pat. No. 8,254,591.
David Kleinschmidt CV, Exhibit—2002, Filed on Mar. 21, 2022—Cited in IPR2022-00282, challenging U.S. Pat. No. 8,315,400.
David Kleinschmidt CV, Exhibit—2002, Filed on Apr. 18, 2022—Cited in IPR2022-00253, challenging U.S. Pat. No. 9,491,542.
David Kleinschmidt CV, Exhibit—2002, Filed on Apr. 18, 2022—Cited in IPR2022-00281, challenging U.S. Pat. No. 9,270,244.
Decision Denying Institution of Inter Partes Review 35 U.S.C. § 314, Exhibit—10, Filed on Jan. 3, 2023—Cited in IPR2022-01099, challenging U.S. Pat. No. 11,244,666.
Decision Denying Institution of Inter Partes Review 35 U.S.C. § 314, Exhibit—11, Filed on Jan. 3, 2023—Cited in IPR2022-01098, challenging U.S. Pat. No. 11,217,237.
Decision Granting Institution of Inter Partes Review 35 U.S.C. sec 314, Exhibit—10, Filed on Dec. 29, 2022—Cited in IPR2022-01078, challenging U.S. Pat. No. 11,057,701.
Declaration of Chris Kyriakakis, Ph.D., Exhibit—1002, Filed on Dec. 21, 2021—Cited in IPR2022-00302, challenging U.S. Pat. No. 9,609,424.
Declaration of Christopher J. Struck in Support of Patent Owner's Preliminary Response, Exhibit—2001, Filed on Oct. 7, 2022—Cited in IPR2022-01078, challenging U.S. Pat. No. 11,057,701.
Declaration of Christopher J. Struck in Support of Patent Owner's Preliminary Response, Exhibit—2001, Filed on Oct. 7, 2022—Cited in IPR2022-01098, challenging U.S. Pat. No. 11,217,237.
Declaration of Christopher J. Struck in Support of Patent Owner's Preliminary Response, Exhibit—2001, Filed on Apr. 13, 2022—Cited in IPR2022-00302, challenging U.S. Pat. No. 9,609,424.
Declaration of Christopher J. Struck in Support of Patent Owner's Preliminary Response, Exhibit—2001, Filed on May 18, 2022—Cited in IPR2022-00410, challenging U.S. Pat. No. 10,979,836.
Declaration of Christopher J. Struck in Support of Patent Owner's Response, Exhibit—2006, Filed on Oct. 17, 2022—Cited in IPR2022-00302, challenging U.S. Pat. No. 9,609,424.
Declaration of Christopher Struck in Support of POR, Exhibit—2013, Filed on Mar. 23, 2023—Cited in IPR2022-01078, challenging U.S. Pat. No. 11,057,701.
Declaration of Daniel P. Anagnos in Support of Patent Owner Response; Exhibit—2006, Filed on Sep. 9, 2022—Cited in IPR2022-00234, challenging U.S. Pat. No. 9,124,982.
Declaration of Daniel P. Anagnos in Support of Patent Owner's Preliminary Response, Exhibit—2001, Filed on Apr. 13, 2022—Cited in IPR2022-00324, challenging U.S. Pat. No. 8,254,591.
Declaration of Daniel P. Anagnos in Support of Patent Owner's Response, Exhibit—2006, Filed on Oct. 17, 2022—Cited in IPR2022-00324, challenging U.S. Pat. No. 8,254,591.
Declaration of Daniel P. Anagnos in Support of Patent Owner's Response, Exhibit—2006, Filed on Sep. 13, 2022—Cited in IPR2022-00242, challenging U.S. Pat. No. 8,111,839.
Declaration of Daniel P. Anagnos in Support of Patent Owner's Response, Exhibit—2006, Filed on Sep. 13, 2022—Cited in IPR2022-00243, challenging U.S. Pat. No. 8,111,839.
Declaration of Daniel P. Anagnos, Exhibit—2001, Filed on Mar. 23, 2022—Cited in IPR2022-00242, challenging U.S. Pat. No. 8,111,839.
Declaration of Daniel P. Anagnos, Exhibit—2001, Filed on Mar. 23, 2022—Cited in IPR2022-00243, challenging U.S. Pat. No. 8,111,839.
Declaration of Daniel P. Anagnos; Exhibit—2001, Filed on Mar. 21, 2022—Cited in IPR2022-00234, challenging U.S. Pat. No. 9,124,982.
Declaration of David Kleinschmidt in Support of Patent Owner's Preliminary Response, Exhibit—2001, Filed on Oct. 11, 2022—Cited in IPR2022-01106, challenging U.S. Pat. No. 11,039,259.
Declaration of David Kleinschmidt in Support of Patent Owner's Preliminary Response, Exhibit—2001, Filed on Oct. 7, 2022—Cited in IPR2022-01099, challenging U.S. Pat. No. 11,244,666.
Declaration of David Kleinschmidt in Support of Patent Owner's Preliminary Response, Exhibit—2001, Filed on Mar. 21, 2022—Cited in IPR2022-00282, challenging U.S. Pat. No. 8,315,400.
Declaration of David Kleinschmidt in Support of Patent Owner's Preliminary Response, Exhibit—2001, Filed on Apr. 18, 2022—Cited in IPR2022-00253, challenging U.S. Pat. No. 9,491,542.
Declaration of David Kleinschmidt in Support of Patent Owner's Preliminary Response, Exhibit—2001, Filed on Apr. 18, 2022—Cited in IPR2022-00281, challenging U.S. Pat. No. 9,270,244.
Declaration of David Kleinschmidt in Support of Patent Owner's Response, Exhibit—2006, Filed on Oct. 19, 2022—Cited in IPR2022-00253, challenging U.S. Pat. No. 9,491,542.
Declaration of David Kleinschmidt in Support of Patent Owner's Response, Exhibit—2006, Filed on Oct. 19, 2022—Cited in IPR2022-00281, challenging U.S. Pat. No. 9,270,244.
Declaration of David Kleinschmidt in Support of Patent Owner's Response, Exhibit—2009, Filed on Sep. 9, 2022—Cited in IPR2022-00282, challenging U.S. Pat. No. 8,315,400.
Declaration of Dr. Chris Kyriakakis, Exhibit—1002, Filed on Jan. 14, 2022—Cited in IPR2022-00410, challenging U.S. Pat. No. 10,979,836.
Declaration of Dr. David Anderson Regarding Claim Construction dated Oct. 21, 2022, Exhibit—2011, Filed on Nov. 8, 2022—Cited in IPR2022-00388, challenging U.S. Pat. No. 10,966,015.
Declaration of Dr. Eric Tarr, Exhibit—2001, Filed on Dec. 6, 2024—Cited in IPR2024-00559, challenging U.S. Pat. No. 11,610,587.
Declaration of Les E. Atlas, Ph.D., Exhibit—1002, Filed on Dec. 13, 2021—Cited in IPR2022-00242, challenging U.S. Pat. No. 8,111,839.
Declaration of Les E. Atlas, Ph.D., Exhibit—1002, Filed on Dec. 20, 2021—Cited in IPR2022-00324, challenging U.S. Pat. No. 8,254,591.
Declaration of Les E. Atlas, Ph.D., Exhibit—1003, Filed on Dec. 13, 2021—Cited in IPR2022-00243, challenging U.S. Pat. No. 8,111,839.
Declaration of Les E. Atlas, Ph.D.; Exhibit—1002, Filed on Dec.13, 2021—Cited in IPR2022-00234, challenging U.S. Pat. No. 9,124,982.
Declaration of Marshall Buck in Support of Patent Owner's Preliminary Response, Exhibit—2001, Filed on May 18, 2022—Cited in IPR2022-00369, challenging U.S. Pat. No. 10,405,082.
Declaration of Marshall Buck in Support of Patent Owner's Preliminary Response, Exhibit—2001, Filed on May 18, 2022—Cited in IPR2022-00388, challenging U.S. Pat. No. 10,966,015.
Declaration of Marshall D. Buck, Ph.D. in Support of Patent Owner Response, Exhibit—2008, Filed on Nov. 8, 2022—Cited in IPR2022-00369, challenging U.S. Pat. No. 10,405,082.
Declaration of Marshall D. Buck, Ph.D. in Support of Patent Owner's Response, Exhibit—2008, Filed on Nov. 8, 2022—Cited in IPR2022-00388, challenging U.S. Pat. No. 10,966,015.
Declaration of Nathaniel Polish, Ph.D., Exhibit—1002, Filed on Dec. 17, 2021—Cited in IPR2022-00253, challenging U.S. Pat. No. 9,491,542.
Declaration of Nathaniel Polish, Ph.D., Exhibit—1002, Filed on Dec. 21, 2021—Cited in IPR2022-00281, challenging U.S. Pat. No. 9,270,244.
Declaration of Richard Stern, Ph.D., Exhibit—1002, Filed on Dec. 10, 2021—Cited in IPR2022-00282, challenging U.S. Pat. No. 8,315,400.
Declaration of Richard Stern, Ph.D., Exhibit—1002, Filed on Dec. 30, 2021—Cited in IPR2022-00369, challenging U.S. Pat. No. 10,405,082.
Declaration of Roy Falik In Support of Motion for the Pro Hac Vice Admission, Exhibit—2001, Filed on Jul. 5, 2024—Cited in IPR2024-01003, challenging U.S. Pat. No. 9,191,083.
Declaration of Roy Falik In Support of Motion for the Pro Hac Vice Admission, Exhibit—2001, Filed on Jul. 5, 2024—Cited in IPR2024-01004, challenging U.S. Pat. No. 9,614,943.
Declaration of Roy Falik In Support of Motion for the Pro Hac Vice AdmissionExhibit2001,Jul. 5, 2024—Cited in IPR2024-01033, challenging U.S. Pat. No. 8,434,966.
Declaration of Roy Falik, Exhibit—2001, Filed on Jul. 18, 2024—Cited in IPR2024-01031, challenging U.S. Pat. No. 7,049,850.
Declaration of Roy Falik, Exhibit—2001, Filed on Jul. 18, 2024—Cited in IPR2024-01034, challenging U.S. Pat. No. 9,279,263.

(56) References Cited

OTHER PUBLICATIONS

Declaration of Scott Delman with attached exhibit, Exhibit—1024, Filed on Dec. 21, 2021—Cited in IPR2022-00281, challenging U.S. Pat. No. 9,270,244.
Deposition Transcript of David Kleinschmidt, dated Jun. 9, 2023, Exhibit—1034, Filed on Jun. 30, 2023—Cited in IPR2022-01106, challenging U.S. Pat. No. 11,039,259.
Determining All Challenged Claims Unpatentable 35 U.S.C. § 318(a), Exhibit—31, Filed on Aug. 11, 2023—Cited in IPR2022-00388, challenging U.S. Pat. No. 10,966,015.
Determining All Challenged Claims Unpatentable 35 U.S.C. § 318(a), Exhibit—32, Filed on Aug. 11, 2023—Cited in IPR2022-00369, challenging U.S. Pat. No. 10,405,082.
Determining All Challenged Claims Unpatentable 35 U.S.C. § 318(a), Exhibit—26, Filed on Nov. 13, 2023—Cited in IPR2022-01078, challenging U.S. Pat. No. 11,057,701.
Determining Some Challenged Claims Unpatentable 35 U.S.C. § 318(a), Exhibit—37, Filed on Jul. 7, 2023—Cited in IPR2022-00302, challenging U.S. Pat. No. 9,609,424.
Docket Control Order, E.D. Tex., Exhibit—1014, Filed on Apr. 20, 2022—Cited in IPR2022-00282, challenging U.S. Pat. No. 8,315,400.
Docket Control Order, E.D. Tex., Exhibit—1043, Filed on Apr. 20, 2022—Cited in IPR2022-00242, challenging U.S. Pat. No. 8,111,839.
Docket Control Order, E.D. Tex., Exhibit—1043, Filed on Apr. 20, 2022—Cited in IPR2022-00243, challenging U.S. Pat. No. 8,111,839.
Docket Control Order, E.D. Tex.; Exhibit—1033, Filed on Apr. 20, 2022—Cited in IPR2022-00234, challenging U.S. Pat. No. 9,124,982.
Edwards, The Future of Hearing Aid Technology, Exhibit—2008, Filed on Sep. 13, 2022—Cited in IPR2022-00243, challenging U.S. Pat. No. 8,111,839.
EX 1032—Protective Order (*Staton Techiya, LLC* v. *Samsung Electronics Co., LTD*, 21-CV-00413-JRG-RSP), Exhibit—1032, Filed on Apr. 13, 2023—Cited in IPR2022-00302, challenging U.S. Pat. No. 9,609,424.
Ex 1045—Nov. 18, 2022, Deposition Transcript of Daniel P Anagnos, Exhibit—1045, Filed on Dec. 6, 2022—Cited in IPR2022-00242, challenging U.S. Pat. No. 8,111,839.
Ex 1045—Nov. 18, 2022, Deposition Transcript of Daniel P Anagnos, Exhibit—1045, Filed on Dec. 6, 2022—Cited in IPR2022-00243, challenging U.S. Pat. No. 8,111,839.
Ex 1046—Patent Owner's Response in IPR2022-00243, Paper 21, Exhibit—1046, Filed on Dec. 6, 2022—Cited in IPR2022-00242, challenging U.S. Pat. No. 8,111,839.
Ex 1047—Patent Owner Response for IPR2022-00234, Paper 17, Exhibit—1047, Filed on Dec. 6, 2022—Cited in IPR2022-00242, challenging U.S. Pat. No. 8,111,839.
Ex 1047—Patent Owner Response for IPR2022-00234, Paper 17, Exhibit—1047, Filed on Dec. 6, 2022—Cited in IPR2022-00243, challenging U.S. Pat. No. 8,111,839.
Ex 1048—Institution Decision for IPR2022-00234, Paper 12, Exhibit—1048, Filed on Dec. 6, 2022—Cited in IPR2022-00242, challenging U.S. Pat. No. 8,111,839.
Ex 1049—File History for 382 Patent, Exhibit—1049, Filed on Dec. 6, 2022—Cited in IPR2022-00242, challenging U.S. Pat. No. 8,111,839.
Ex 1053—Excerpts from The Authoritative Dictionary of IEEE Standards Terms, Exhibit—1053, Filed on Dec. 6, 2022—Cited in IPR2022-00242, challenging U.S. Pat. No. 8,111,839.
Ex 1054—Supplemental Declaration of Les E Atlas PhD (Atlas-Supp), Exhibit—1054, Filed on Dec. 6, 2022—Cited in IPR2022-00243, challenging U.S. Pat. No. 8,111,839.
Ex. 1002—Declaration of Dr. Les Atlas, Ph.D., Exhibit—1002, Filed on Jun. 9, 2022—Cited in IPR2022-01106, challenging U.S. Pat. No. 11,039,259.
Ex. 1002—Declaration of Nathaniel Polish, Ph.D., Exhibit—1002, Filed on Jun. 9, 2022—Cited in IPR2022-01098, challenging U.S. Pat. No. 11,217,237.
Ex. 1002—Declaration of Nathaniel Polish, Ph.D., Exhibit—1002, Filed on Jun. 9, 2022—Cited in IPR2022-01099, challenging U.S. Pat. No. 11,244,666.
Ex. 1002—Kyriakakis DeclarationExhibit1002, Jun. 18, 2024—Cited in IPR2024-01033, challenging U.S. Pat. No. 8,434,966.
Ex. 1002 Declaration of Chris Kyriakakis, Exhibit—1002, Filed on Jul. 1, 2024—Cited in IPR2024-01034, challenging U.S. Pat. No. 9,279,263.
Ex. 1002 Declaration of Dr. Richard M. Stern, Exhibit—1002, Filed on Jun. 9, 2022—Cited in IPR2022-01078, challenging U.S. Pat. No. 11,057,701.
Ex. 1003—CV of Dr. Les Atlas, Ph.D., Exhibit—1003, Filed on Jun. 9, 2022—Cited in IPR2022-01106, challenging U.S. Pat. No. 11,039,259.
Ex. 1003—CV of Nathaniel Polish, Ph.D., Exhibit—1003, Filed on Jun. 9, 2022—Cited in IPR2022-01098, challenging U.S. Pat. No. 11,217,237.
Ex. 1003—CV of Nathaniel Polish, Ph.D., Exhibit—1003, Filed on Jun. 9, 2022—Cited in IPR2022-01099, challenging U.S. Pat. No. 11,244,666.
Ex. 1003—Kyriakakis CVExhibit1003, Jun. 18, 2024—Cited in IPR2024-01033, challenging U.S. Pat. No. 8,434,966.
Ex. 1003 Chris Kyriakakis CV, Exhibit—1003, Filed on Jul. 1, 2024—Cited in IPR2024-01034, challenging U.S. Pat. No. 9,279,263.
Ex. 1003 CV of Dr. Richard M. Stern, Exhibit—1003, Filed on Jun. 9, 2022—Cited in IPR2022-01078, challenging U.S. Pat. No. 11,057,701.
Ex. 1004—U.S. Appl. No. 16/571,973 File History for 259, Exhibit—1004, Filed on Jun. 9, 2022—Cited in IPR2022-01106, challenging U.S. Pat. No. 11,039,259.
Ex. 1004—File History for U.S. Appl. No. 11,750,965Exhibit1004, Jun. 18, 2024—Cited in IPR2024-01033, challenging U.S. Pat. No. 8,434,966.
Ex. 1004—File History of U.S. Pat. No. 11,217,237, Exhibit—1004, Filed on Jun. 9, 2022—Cited in IPR2022-01098, challenging U.S. Pat. No. 11,217,237.
Ex. 1004—File History of U.S. Pat. No. 11,244,666, Exhibit—1004, Filed on Jun. 9, 2022—Cited in IPR2022-01099, challenging U.S. Pat. No. 11,244,666.
Ex. 1004 File History for U.S. Pat. No. 11,665,493, Exhibit—1004, Filed on Jul. 1, 2024—Cited in IPR2024-01034, challenging U.S. Pat. No. 9,279,263.
Ex. 1004 File History of U.S. Pat. 11,057,701, Exhibit—1004, Filed on Jun. 9, 2022—Cited in IPR2022-01078, challenging U.S. Pat. No. 11,057,701.
Ex. 1005—U.S. Appl. No. 13/917,079 File History part 1 of 2, Exhibit—1005, Filed on Jun. 9, 2022—Cited in IPR2022-01106, challenging U.S. Pat. No. 11,039,259.
Ex. 1005—U.S. Appl. No. 13/917,079 File History part 2 of 2, Exhibit—1005, Filed on Jun. 9, 2022—Cited in IPR2022-01106, challenging U.S. Pat. No. 11,039,259.
Ex. 1005 U.S. Appl. No. 61/098,250, Exhibit—1005, Filed on Jul. 1, 2024—Cited in IPR2024-01034, challenging U.S. Pat. No. 9,279,263.
Ex. 1006—U.S. Appl. No. 12/555,570 File History, Exhibit—1006, Filed on Jun. 9, 2022—Cited in IPR2022-01106, challenging U.S. Pat. No. 11,039,259.
Ex. 1006 U.S. Appl. No. 12/115,349 File History, Exhibit—1006, Filed on Jun. 9, 2022—Cited in IPR2022-01078, challenging U.S. Pat. No. 11,057,701.
Ex. 1006 Publication of U.S. Appl. No. 12/555,864, Exhibit—1006, Filed on Jul. 1, 2024—Cited in IPR2024-01034, challenging U.S. Pat. No. 9,279,263.
Ex. 1007—U.S. Appl. No. 61/096,128 File History, Exhibit—1007, Filed on Jun. 9, 2022—Cited in IPR2022-01106, challenging U.S. Pat. No. 11,039,259.
Ex. 1007 U.S. Appl. No. 60/916,271 File History, Exhibit—1007, Filed on Jun. 9, 2022—Cited in IPR2022-01078, challenging U.S. Pat. No. 11,057,701.
Ex. 1008—JP3353701B2 to Kondo with Translation, Exhibit—1008, Filed on Jun. 9, 2022—Cited in IPR2022-01098, challenging U.S. Pat. No. 11,217,237.
Ex. 1009 Translation of JPA 2002-204500 (Hayashi), Exhibit—1009, Filed on Jul. 1, 2024—Cited in IPR2024-01034, challenging U.S. Pat. No. 9,279,263.
Ex. 1010—Redline—965 versus parentExhibit1010, Jun. 18, 2024—Cited in IPR2024-01033, challenging U.S. Pat. No. 8,434,966.

(56) References Cited

OTHER PUBLICATIONS

Ex. 1012—Prov60893617Exhibit1012,Jun. 18, 2024—Cited in IPR2024-01033, challenging U.S. Pat. No. 8,434,966.
Ex. 1013—150139_14109987 NOA referred to in 965 NOAExhibit1013,Jun. 18, 2024—Cited in IPR2024-01033, challenging U.S. Pat. No. 8,434,966.
Ex. 1013 Deterministic Broad-Band Signal (Chu), Exhibit—1013, Filed on Jul. 1, 2024—Cited in IPR2024-01034, challenging U.S. Pat. No. 9,279,263.
Ex. 1013 IPR2022-00282 Patent Owner Preliminary Response, Exhibit—1013, Filed on Jun. 9, 2022—Cited in IPR2022-01078, challenging U.S. Pat. No. 11,057,701.
Ex. 1014—Mulgrew 2002, Exhibit—1014, Filed on Jun. 9, 2022—Cited in IPR2022-01099, challenging U.S. Pat. No. 11,244,666.
Ex. 1014—Redline—682 parent versus ultimate parent 812Exhibit1014,Jun. 18, 2024—Cited in IPR2024-01033, challenging U.S. Pat. No. 8,434,966.
Ex. 1014 701 Patent Family Tree, Exhibit—1014, Filed on Jun. 9, 2022—Cited in IPR2022-01078, challenging U.S. Pat. No. 11,057,701.
Ex. 1015—666 Family Tree, Exhibit—1015, Filed on Jun. 9, 2022—Cited in IPR2022-01099, challenging U.S. Pat. No. 11,244,666.
Ex. 1015—Letter re 965 IPR StipulationExhibit1015,Jun. 18, 2024—Cited in IPR2024-01033, challenging U.S. Pat. No. 8,434,966.
Ex. 1015 Complaint, E.D. Tex. 22-53, Exhibit—1015, Filed on Jun. 9, 2022—Cited in IPR2022-01078, challenging U.S. Pat. No. 11,057,701.
Ex. 1016—Complaint, E.D. Tex., 22-53, Exhibit—1016, Filed on Jun. 9, 2022—Cited in IPR2022-01099, challenging U.S. Pat. No. 11,244,666.
Ex. 1016 GSM 6.31, Exhibit—1016, Filed on Jun. 9, 2022—Cited in IPR2022-01078, challenging U.S. Pat. No. 11,057,701.
Ex. 1016 Reply Declaration of Richard Stern, PhD, Exhibit—1016, Filed on Dec. 2, 2022—Cited in IPR2022-00282, challenging U.S. Pat. No. 8,315,400.
Ex. 1017—Amended Complaint, E.D. Tex., 21-413, Exhibit—1017, Filed on Jun. 9, 2022—Cited in IPR2022-01099, challenging U.S. Pat. No. 11,244,666.
Ex. 1017—Rose 2003, Exhibit—1017, Filed on Jun. 9, 2022—Cited in IPR2022-01106, challenging U.S. Pat. No. 11,039,259.
Ex. 1017 David Kleinschmidt Depo Transcript, Exhibit—1017, Filed on Dec. 2, 2022—Cited in IPR2022-00282, challenging U.S. Pat. No. 8,315,400.
Ex. 1017 Final Rejection from Reexam 90/015,146, Exhibit—1017, Filed on Jul. 1, 2024—Cited in IPR2024-01034, challenging U.S. Pat. No. 9,279,263.
Ex. 1017 GSM 6.12, Exhibit—1017, Filed on Jun. 9, 2022—Cited in IPR2022-01078, challenging U.S. Pat. No. 11,057,701.
Ex. 1018—Confidential Settlement Agreement with Exhibits A-IExhibit1018, Dec. 11, 2024—Cited in IPR2024-01033, challenging U.S. Pat. No. 8,434,966. [Document not publicly available at PTAB].
Ex. 1018—Consolidation Order, E.D. Tex., 21-413 & 22-53, Exhibit—1018, Filed on Jun. 9, 2022—Cited in IPR2022-01099, challenging U.S. Pat. No. 11,244,666.
Ex. 1018 Consolidation Order, E.D. Tex. 21-413 & 22-53, Exhibit—1018, Filed on Jun. 9, 2022—Cited in IPR2022-01078, challenging U.S. Pat. No. 11,057,701.
Ex. 1018 Excerpts from Wiley Electrical & Electronics Engineering Dictionary, Exhibit—1018, Filed on Dec. 2, 2022—Cited in IPR2022-00282, challenging U.S. Pat. No. 8,315,400.
Ex. 1019—Docket Control Order, E.D. Tex., 21-413, Exhibit—1019, Filed on Jun. 9, 2022—Cited in IPR2022-01099, challenging U.S. Pat. No. 11,244,666.
Ex. 1019—Duffner 2006, Exhibit—1019, Filed on Jun. 9, 2022—Cited in IPR2022-01098, challenging U.S. Pat. No. 11,217,237.
Ex. 1019 Docket Control Order, E.D. Tex. 21-413, Exhibit—1019, Filed on Jun. 9, 2022—Cited in IPR2022-01078, challenging U.S. Pat. No. 11,057,701.
Ex. 1019 Dual-Channel MLS-Based Test System (Schneider), Exhibit—1019, Filed on Jul. 1, 2024—Cited in IPR2024-01034, challenging U.S. Pat. No. 9,279,263.
Ex. 1020—Letter re IPR Stipulation, Exhibit—1020, Filed on Jun. 9, 2022—Cited in IPR2022-01099, challenging U.S. Pat. No. 11,244,666.
Ex. 1020 Letter re IPR Stipulation, Exhibit—1020, Filed on Jun. 9, 2022—Cited in IPR2022-01078, challenging U.S. Pat. No. 11,057,701.
Ex. 1021—Complaint. E.D. Tex., 22-00053, Exhibit—1021, Filed on Jun. 9, 2022—Cited in IPR2022-01098, challenging U.S. Pat. No. 11,217,237.
Ex. 1021—Hsu 2005, Exhibit—1021, Filed on Jun. 9, 2022—Cited in IPR2022-01106, challenging U.S. Pat. No. 11,039,259.
Ex. 1021—Stipulation Letter, Exhibit—1021, Filed on May 20, 2022—Cited in IPR2022-00253, challenging U.S. Pat. No. 9,491,542.
Ex. 1021 Amended Complaint, E.D. Tex. 21-413, Exhibit—1021, Filed on Jun. 9, 2022—Cited in IPR2022-01078, challenging U.S. Pat. No. 11,057,701.
Ex. 1021 Claim Construction Order, ED Tex, Exhibit—1021, Filed on Jul. 1, 2024—Cited in IPR2024-01034, challenging U.S. Pat. No. 9,279,263.
Ex. 1022—Amended Complaint, E.D.Tex., 21-00413, Exhibit—1022, Filed on Jun. 9, 2022—Cited in IPR2022-01098, challenging U.S. Pat. No. 11,217,237.
Ex. 1022—Complaint, E.D. Tex., Exhibit—1022, Filed on May 20, 2022—Cited in IPR2022-00253, challenging U.S. Pat. No. 9,491,542.
Ex. 1022 Letter to Techiya re 493 IPR Stipulation, Exhibit—1022, Filed on Jul. 1, 2024—Cited in IPR2024-01034, challenging U.S. Pat. No. 9,279,263.
Ex. 1023—Consolidation Order, E.D. Tex., Exhibit—1023, Filed on May 20, 2022—Cited in IPR2022-00253, challenging U.S. Pat. No. 9,491,542.
Ex. 1023—Consolidation Order, E.D.Tex., 21-00413 & 22-00053, Exhibit—1023, Filed on Jun. 9, 2022—Cited in IPR2022-01098, challenging U.S. Pat. No. 11,217,237.
Ex. 1023 Techiya Appeal Brief from Reexam 90/015,146, Exhibit—1023, Filed on Jul. 1, 2024—Cited in IPR2024-01034, challenging U.S. Pat. No. 9,279,263.
Ex. 1024—259 Family Tree, Exhibit—1024, Filed on Jun. 9, 2022—Cited in IPR2022-01106, challenging U.S. Pat. No. 11,039,259.
Ex. 1024—Docket Control Order, E.D. Tex., 21-00413, Exhibit—1024, Filed on Jun. 9, 2022—Cited in IPR2022-01098, challenging U.S. Pat. No. 11,217,237.
Ex. 1024 Judicial Caseload Profile, Exhibit—1024, Filed on Jul. 1, 2024—Cited in IPR2024-01034, challenging U.S. Pat. No. 9,279,263.
Ex. 1025—Complaint, E.D. Tex. 22-53, Exhibit—1025, Filed on Jun. 9, 2022—Cited in IPR2022-01106, challenging U.S. Pat. No. 11,039,259.
Ex. 1025—Letter re IPR Stipulation, Exhibit—1025, Filed on Jun. 9, 2022—Cited in IPR2022-01098, challenging U.S. Pat. No. 11,217,237.
Ex. 1025—Stipulation Letter, Exhibit—1025, Filed on May 27, 2022—Cited in IPR2022-00281, challenging U.S. Pat. No. 9,270,244.
Ex. 1026—237 Family Tree, Exhibit—1026, Filed on Jun. 9, 2022—Cited in IPR2022-01098, challenging U.S. Pat. No. 11,217,237.
Ex. 1026—Amended Complaint, E.D. Tex. 21-413, Exhibit—1026, Filed on Jun. 9, 2022—Cited in IPR2022-01106, challenging U.S. Pat. No. 11,039,259.
Ex. 1026—Complaint, E.D. Tex., Exhibit—1026, Filed on May 27, 2022—Cited in IPR2022-00281, challenging U.S. Pat. No. 9,270,244.
Ex. 1026—Confidential Settlement Agreement, Exhibit—1026, Filed on Dec. 9, 2024—Cited in IPR2024-01034, challenging U.S. Pat. No. 9,279,263. [Document not publicly available at PTAB].
Ex. 1027—Confidential Settlement Agreement with Exhibits A-I, Exhibit—1027, Filed on Dec. 11, 2024—Cited in IPR2024-01034, challenging U.S. Pat. No. 9,279,263. [Document not publicly available at PTAB].
Ex. 1027—Consolidation Order, E.D. Tex., Exhibit—1027, Filed on May 27, 2022—Cited in IPR2022-00281, challenging U.S. Pat. No. 9,270,244.
Ex. 1027—Docket Control Order, E.D. Tex. 21-413, Exhibit—1027, Filed on Jun. 9, 2022—Cited in IPR2022-01106, challenging U.S. Pat. No. 11,039,259.

(56) References Cited

OTHER PUBLICATIONS

Ex. 1027—Transcript of Deposition of Christopher Struck, Exhibit—1027, Filed on Jan. 10, 2023—Cited in IPR2022-00302, challenging U.S. Pat. No. 9,609,424.
Ex. 1028—Consolidation Order, E.D. Tex. 21-413 & 22-53, Exhibit—1028, Filed on Jun. 9, 2022—Cited in IPR2022-01106, challenging U.S. Pat. No. 11,039,259.
Ex. 1028—Errata Sheet for Deposition of Christopher Struck, Exhibit—1028, Filed on Jan. 10, 2023—Cited in IPR2022-00302, challenging U.S. Pat. No. 9,609,424.
Ex. 1029—Letter re IPR Stipulation, Exhibit—1029, Filed on Jun. 9, 2022—Cited in IPR2022-01106, challenging U.S. Pat. No. 11,039,259.
Ex. 1029—Patent Owner's Opening Claim Construction Brief, E.D. Tex., Exhibit—1029, Filed on Jan. 10, 2023—Cited in IPR2022-00302, challenging U.S. Pat. No. 9,609,424.
Ex. 1029 Petitioners' Oral Hearing Demonstratives, Exhibit—1029, Filed on Sep. 26, 2023—Cited in IPR2022-01078, challenging U.S. Pat. No. 11,057,701.
Ex. 1030—Petitioners' Oral Hearing Demonstratives, Exhibit—1030, Filed on Apr. 11, 2023—Cited in IPR2022-00302, challenging U.S. Pat. No. 9,609,424.
Ex. 1033—Confidential Deposition of Christopher Struck, E.D. Tex., Exhibit—1033, Filed on May 15,2023—Cited in IPR2022-00302, challenging U.S. Pat. No. 9,609,424. [Document not publicly available at PTAB].
Ex. 1034—Redacted Deposition of Christopher Struck, E.D. Tex., Exhibit—1034, Filed on May 15, 2023—Cited in IPR2022-00302, challenging U.S. Pat. No. 9,609,424.
Ex. 1037—Petitioners' Oral Hearing Demonstratives, Exhibit—1037, Filed on Oct. 11, 2023—Cited in IPR2022-01106, challenging U.S. Pat. No. 11,039,259.
Ex. 3001, Exhibit—3001, Filed on Nov. 8, 2024—Cited in IPR2024-01003, challenging U.S. Pat. No. 9,191,083.
Ex. 3001, Exhibit—3001, Filed on Nov. 8, 2024—Cited in IPR2024-01004, challenging U.S. Pat. No. 9,614,943.
Ex. 3001, Exhibit—3001, Filed on Nov. 8, 2024—Cited in IPR2024-01031, challenging U.S. Pat. No. 7,049,850.
Ex. 3001, Exhibit—3001, Filed on Nov. 8, 2024—Cited in IPR2024-01033, challenging U.S. Pat. No. 8,434,966.
Ex. 3001, Exhibit—3001, Filed on Nov. 8, 2024—Cited in IPR2024-01034, challenging U.S. Pat. No. 9,279,263.
Ex. 3001, Exhibit—3001, Filed on Apr. 6, 2023—Cited in IPR2022-00388, challenging U.S. Pat. No. 10,966,015.
EX1002—Declaration of Christopher Schmandt, Exhibit—1002, Filed on Feb. 9, 2024—Cited in IPR2024-00559, challenging U.S. Pat. No. 11,610,587.
EX1002—Declaration of Nathaniel Polish, Exhibit—1002, Filed on Jun. 25, 2024—Cited in IPR2024-01031, challenging U.S. Pat. No. 7,049,850.
EX1002—Kyriakakis Declaration, Exhibit—1002, Filed on Jun. 12, 2024—Cited in IPR2024-01003, challenging U.S. Pat. No. 9,191,083.
EX1002—Kyriakakis Declaration, Exhibit—1002, Filed on Jun. 12, 2024—Cited in IPR2024-01004, challenging U.S. Pat. No. 9,614,943.
EX1003—Nathaniel Polish CV, Exhibit—1003, Filed on Jun. 25, 2024—Cited in IPR2024-01031, challenging U.S. Pat. No. 7,049,850.
EX1003—Kyriakakis CV, Exhibit—1003, Filed on Jun. 12, 2024—Cited in IPR2024-01003, challenging U.S. Pat. No. 9,191,083.
EX1003—Kyriakakis CV, Exhibit—1003, Filed on Jun. 12, 2024—Cited in IPR2024-01004, challenging U.S. Pat. No. 9,614,943.
EX1003—Schmandt CV, Exhibit—1003, Filed on Feb. 9, 2024—Cited in IPR2024-00559, challenging U.S. Pat. No. 11,610,587.
EX1004—File History for U.S. Pat. No. 11,659,315—Part 1 of 2, Exhibit—1004, Filed on Jun. 25, 2024—Cited in IPR2024-01031, challenging U.S. Pat. No. 7,049,850.
EX1004—File History for U.S. Pat. No. 11,659,315—Part 2 of 2, Exhibit—1004, Filed on Jun. 25, 2024—Cited in IPR2024-01031, challenging U.S. Pat. No. 7,049,850.
EX1004—File History for U.S. Pat. No. 11,710,473_Part 1 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 1 of 3, Exhibit—1004, Filed on Jun. 12, 2024—Cited in IPR2024-01004, challenging U.S. Pat. No. 9,614,943.
EX1004—File History for U.S. Pat. No. 11,710,473_Part 2 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 2 of 3, Exhibit—1004, Filed on Jun.12, 2024—Cited in IPR2024-01004, challenging U.S. Pat. No. 9,614,943.
EX1004—File History for U.S. Pat. No. 11,710,473_Part 3 of 3, Exhibit—1004, Filed on Jun. 12, 2024—Cited in IPR2024-01003, challenging U.S. Pat. No. 9,191,083.
EX1004—File History for U.S. Pat. No. 11,710,473_Part 3 of 3, Exhibit—1004, Filed on Jun. 12, 2024—Cited in IPR2024-01004, challenging U.S. Pat. No. 9,614,943.
EX1004—USFH U.S. Pat. No. 11,610,587 Part 1 of 2, Exhibit—1004, Filed on Feb. 9, 2024—Cited in IPR2024-00559, challenging U.S. Pat. No. 11,610,587.
EX1004—USFH U.S. Pat. No. 11,610,587 Part 2 of 2, Exhibit—1004, Filed on Feb. 9, 2024—Cited in IPR2024-00559, challenging U.S. Pat. No. 11,610,587.
EX1005—U.S. Appl. No. 60/885,917, Exhibit—1005, Filed on Jun. 12, 2024—Cited in IPR2024-01003, challenging U.S. Pat. No. 9,191,083.
EX1005—U.S. Appl. No. 60/885,917, Exhibit—1005, Filed on Jun. 12, 2024—Cited in IPR2024-01004, challenging U.S. Pat. No. 9,614,943.
EX1005—U.S. Appl. No. 61/737,932 Provisional, Exhibit—1005, Filed on Jun. 25, 2024—Cited in IPR2024-01031, challenging U.S. Pat. No. 7,049,850.
EX1005—U.S. Appl. No. 61/098,914 (Provisional Application), Exhibit—1005, Filed on Feb. 9, 2024—Cited in IPR2024-00559, challenging U.S. Pat. No. 11,610,587.
EX1006—U.S. Appl. No. 16/266,829 (829 App), Exhibit—1006, Filed on Jun. 25, 2024—Cited in IPR2024-01031, challenging U.S. Pat. No. 7,049,850.
EX1006—U.S. Appl. No. 17/321,892, Exhibit—1006, Filed on Jun. 12, 2024—Cited in IPR2024-01003, challenging U.S. Pat. No. 9,191,083.
EX1006—U.S. Appl. No. 17/321,892, Exhibit—1006, Filed on Jun. 12, 2024—Cited in IPR2024-01004, challenging U.S. Pat. No. 9,614,943.
EX1006—U.S. Appl. No. 17/203,731, Exhibit—1006, Filed on Feb. 9, 2024—Cited in IPR2024-00559, challenging U.S. Pat. No. 11,610,587.
EX1007—315 Patent Family Tree, Exhibit—1007, Filed on Jun. 25, 2024—Cited in IPR2024-01031, challenging U.S. Pat. No. 7,049,850.
EX1008—Docket Control Order, Exhibit—1008, Filed on Jun. 25, 2024—Cited in IPR2024-01031, challenging U.S. Pat. No. 7,049,850.
EX1008—File History for U.S. Pat. No. 11,244,666, Exhibit—1008, Filed on Jun. 12, 2024—Cited in IPR2024-01003, challenging U.S. Pat. No. 9,191,083.
EX1008—File History for U.S. Pat. No. 11,244,666, Exhibit—1008, Filed on Jun. 12, 2024—Cited in IPR2024-01004, challenging U.S. Pat. No. 9,614,943.
EX1009—Letter from Nikhil Krishnan to Thomas J. Friel, Jr., Exhibit—1009, Filed on Jun. 25, 2024—Cited in IPR2024-01031, challenging U.S. Pat. No. 7,049,850.
EX1009—U.S. Appl. No. 90/019,169 RE of U.S. Pat. No. 11,244,666_Part 1 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 1 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_Part 2 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 2 of 5, Exhibit—1009, Filed on Jun. 12, 2024—Cited in IPR2024-01004, challenging U.S. Pat. No. 9,614,943.

(56) References Cited

OTHER PUBLICATIONS

EX1009—U.S. Appl. No. 90/019,169 RE of U.S. Pat. No. 11,244,666_Part 3 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 3 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_Part 4 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 4 of 5, Exhibit—1009, Filed on Jun. 12, 2024—Cited in IPR2024-01004, challenging U.S. Pat. No. 9,614,943.
EX1009—U.S. Appl. No. 90/019,169 RE of U.S. Pat. No. 11,244,666_Part 5 of 5, Exhibit—1009, Filed on Jun. 12, 2024—Cited in IPR2024-01003, challenging U.S. Pat. No. 9,191,083.
EX1009—U.S. Appl. No. 90/019,169 RE of U.S. Pat. No. 11,244,666_Part 5 of 5, Exhibit—1009, Filed on Jun. 12, 2024—Cited in IPR2024-01004, challenging U.S. Pat. No. 9,614,943.
EX1010—473 Patent Family Tree, Exhibit—1010, Filed on Jun. 12, 2024—Cited in IPR2024-01003, challenging U.S. Pat. No. 9,191,083.
EX1010—473 Patent Family Tree, Exhibit—1010, Filed on Jun. 12, 2024—Cited in IPR2024-01004, challenging U.S. Pat. No. 9,614,943.
EX1011—Claim Construction Order, ED Tex, Exhibit—1011, Filed on Jun. 12, 2024—Cited in IPR2024-01003, challenging U.S. Pat. No. 9,191,083.
EX1011—Claim Construction Order, ED Tex, Exhibit—1011, Filed on Jun. 12, 2024—Cited in IPR2024-01004, challenging U.S. Pat. No. 9,614,943.
EX1012—Docket Control Order, ED Tex, Exhibit—1012, Filed on Jun. 12, 2024—Cited in IPR2024-01003, challenging U.S. Pat. No. 9,191,083.
EX1012—Docket Control Order, ED Tex, Exhibit—1012, Filed on Jun. 12, 2024—Cited in IPR2024-01004, challenging U.S. Pat. No. 9,614,943.
EX1013—Letter from Nikhil Krishnan to Thomas J Friel, Jr, Exhibit—1013, Filed on Jun. 12, 2024—Cited in IPR2024-01003, challenging U.S. Pat. No. 9,191,083.
EX1013—Letter from Nikhil Krishnan to Thomas J Friel, Jr, Exhibit—1013, Filed on Jun. 12, 2024—Cited in IPR2024-01004, challenging U.S. Pat. No. 9,614,943.
EX1016—Stay Order from E.D. Tex.Exhibit1016, Nov. 20, 2024—Cited in IPR2024-01033, challenging U.S. Pat. No. 8,434,966.
EX1019—U.S. Appl. No. 60/841,990 (Rosenberg Provisional) (annotated), Exhibit—1019, Filed on Jun. 12, 2024—Cited in IPR2024-01003, challenging U.S. Pat. No. 9,191,083.
EX1023—Preliminary Constructions, E.D. Tex., Exhibit—1023, Filed on Jan. 31, 2023—Cited in IPR2022-00369, challenging U.S. Pat. No. 10,405,082.
EX1023—Preliminary Constructions, E.D. Tex., Exhibit—1023, Filed on Jan. 31, 2023—Cited in IPR2022-00388, challenging U.S. Pat. No. 10,966,015.
EX1024—Cohen, Exhibit—1024, Filed on Feb. 9, 2024—Cited in IPR2024-00559, challenging U.S. Pat. No. 11,610,587.
EX1024—Transcript of Deposition of Marshall Buck, Exhibit—1024, Filed on Jan. 31, 2023—Cited in IPR2022-00369, challenging U.S. Pat. No. 10,405,082.
EX1024—Transcript of Deposition of Marshall Buck, Exhibit—1024, Filed on Jan. 31, 2023—Cited in IPR2022-00388, challenging U.S. Pat. No. 10,966,015.
EX1025—Blattner et al., Earcons and Icons, Exhibit—1025, Filed on Jun. 25, 2024—Cited in IPR2024-01031, challenging U.S. Pat. No. 7,049,850.
Ex1025—Deposition Transcript of David Kleinschmidt, Exhibit—1025, Filed on Jan. 11, 2023—Cited in IPR2022-00253, challenging U.S. Pat. No. 9,491,542.
EX1025—Stay Order from E.D. Tex., Exhibit—1025, Filed on Nov. 20, 2024—Cited in IPR2024-01034, challenging U.S. Pat. No. 9,279,263.
EX1025—Tanenbaum, Exhibit—1025, Filed on Feb. 9, 2024—Cited in IPR2024-00559, challenging U.S. Pat. No. 11,610,587.
EX1025 Petitioners' Oral Hearing Demonstratives, Exhibit—1025, Filed on May 9, 2023—Cited in IPR2022-00369, challenging U.S. Pat. No. 10,405,082.
EX1025 Petitioners' Oral Hearing Demonstratives, Exhibit—1025, Filed on May 9, 2023—Cited in IPR2022-00388, challenging U.S. Pat. No. 10,966,015.
Ex1026—Cessation from Merriam-Webster's Collegiate Dictionary, 10th Ed, Exhibit—1026, Filed on Jan. 11, 2023—Cited in IPR2022-00253, challenging U.S. Pat. No. 9,491,542.
EX1026—Computer Dictionary 2nd Ed, Exhibit—1026, Filed on Feb. 9, 2024—Cited in IPR2024-00559, challenging U.S. Pat. No. 11,610,587.
Ex1027—Cessation from New World Dictionary, 2d College Ed, Exhibit—1027, Filed on Jan. 11, 2023—Cited in IPR2022-00253, challenging U.S. Pat. No. 9,491,542.
EX1028—Basu, Exhibit—1028, Filed on Jun. 12, 2024—Cited in IPR2024-01003, challenging U.S. Pat. No. 9,191,083.
EX1028—Basu, Smart Headphones, Exhibit—1028, Filed on Jun. 12, 2024—Cited in IPR2024-01004, challenging U.S. Pat. No. 9,614,943.
Ex1028—Supplemental Declaration of Nathanial Polish, Ph.D., Exhibit—1028, Filed on Jan. 11, 2023—Cited in IPR2022-00253, challenging U.S. Pat. No. 9,491,542.
EX1029—Declaration of Nathanial Polish, Exhibit—1029, Filed on Jan. 11, 2023—Cited in IPR2022-00281, challenging U.S. Pat. No. 9,270,244.
EX1029—Mueller, Transparent Hearing, Exhibit—1029, Filed on Jun. 12, 2024—Cited in IPR2024-01003, challenging U.S. Pat. No. 9,191,083.
EX1029—Mueller, Transparent Hearing, Exhibit—1029, Filed on Jun. 12, 2024—Cited in IPR2024-01004, challenging U.S. Pat. No. 9,614,943.
EX1030—Deposition Transcript of David Kleinschmidt, Exhibit—1030, Filed on Jan. 11, 2023—Cited in IPR2022-00281, challenging U.S. Pat. No. 9,270,244.
EX1031—587 Patent Family Tree, Exhibit—1031, Filed on Feb. 9, 2024—Cited in IPR2024-00559, challenging U.S. Pat. No. 11,610,587.
EX1031—Basu, et al., Smart Headphones, Exhibit—1031, Filed on Jun. 25, 2024—Cited in IPR2024-01031, challenging U.S. Pat. No. 7,049,850.
EX1031—Cessation from Merriam-Webster's Collegiate Dictionary, 10th Ed, Exhibit—1031, Filed on Jan. 11, 2023—Cited in IPR2022-00281, challenging U.S. Pat. No. 9,270,244.
EX1031—Patent Rule 4-3 Joint Claim Construction and Prehearing Statement, E.D. TX, Exhibit—1031, Filed on Mar. 7, 2023—Cited in IPR2022-00253, challenging U.S. Pat. No. 9,491,542.
EX1032—Cessation from New World Dictionary, 2d College Ed, Exhibit—1032, Filed on Jan. 11, 2023—Cited in IPR2022-00281, challenging U.S. Pat. No. 9,270,244.
EX1032—Ex. A-01_U.S. Pat. No. 11/610,587 Samsung Infringement Claim Chart, Exhibit—1032, Filed on Feb. 9, 2024—Cited in IPR2024-00559, challenging U.S. Pat. No. 11,610,587.
EX1032—Excerpts from Microsoft Computer Dictionary, 4th ed, Exhibit—1032, Filed on Jun. 25, 2024—Cited in IPR2024-01031, challenging U.S. Pat. No. 7,049,850.
Ex1032—Petitioners' Oral Hearing Demonstratives, Exhibit—1032, Filed on Apr. 12, 2023—Cited in IPR2022-00253, challenging U.S. Pat. No. 9,491,542.
EX1033—Order Granting Proposed Docket Control Order, Exhibit—1033, Filed on Feb. 9, 2024—Cited in IPR2024-00559, challenging U.S. Pat. No. 11,610,587.
EX1033—Pending from Merriam-Webster's Collegiate Dictionary, 10th Ed, Exhibit—1033, Filed on Jan. 11, 2023—Cited in IPR2022-00281, challenging U.S. Pat. No. 9,270,244.
EX1034—Computer Dictionary 2nd Ed, Exhibit—1034, Filed on Jun. 12, 2024—Cited in IPR2024-01003, challenging U.S. Pat. No. 9,191,083.
EX1034—D Del Statistics, Exhibit—1034, Filed on Feb. 9, 2024—Cited in IPR2024-00559, challenging U.S. Pat. No. 11,610,587.

(56) References Cited

OTHER PUBLICATIONS

EX1034—Pause from Merriam-Webster's Collegiate Dictionary, 10th Ed, Exhibit—1034, Filed on Jan. 11, 2023—Cited in IPR2022-00281, challenging U.S. Pat. No. 9,270,244.
EX1035—Deposition Transcript for Daniel P. Anagnos, Exhibit—1035, Filed on Jan. 10, 2023—Cited in IPR2022-00324, challenging U.S. Pat. No. 8,254,591.
EX1035—File History of U.S. Pat. No. 10,635,382; Exhibit—1035, Filed on Dec. 2, 2022—Cited in IPR2022-00234, challenging U.S. Pat. No. 9,124,982.
EX1035—Letter to Techiya re 587 IPR Stipulation, Exhibit—1035, Filed on Feb. 9, 2024—Cited in IPR2024-00559, challenging U.S. Pat. No. 11,610,587.
EX1035—National Judicial Caseload Profile, Exhibit—1035, Filed on Jun. 25, 2024—Cited in IPR2024-01031, challenging U.S. Pat. No. 7,049,850.
EX1035—Patent Rule 4-3 Joint Claim Construction and Prehearing Statement, E.D. Tx, Exhibit—1035, Filed on Mar. 7, 2023—Cited in IPR2022-00281, challenging U.S. Pat. No. 9,270,244.
EX1035—Tanenbaum Excerpt, Exhibit—1035, Filed on Jun. 12, 2024—Cited in IPR2024-01003, challenging U.S. Pat. No. 9,191,083.
EX1036—Linkedin Profile for Harish Jonnalagadda, Exhibit—1036, Filed on Jan. 10, 2023—Cited in IPR2022-00324, challenging U.S. Pat. No. 8,254,591.
EX1036—Oshana excerpt, Exhibit—1036, Filed on Jun. 12, 2024—Cited in IPR2024-01003, challenging U.S. Pat. No. 9,191,083.
EX1036—Oshana excerpt, Exhibit—1036, Filed on Jun. 12, 2024—Cited in IPR2024-01004, challenging U.S. Pat. No. 9,614,943.
EX1036—Petitioners' Oral Hearing Demonstratives, Exhibit—1036, Filed on Apr. 13, 2023—Cited in IPR2022-00281, challenging U.S. Pat. No. 9,270,244.
EX1036—Stay Order from E.D. Tex., Exhibit—1036, Filed on Nov. 20, 2024—Cited in IPR2024-01031, challenging U.S. Pat. No. 7,049,850.
EX1037—Confidential Settlement Agrement with Exhibits A-I, Exhibit—1037, Filed on Dec. 11, 2024—Cited in IPR2024-00559, challenging U.S. Pat. No. 11,610,587. [Document not publicly available at PTAB].
EX1038—Confidential Settlement Agreement with Exhibits A-I, Exhibit—1038, Filed on Dec. 11, 2024—Cited in IPR2024-01031, challenging U.S. Pat. No. 7,049,850. [Document not publicly available at PTAB].
EX1038—Handbook for Sound Engineers_Part 1 of 2, Exhibit—1038, Filed on Jun. 12, 2024—Cited in IPR2024-01003, challenging U.S. Pat. No. 9,191,083.
EX1038—Handbook for Sound Engineers_Part 2 of 2, Exhibit—1038, Filed on Jun. 12, 2024—Cited in IPR2024-01003, challenging U.S. Pat. No. 9,191,083.
EX1040—IPR2022-00234, Ex 2001, Declaration of Daniel P Anagnos; Exhibit—1040, Filed on Dec. 2, 2022—Cited in IPR2022-00234, challenging U.S. Pat. No. 9,124,982.
EX1041—Nov. 18, 2022, Deposition Transcript of Daniel P Anagnos; Exhibit—1041, Filed on Dec. 2,2022—Cited in IPR2022-00234, challenging U.S. Pat. No. 9,124,982.
EX1041—Supplemental Declaration of Les E. Atlas, Ph.D., Exhibit—1041, Filed on Jan. 10, 2023—Cited in IPR2022-00324, challenging U.S. Pat. No. 8,254,591.
EX1042—Excerpts from the Authoritative Dictionary of IEEE Standards Terms; Exhibit—1042, Filed on Dec. 2, 2022- Cited in IPR2022-00234, challenging U.S. Pat. No. 9,124,982.
Ex1042—Petitioners' Oral Hearing Demonstratives, Exhibit—1042, Filed on Apr. 4, 2023—Cited in IPR2022-00324, challenging U.S. Pat. No. 8,254,591.
EX1043—Institution Decision, IPR2022-00234, Paper 16; Exhibit—1043, Filed on Dec. 2, 2022—Cited in IPR2022-00234, challenging U.S. Pat. No. 9,124,982.
EX1044—Patent Owner Response, IPR2022-00234, Paper 22; Exhibit—1044, Filed on Dec. 2, 2022—Cited in IPR2022-00234, challenging U.S. Pat. No. 9,124,982.

EX1045—Excerpt of Prosecution History of U.S. Appl. 17/483,190, Exhibit—1045, Filed on Jun. 12, 2024—Cited in IPR2024-01003, challenging U.S. Pat. No. 9,191,083.
EX1056—U.S. Pat. 11,710,473 Samsung Infringement Claim Chart, Ex. A-06, Exhibit—1056, Filed on Jun. 12, 2024—Cited in IPR2024-01003, challenging U.S. Pat. No. 9,191,083.
EX1056—U.S. Pat. No. 11,710,473 Samsung Infringement Claim Chart, Ex. A-06, Exhibit—1056, Filed on Jun. 12, 2024—Cited in IPR2024-01004, challenging U.S. Pat. No. 9,614,943.
EX1058—Kuo, Active Noise Control, Exhibit—1058, Filed on Jun. 12, 2024—Cited in IPR2024-01004, challenging U.S. Pat. No. 9,614,943.
Ex1058—Petitioners' Oral Hearing Demonstratives, Exhibit—1058, Filed on Mar. 16, 2023—Cited in IPR2022-00242, challenging U.S. Pat. No. 8,111,839.
Ex1058—Petitioners' Oral Hearing Demonstratives, Exhibit—1058, Filed on Mar. 16, 2023—Cited in IPR2022-00243, challenging U.S. Pat. No. 8,111,839.
EX1059—Stay Order from E.D. Tex., Exhibit—1059, Filed on Nov. 20, 2024—Cited in IPR2024-01003, challenging U.S. Pat. No. 9,191,083.
EX1059—Stay Order from E.D. Tex., Exhibit—1059, Filed on Nov. 20, 2024—Cited in IPR2024-01004, challenging U.S. Pat. No. 9,614,943.
EX1061—Confidential Settlement Agreement with Exhibits A-I, Exhibit—1061, Filed on Dec. 11, 2024—Cited in IPR2024-01004, challenging U.S. Pat. No. 9,614,943. [Document not publicly available at PTAB].
EX1061—Confidential Settlement Agrement with Exhibits A-I, Exhibit—1061, Filed on Dec. 11, 2024—Cited in IPR2024-01003, challenging U.S. Pat. No. 9,191,083. [Document not publicly available at PTAB].
Excerpt from Computer Dictionary, 2d ed., Exhibit—1027, Filed on Dec. 13, 2021—Cited in IPR2022-00242, challenging U.S. Pat. No. 8,111,839.
Excerpt from Computer Dictionary, 2d ed., Exhibit—1027, Filed on Dec. 13, 2021—Cited in IPR2022-00243, challenging U.S. Pat. No. 8,111,839.
Excerpt from Computer Dictionary, 2d ed.; Exhibit—1029, Filed on Dec. 13, 2021—Cited in IPR2022-00234, challenging U.S. Pat. No. 9,124,982.
Excerpt from Dictionary of Scientific and Technical Terms, 5th ed., Exhibit—1026, Filed on Dec. 20, 2021—Cited in IPR2022-00324, challenging U.S. Pat. No. 8,254,591.
Excerpt from McGraw Hill Dictionary of Scientific and Technical Terms, 5th ed., Exhibit—1025, Filed on Dec. 13, 2021—Cited in IPR2022-00242, challenging U.S. Pat. No. 8,111,839.
Excerpt from McGraw-Hill Dictionary of Scientific and Technical Terms, 5th ed., Exhibit—1025, Filed on Dec. 13, 2021—Cited in IPR2022-00243, challenging U.S. Pat. No. 8,111,839.
Excerpt from Oshana; Exhibit—1030, Filed on Dec. 13, 2021—Cited in IPR2022-00234, challenging U.S. Pat. No. 9,124,982.
Excerpt of File History of U.S. Appl. No. 12/100,281; Exhibit—1006, Filed on Dec. 13, 2021—Cited in IPR2022-00234, challenging U.S. Pat. No. 9,124,982.
Excerpt of File History of U.S. Appl. No. 13/352,694; Exhibit—1007, Filed on Dec. 13, 2021—Cited in IPR2022-00234, challenging U.S. Pat. No. 9,124,982.
Excerpts from Federal Court Management Statistics, Exhibit—1022, Filed on Jul. 1, 2022—Cited in IPR2022-00369, challenging U.S. Pat. No. 10,405,082.
Excerpts from Federal Court Management Statistics, Exhibit—1022, Filed on Jul. 1, 2022—Cited in IPR2022-00388, challenging U.S. Pat. No. 10,966,015.
Excerpts from Federal Court Management Statistics, Exhibit—1023, Filed on Jul. 1, 2022—Cited in IPR2022-00410, challenging U.S. Pat. No. 10,979,836.
Excerpts from Federal Court Management Statistics, Exhibit—1024, Filed on Jul. 1, 2022—Cited in IPR2022-00253, challenging U.S. Pat. No. 9,491,542.
Excerpts from Federal Court Management Statistics, Exhibit—1026, Filed on Jul. 1, 2022—Cited in IPR2022-00302, challenging U.S. Pat. No. 9,609,424.

(56) References Cited

OTHER PUBLICATIONS

Excerpts from Federal Court Management Statistics, Exhibit—1028, Filed on Jul. 1, 2022—Cited in IPR2022-00281, challenging U.S. Pat. No. 9,270,244.
Excerpts from Federal Court Management Statistics, Exhibit—1034, Filed on Jul. 1, 2022—Cited in IPR2022-00324, challenging U.S. Pat. No. 8,254,591.
Excerpts from McGraw-Hill Dictionary of Scientific and Technical Terms, 5th ed.; Exhibit—1021, Filed on Dec. 13, 2021—Cited in IPR2022-00234, challenging U.S. Pat. No. 9,124,982.
Excerpts from Openheim, Exhibit—1016, Filed on Jan. 4, 2022—Cited in IPR2022-00388, challenging U.S. Pat. No. 10,966,015.
Excerpts from Oppenheim & Schafer, 3rd ed., Exhibit—1016, Filed on Dec. 30, 2021—Cited in IPR2022-00369, challenging U.S. Pat. No. 10,405,082.
Excerpts from Oshana, Exhibit—1027, Filed on Dec. 20, 2021—Cited in IPR2022-00324, challenging U.S. Pat. No. 8,254,591.
Excerpts from Oshana, Exhibit—1028, Filed on Dec. 13, 2021—Cited in IPR2022-00242, challenging U.S. Pat. No. 8,111,839.
Excerpts from Oshana, Exhibit—1028, Filed on Dec. 13, 2021—Cited in IPR2022-00243, challenging U.S. Pat. No. 8,111,839.
Exhibit 3001, Exhibit—3001, Filed on Jan. 5, 2023—Cited in IPR2022-00282, challenging U.S. Pat. No. 8,315,400.
Exhibit 3001, Exhibit—3001, Filed on Nov. 3, 2022—Cited in IPR2022-01078, challenging U.S. Pat. No. 11,057,701.
Exhibit 3001, Exhibit—3001, Filed on Nov. 3, 2022—Cited in IPR2022-01106, challenging U.S. Pat. No. 11,039,259.
Exhibit 3001, Exhibit—3001, Filed on Apr. 6, 2023—Cited in IPR2022-00369, challenging U.S. Pat. No. 10,405,082.
Expunged, Exhibit—1002, Filed on Jan. 4, 2022—Cited in IPR2022-00388, challenging U.S. Pat. No. 10,966,015. [Document expunged from PTAB record].
Expunged, Exhibit—1006, Filed on Dec. 13, 2021—Cited in IPR2022-00242, challenging U.S. Pat. No. 8,111,839.
Expunged, Exhibit—1006, Filed on Dec. 13, 2021—Cited in IPR2022-00243, challenging U.S. Pat. No. 8,111,839.
Expunged, Exhibit—1031, Filed on Apr. 13, 2023—Cited in IPR2022-00302, challenging U.S. Pat. No. 9,609,424.
Expunged, Exhibit—1036, Filed on Dec. 9, 2024—Cited in IPR2024-00559, challenging U.S. Pat. No. 11,610,587. [Document expunged from PTAB record].
Expunged, Exhibit—1037, Filed on Dec. 9, 2024—Cited in IPR2024-01031, challenging U.S. Pat. No. 7,049,850. [Document expunged from PTAB record].
Expunged, Exhibit—1060, Filed on Dec. 9, 2024—Cited in IPR2024-01003, challenging U.S. Pat. No. 9,191,083. [Document expunged from PTAB record].
Expunged, Exhibit—1060, Filed on Dec. 9, 2024—Cited in IPR2024-01004, challenging U.S. Pat. No. 9,614,943. [Document expunged from PTAB record].
Expunged, Exhibit—11, Filed on Jan.18, 2023—Cited in IPR2022-01099, challenging U.S. Pat. No. 11,244,666. [Document expunged from PTAB record].
Expunged, Exhibit—12, Filed on Jan. 18, 2023—Cited in IPR2022-01098, challenging U.S. Pat. No. 11,217,237. [Document expunged from PTAB record].
Expunged, Exhibit—2008, Filed on Feb. 22, 2023—Cited in IPR2022-00281, challenging U.S. Pat. No. 9,270,244.
Expunged, Exhibit—3, Filed on Dec. 10, 2021—Cited in IPR2022-00282, challenging U.S. Pat. No. 8,315,400. [Document expunged from PTAB record].
Expunged, Exhibit—3, Filed on Jun. 9, 2022—Cited in IPR2022-01098, challenging U.S. Pat. No. 11,217,237. [Document expunged from PTAB record].
Expunged, Exhibit—3002, Filed on Apr. 6, 2023—Cited in IPR2022-00388, challenging U.S. Pat. No. 10,966,015. [Document expunged from PTAB record].
Expunged, Exhibit—37, Filed on Aug. 15, 2023—Cited in IPR2022-00243, challenging U.S. Pat. No. 8,111,839.
Expungedexhibit1017, Dec. 9, 2024—Cited in IPR2024-01033, challenging U.S. Pat. No. 8,434,966. [Document expunged from PTAB record].
Extract from Federal Court Management Statistics, Exhibit—1021, Filed on Nov. 10, 2022—Cited in IPR2022-01099, challenging U.S. Pat. No. 11,244,666.
Extract from Federal Court Management Statistics, Exhibit—1024, Filed on Nov. 10, 2022—Cited in IPR2022-01078, challenging U.S. Pat. No. 11,057,701.
Extract from Federal Court Management Statistics, Exhibit—1027, Filed on Nov. 15, 2022—Cited in IPR2022-01098, challenging U.S. Pat. No. 11,217,237.
Extract from Federal Court Management Statistics, Exhibit—1030, Filed on Nov. 10, 2022—Cited in IPR2022-01106, challenging U.S. Pat. No. 11,039,259.
Federal Court Management Statistics (excerpt), Exhibit—2004, Filed on Jul. 1, 2022—Cited in IPR2022-00253, challenging U.S. Pat. No. 9,491,542.
Federal Court Management Statistics (excerpt), Exhibit—2004, Filed on Jul. 1, 2022—Cited in IPR2022-00281, challenging U.S. Pat. No. 9,270,244.
Federal Court Management Statistics (excerpt), Exhibit—2004, Filed on Jul. 1, 2022—Cited in IPR2022-00302, challenging U.S. Pat. No. 9,609,424.
Federal Court Management Statistics (excerpt), Exhibit—2004, Filed on Jul. 1, 2022—Cited in IPR2022-00324, challenging U.S. Pat. No. 8,254,591.
Federal Court Management Statistics (excerpt), Exhibit—2005, Filed on Jul. 1, 2022—Cited in IPR2022-00369, challenging U.S. Pat. No. 10,405,082.
Federal Court Management Statistics (excerpt), Exhibit—2005, Filed on Jul. 1, 2022—Cited in IPR2022-00410, challenging U.S. Pat. No. 10,979,836.
Federal Court Management Statistics (excerpt), Exhibit—2006, Filed on Jul. 1, 2022—Cited in IPR2022-00388, challenging U.S. Pat. No. 10,966,015.
File History for U.S. Pat. No. 9,491,542, Exhibit—1004, Filed on Dec. 17, 2021—Cited in IPR2022-00253, challenging U.S. Pat. No. 9,491,542.
File History of U.S. Appl. No. 16/168,752, Exhibit—2005, Filed on May 18, 2022—Cited in IPR2022-00388, challenging U.S. Pat. No. 10,966,015.
File History of U.S. Appl. No. 12/555,864, Exhibit—1012, Filed on Jan. 14, 2022—Cited in IPR2022-00410, challenging U.S. Pat. No. 10,979,836.
File History of U.S. Appl. No. 14/054,015, Exhibit—1011, Filed on Jan. 14, 2022—Cited in IPR2022-00410, challenging U.S. Pat. No. 10,979,836.
File History of U.S. Appl. No. 14/827,332, Exhibit—1010, Filed on Jan. 14, 2022—Cited in IPR2022-00410, challenging U.S. Pat. No. 10,979,836.
File History of U.S. Appl. No. 15/700,511, Exhibit—1009, Filed on Jan. 14, 2022—Cited in IPR2022-00410, challenging U.S. Pat. No. 10,979,836.
File History of U.S. Appl. No. 16/414,136, Exhibit—1013, Filed on Jan. 14, 2022—Cited in IPR2022-00410, challenging U.S. Pat. No. 10,979,836.
File History of U.S. Pat. No. 8,111,839, Exhibit—1005, Filed on Dec. 13, 2021—Cited in IPR2022-00242, challenging U.S. Pat. No. 8,111,839.
File History of U.S. Pat. 8,111,839, Exhibit—1005, Filed on 12/13/2021—Cited in IPR2022-00243, challenging U.S. Pat. No. 8,111,839.
File History of U.S. Pat. No. 8,254,591, Exhibit—1004, Filed on Dec. 20, 2021—Cited in IPR2022-00324, challenging U.S. Pat. No. 8,254,591.
File History of U.S. Pat. No. 9,124,982; Exhibit—1004, Filed on Dec. 13, 2021—Cited in IPR2022-00234, challenging U.S. Pat. No. 9,124,982.
File History of U.S. Pat. No. 10,405,082, Exhibit—1004, Filed on Dec. 30, 2021—Cited in IPR2022-00369, challenging U.S. Pat. No. 10,405,082.

(56) References Cited

OTHER PUBLICATIONS

File History of U.S. Pat. No. 10,966,015, Exhibit—1005, Filed on Jan. 4, 2022—Cited in IPR2022-00388, challenging U.S. Pat. No. 10,966,015.
File History of U.S. Pat. No. 10,979,836,, U.S. Appl. No. 16/838,277, Exhibit—1004, Filed on Jan. 14, 2022—Cited in IPR2022-00410, challenging U.S. Pat. No. 10,979,836.
File History of U.S. Pat. No. 8,315,400, Exhibit—1004, Filed on Dec. 10, 2021—Cited in IPR2022-00282, challenging U.S. Pat. No. 8,315,400.
File History of U.S. Pat. No. 8,774,433, Exhibit—1009, Filed on Dec. 21, 2021—Cited in IPR2022-00302, challenging U.S. Pat. No. 9,609,424.
File History of U.S. Pat. No. 9,270,244, Exhibit—1004, Filed on Dec. 21, 2021—Cited in IPR2022-00281, challenging U.S. Pat. No. 9,270,244.
File History of U.S. Pat. No. 9,332,364, Exhibit—1005, Filed on Dec. 21, 2021—Cited in IPR2022-00302, challenging U.S. Pat. No. 9,609,424.
File History of U.S. Pat. No. 9,609,424, Exhibit—1004, Filed on Dec. 21, 2021—Cited in IPR2022-00302, challenging U.S. Pat. No. 9,609,424.
File History of U.S. Appl. No. 60/910,808; Exhibit—1005, Filed on Dec. 13, 2021—Cited in IPR2022-00234, challenging U.S. Pat. No. 9,124,982.
File History of U.S. Appl. No. 61/098,250, Exhibit—1005, Filed on Jan. 14, 2022—Cited in IPR2022-00410, challenging U.S. Pat. No. 10,979,836.
File History of U.S. Appl. No. 60/619,517 (Allen Provisional), Exhibit—1020, Filed on Dec. 21, 2021—Cited in IPR2022-00302, challenging U.S. Pat. No. 9,609,424.
File History of U.S. Appl. No. 60/866,420, Exhibit—1010, Filed on Dec. 21, 2021—Cited in IPR2022-00302, challenging U.S. Pat. No. 9,609,424.
Final Written Decision, IPR2022-00282 (Paper No. 28, Jun. 14, 2023), Exhibit—1035, Filed on Jun. 30, 2023—Cited in IPR2022-01106, challenging U.S. Pat. No. 11,039,259.
Final Written Decision: Final Written Decision Determining All Challenged Claims Unpatentable 35 U.S.C. sec. 318a, Exhibit—32, Filed on Jan. 5, 2024—Cited in IPR2022-01106, challenging U.S. Pat. No. 11,039,259.
Final Written Decision: original, Exhibit—28, Filed on Jun. 14, 2023—Cited in IPR2022-00282, challenging U.S. Pat. No. 8,315,400.
Final Written Decision: original, Exhibit—31, Filed on Jul. 13, 2023—Cited in IPR2022-00281, challenging U.S. Pat. No. 9,270,244.
Final Written Decision: original, Exhibit—33, Filed on Jul. 10, 2023—Cited in IPR2022-00324, challenging U.S. Pat. No. 8,254,591.
Final Written Decision: original, Exhibit—33, Filed on Jul. 14, 2023—Cited in IPR2022-00253, challenging U.S. Pat. No. 9,491,542.
Final Written Decision: original, Exhibit—36, Filed on Jun. 16, 2023—Cited in IPR2022-00242, challenging U.S. Pat. No. 8,111,839.
Final Written Decision: original; Exhibit—29, Filed on Jun. 14, 2023—Cited in IPR2022-00234, challenging U.S. Pat. No. 9,124,982.
Final Written Decision: Judgment Final Written Decision Determining All Challenged Claims Unpatentable 35 U.S. C. § 318(a), Exhibit—35, Filed on Jun. 20, 2023—Cited in IPR2022-00243, challenging U.S. Pat. No. 8,111,839.
First Amended Complaint, Staton Techiya v. Samsung, E.D. Tex., Exhibit—1008, Filed on Dec. 10, 2021—Cited in IPR2022-00282, challenging U.S. Pat. No. 8,315,400.
First Amended Complaint, Techiya v. Samsung, E.D. Tex., Exhibit—1018, Filed on Dec. 21, 2021—Cited in IPR2022-00281, challenging U.S. Pat. No. 9,270,244.
First Amended Complaint, Techiya v. Samsung, E.D. Tex., Exhibit—1020, Filed on Dec. 17, 2021—Cited in IPR2022-00253, challenging U.S. Pat. No. 9,491,542.
First Amended Complaint, Techiya v. Samsung, E.D. Tex., Exhibit—1029, Filed on Dec. 20, 2021—Cited in IPR2022-00324, challenging U.S. Pat. No. 8,254,591.
First Amended Complaint, Techiya v. Samsung, E.D. Tex., Exhibit—1040, Filed on Dec. 13, 2021—Cited in IPR2022-00242, challenging U.S. Pat. No. 8,111,839.
First Amended Complaint, Techiya v. Samsung, E.D. Tex., Exhibit—1040, Filed on Dec. 13, 2021—Cited in IPR2022-00243, challenging U.S. Pat. No. 8,111,839.
First Amended Complaint, Techiya v. Samsung, E.D. Tex.; Exhibit—1031, Filed on Dec. 13, 2021—Cited in IPR2022-00234, challenging U.S. Pat. No. 9,124,982.
Granting Institution of Inter Partes Review 35 U.S.C. § 314, Exhibit—13, Filed on Jul. 15, 2022—Cited in IPR2022-00253, challenging U.S. Pat. No. 9,491,542.
Granting Institution of Inter Partes Review 35 U.S.C. § 314, Exhibit—13, Filed on Jul. 15, 2022—Cited in IPR2022-00281, challenging U.S. Pat. No. 9,270,244.
Granting Institution of Inter Partes Review 35 U.S.C. § 314, Exhibit—13, Filed on Aug. 16, 2022—Cited in IPR2022-00388, challenging U.S. Pat. No. 10,966,015.
Granting Institution of Inter Partes Review 35 U.S.C. § 314, Exhibit—14, Filed on Aug. 16, 2022—Cited in IPR2022-00369, challenging U.S. Pat. No. 10,405,082.
Harman Q&As about Microphone Windscreens, Exhibit—2013, Filed on Sep. 13, 2022—Cited in IPR2022-00242, challenging U.S. Pat. No. 8,111,839.
Harman, Q&As about Microphone Screens; Exhibit—2012, Filed on Sep. 9, 2022—Cited in IPR2022-00234, challenging U.S. Pat. No. 9,124,982.
IEEE Dictionary of Standards Terms (excerpts), Exhibit—2006, Filed on Mar. 21, 2022—Cited in IPR2022-00282, challenging U.S. Pat. No. 8,315,400.
Institution Decision: Deny, Exhibit—12, Filed on Aug. 12, 2022—Cited in IPR2022-00410, challenging U.S. Pat. No. 10,979,836.
Institution Decision: Grant, Exhibit—10, Filed on Jan. 9, 2023—Cited in IPR2022-01106, challenging U.S. Pat. No. 11,039,259.
Institution Decision: Grant, Exhibit—12, Filed on Jun. 17, 2022—Cited in IPR2022-00282, challenging U.S. Pat. No. 8,315,400.
Institution Decision: Grant, Exhibit—13, Filed on Jul. 11, 2022—Cited in IPR2022-00302, challenging U.S. Pat. No. 9,609,424.
Institution Decision: Grant, Exhibit—13, Filed on Jul. 11, 2022—Cited in IPR2022-00324, challenging U.S. Pat. No. 8,254,591.
Institution Decision: Grant, Exhibit—15, Filed on Jun. 21, 2022—Cited in IPR2022-00243, challenging U.S. Pat. No. 8,111,839.
Institution Decision: Grant, Exhibit—16, Filed on Jun. 21, 2022—Cited in IPR2022-00242, challenging U.S. Pat. No. 8,111,839.
Institution Decision: Grant, Exhibit—8, Filed on Aug. 16, 2024—Cited in IPR2024-00559, challenging U.S. Pat. No. 11,610,587.
Institution Decision: Grant; Exhibit—12, Filed on Jun. 17, 2022—Cited in IPR2022-00234, challenging U.S. Pat. No. 9,124,982.
Joint Motion to Consolidate; Exhibit—2005, Filed on Apr. 29, 2022—Cited in IPR2022-00234, challenging U.S. Pat. No. 9,124,982.
Joint Motion to Terminate Proceeding, Exhibit—17, Filed on Dec. 9, 2024—Cited in IPR2024-00559, challenging U.S. Pat. No. 11,610,587.
Joint Request to Treat Settlement Agreement as Business Confidential Information, Exhibit—14, Filed on Dec. 9, 2024—Cited in IPR2024-01003, challenging U.S. Pat. No. 9,191,083.
Joint Request to Treat Settlement Agreement as Business Confidential Information, Exhibit—14, Filed on Dec. 9, 2024—Cited in IPR2024-01004, challenging U.S. Pat. No. 9,614,943.
Joint Request to Treat Settlement Agreement as Business Confidential Information, Exhibit—14, Filed on Dec. 9, 2024—Cited in IPR2024-01031, challenging U.S. Pat. No. 7,049,850.
Joint Request to Treat Settlement Agreement as Business Confidential Information, Exhibit—15, Filed on Dec. 9, 2024—Cited in IPR2024-01034, challenging U.S. Pat. No. 9,279,263.
Joint Request to Treat Settlement Agreement as Business Confidential Information, Exhibit—18, Filed on Dec. 9, 2024—Cited in IPR2024-00559, challenging U.S. Pat. No. 11,610,587.
Joint Request to Treat Settlement Agreement as Business Confidential InformationPaper13, Dec. 9, 2024—Cited in IPR2024-01033, challenging U.S. Pat. No. 8,434,966.

(56) References Cited

OTHER PUBLICATIONS

Joint Statement Regarding Oral Argument, Exhibit—15, Filed on Jul. 29, 2022—Cited in IPR2022-00253, challenging U.S. Pat. No. 9,491,542.
Joint Statement Regarding Oral Argument, Exhibit—15, Filed on Jul. 29, 2022—Cited in IPR2022-00281, challenging U.S. Pat. No. 9,270,244.
Joint Statement Regarding Oral Argument, Exhibit—15, Filed on Jul. 29, 2022—Cited in IPR2022-00302, challenging U.S. Pat. No. 9,609,424.
Joint Statement Regarding Oral Argument, Exhibit—15, Filed on Aug. 24, 2022—Cited in IPR2022-00388, challenging U.S. Pat. No. 10,966,015.
Joint Statement Regarding Oral Argument, Exhibit—16, Filed on Jul. 29, 2022—Cited in IPR2022-00324, challenging U.S. Pat. No. 8,254,591.
Joint Statement Regarding Oral Argument, Exhibit—16, Filed on Aug. 24, 2022—Cited in IPR2022-00369, challenging U.S. Pat. No. 10,405,082.
Joint Statement Regarding Oral Argument, Exhibit—18, Filed on Jul. 29, 2022—Cited in IPR2022-00243, challenging U.S. Pat. No. 8,111,839.
Joint Statement Regarding Oral Argument, Exhibit—19, Filed on Jul. 29, 2022—Cited in IPR2022-00242, challenging U.S. Pat. No. 8,111,839.
Joint Stipulation To Modify Due Dates 1-3, Exhibit—10, Filed on Jul. 25, 2024—Cited in IPR2024-00559, challenging U.S. Pat. No. 11,610,587.
Joint Stipulation To Modify Due Dates 1-3, Exhibit—12, Filed on Nov. 22, 2024—Cited in IPR2024-00559, challenging U.S. Pat. No. 11,610,587.
Joint Stipulation to Modify Scheduling Order, Exhibit—14, Filed on Mar. 14, 2023—Cited in IPR2022-01106, challenging U.S. Pat. No. 11,039,259.
Joint Stipulation to Modify the Scheduling Order, Exhibit—16, Filed on Aug. 16, 2022—Cited in IPR2022-00253, challenging U.S. Pat. No. 9,491,542.
Joint Stipulation to Modify the Scheduling Order, Exhibit—16, Filed on Aug. 16, 2022—Cited in IPR2022-00281, challenging U.S. Pat. No. 9,270,244.
Joint Stipulation to Modify the Scheduling Order, Exhibit—16, Filed on Aug. 16, 2022—Cited in IPR2022-00302, challenging U.S. Pat. No. 9,609,424.
Joint Stipulation to Modify the Scheduling Order, Exhibit—19, Filed on Aug. 16, 2022—Cited in IPR2022-00324, challenging U.S. Pat. No. 8,254,591.
Kleinschmidt Declaration in Support of Patent Owner Response, Exhibit—2018, Filed on Apr. 10, 2023—Cited in IPR2022-01106, challenging U.S. Pat. No. 11,039,259.
LEAP Practitioner Request and Verification Form (Patent Owner), Exhibit—29, Filed on Feb. 28, 2023—Cited in IPR2022-00243, challenging U.S. Pat. No. 8,111,839.
LEAP Practitioner Request and Verification Form (Patent Owner), Exhibit—30, Filed on Feb. 28, 2023—Cited in IPR2022-00242, challenging U.S. Pat. No. 8,111,839.
LEAP Practitioner Request and Verification Form (Petitioner), Exhibit—30, Filed on Mar. 13, 2023—Cited in IPR2022-00243, challenging U.S. Pat. No. 8,111,839.
LEAP Practitioner Request and Verification Form (Petitioner), Exhibit—31, Filed on Mar. 13, 2023—Cited in IPR2022-00242, challenging U.S. Pat. No. 8,111,839.
Letter from Petitioners' Counsel to PO's Counsel 2022-04-20, Exhibit—2004, Filed on May 18, 2022—Cited in IPR2022-00369, challenging U.S. Pat. No. 10,405,082.
Letter from Petitioners' Counsel to PO's Counsel Apr. 20, 2022, Exhibit—2004, Filed on May 18, 2022—Cited in IPR2022-00388, challenging U.S. Pat. No. 10,966,015.
Letter from Petitioners' Counsel to PO's Counsel Apr. 20, 2022, Exhibit—2004, Filed on May 18, 2022—Cited in IPR2022-00410, challenging U.S. Pat. No. 10,979,836.
Markman Hearing Transcript (excerpts), Exhibit—2022, Filed on Oct. 19, 2023—Cited in IPR2022-01106, challenging U.S. Pat. No. 11,039,259.
Mauer, Embedded Indexing, Exhibit—2008, Filed on Sep. 13, 2022—Cited in IPR2022-00242, challenging U.S. Pat. No. 8,111,839.
Mauer, Embedded Indexing: Pros and Cons for the Indexer; Exhibit—2008, Filed on Sep. 9, 2022—Cited in IPR2022-00234, challenging U.S. Pat. No. 9,124,982.
McGraw-Hill Dictionary of Scientific and Technical Terms, Exhibit—2010, Filed on Sep. 13, 2022—Cited in IPR2022-00242, challenging U.S. Pat. No. 8,111,839.
McGraw-Hill Dictionary of Scientific and Technical Terms; Exhibit—2009, Filed on Sep. 9, 2022—Cited in IPR2022-00234, challenging U.S. Pat. No. 9,124,982.
Merriam-Webster's Collegiate Dictionary (excerpt), Exhibit—2010, Filed on Oct. 11, 2022—Cited in IPR2022-01106, challenging U.S. Pat. No. 11,039,259.
Montgomery Declaration with Exhibit A, Exhibit—1018, Filed on Jan. 14, 2022—Cited in IPR2022-00410, challenging U.S. Pat. No. 10,979,836.
Motion for Leave to File Corrected Petition, Exhibit—10, Filed on Jan. 31, 2022—Cited in IPR2022-00242, challenging U.S. Pat. No. 8,111,839.
Motion: Motion to dismiss due to settlement (pre-DI), Exhibit—13, Filed on Dec. 9, 2024—Cited in IPR2024-01003, challenging U.S. Pat. No. 9,191,083.
Motion: Motion to dismiss due to settlement (pre-DI), Exhibit—13, Filed on Dec. 9, 2024—Cited in IPR2024-01004, challenging U.S. Pat. No. 9,614,943.
Motion: Motion to dismiss due to settlement (pre-DI), Exhibit—13, Filed on Dec. 9, 2024—Cited in IPR2024-01031, challenging U.S. Pat. No. 7,049,850.
Motion: Motion to dismiss due to settlement (pre-DI), Exhibit—14, Filed on Dec. 9, 2024—Cited in IPR2024-01034, challenging U.S. Pat. No. 9,279,263.
Motion: Motion to dismiss due to settlement (pre-DI)Paper12, Dec. 9, 2024—Cited in IPR2024-01033, challenging U.S. Pat. No. 8,434,966.
Notice : Mandatory Notice, Exhibit—5, Filed on Jul. 16, 2024—Cited in IPR2024-01031, challenging U.S. Pat. No. 7,049,850.
Notice : Mandatory Notice, Exhibit—6, Filed on Jul. 16, 2024—Cited in IPR2024-01034, challenging U.S. Pat. No. 9,279,263.
Notice : Mandatory Notice, Exhibit—7, Filed on Mar. 1, 2024—Cited in IPR2024-00559, challenging U.S. Pat. No. 11,610,587.
Notice : Other—Notice of Ranking, Exhibit—4, Filed on Jul. 1, 2024—Cited in IPR2024-01034, challenging U.S. Pat. No. 9,279,263.
Notice : Power of Attorney for Harman International Industries, Exhibit—3, Filed on Feb. 9, 2024—Cited in IPR2024-00559, challenging U.S. Pat. No. 11,610,587.
Notice : Power of Attorney for Harman International Industries, Inc., Exhibit—3, Filed on Jun. 25, 2024—Cited in IPR2024-01031, challenging U.S. Pat. No. 7,049,850.
Notice : Power of Attorney for Harman International Industries, Inc., Exhibit—3, Filed on Jul. 1, 2024—Cited in IPR2024-01034, challenging U.S. Pat. No. 9,279,263.
Notice : Power of Attorney for Samsung Electronics America, Exhibit—2, Filed on Feb. 9, 2024—Cited in IPR2024-00559, challenging U.S. Pat. No. 11,610,587.
Notice : Power of Attorney for Samsung Electronics America, Inc., Exhibit—2, Filed on Jun. 12, 2024—Cited in IPR2024-01003, challenging U.S. Pat. No. 9,191,083.
Notice : Power of Attorney for Samsung Electronics America, Inc., Exhibit—2, Filed on Jun. 12, 2024—Cited in IPR2024-01004, challenging U.S. Pat. No. 9,614,943.
Notice : Power of Attorney for Samsung Electronics America, Inc., Exhibit—2, Filed on Jun. 25, 2024—Cited in IPR2024-01031, challenging U.S. Pat. No. 7,049,850.
Notice : Power of Attorney for Samsung Electronics America, Inc., Exhibit—2, Filed on Jul. 1, 2024—Cited in IPR2024-01034, challenging U.S. Pat. No. 9,279,263.
Notice : Power of Attorney for Samsung Electronics America, Inc. Paper2,Jun. 18, 2024—Cited in IPR2024-01033, challenging U.S. Pat. No. 8,434,966.

(56) References Cited

OTHER PUBLICATIONS

Notice : Power of Attorney for Samsung Electronics Co., Ltd., Exhibit—1, Filed on Feb. 9, 2024—Cited in IPR2024-00559, challenging U.S. Pat. No. 11,610,587.
Notice : Power of Attorney for Samsung Electronics Co., Ltd., Exhibit—1, Filed on Jun. 12, 2024—Cited in IPR2024-01003, challenging U.S. Pat. No. 9,191,083.
Notice : Power of Attorney for Samsung Electronics Co., Ltd., Exhibit—1, Filed on Jun. 12, 2024—Cited in IPR2024-01004, challenging U.S. Pat. No. 9,614,943.
Notice : Power of Attorney for Samsung Electronics Co., Ltd., Exhibit—1, Filed on Jul. 1, 2024—Cited in IPR2024-01034, challenging U.S. Pat. No. 9,279,263.
Notice : Power of Attorney for Samsung Electronics Co., Ltd. Paper1,Jun. 18, 2024—Cited in IPR2024-01033, challenging U.S. Pat. No. 8,434,966.
Notice : Power of Attorney for Samsung Electronics Corp., Exhibit—1, Filed on Jun. 25, 2024—Cited in IPR2024-01031, challenging U.S. Pat. No. 7,049,850.
Notice : Power of Attorney, Exhibit—6, Filed on Mar. 1, 2024—Cited in IPR2024-00559, challenging U.S. Pat. No. 11,610,587.
Notice : Power of Attorney, Exhibit—6, Filed on Jul. 16, 2024—Cited in IPR2024-01031, challenging U.S. Pat. No. 7,049,850.
Notice : Power of Attorney, Exhibit—7, Filed on Jul. 16, 2024—Cited in IPR2024-01034, challenging U.S. Pat. No. 9,279,263.
Notice of Deposition of Chris Kyriakakis, Ph.D., Exhibit—17, Filed on Sep. 13, 2022—Cited in IPR2022-00302, challenging U.S. Pat. No. 9,609,424.
Notice of Deposition of Daniel P Anagnos, Exhibit—21, Filed on Dec. 14, 2022—Cited in IPR2022-00324, challenging U.S. Pat. No. 8,254,591.
Notice of Deposition of David Kleinschmidt, Exhibit—20, Filed on Dec. 2, 2022—Cited in IPR2022-00253, challenging U.S. Pat. No. 9,491,542.
Notice of Deposition of David Kleinschmidt, Exhibit—20, Filed on Dec. 2, 2022—Cited in IPR2022-00281, challenging U.S. Pat. No. 9,270,244.
Notice of Deposition of Les E. Atlas, Ph.D., Exhibit—13, Filed on Mar. 9, 2023—Cited in IPR2022-01106, challenging U.S. Pat. No. 11,039,259.
Notice of Deposition of Les E. Atlas, Ph.D., Exhibit—17, Filed on Aug. 8, 2022—Cited in IPR2022-00324, challenging U.S. Pat. No. 8,254,591.
Notice of Deposition of Les E. Atlas, Ph.D., Exhibit—19, Filed on Aug. 4, 2022—Cited in IPR2022-00243, challenging U.S. Pat. No. 8,111,839.
Notice of Deposition of Les E. Atlas, Ph.D., Exhibit—20, Filed on Aug. 4, 2022—Cited in IPR2022-00242, challenging U.S. Pat. No. 8,111,839.
Notice of Deposition of Les E. Atlas, Ph.D.; Exhibit—15, Filed on Aug. 4, 2022—Cited in IPR2022-00234, challenging U.S. Pat. No. 9124982.
Notice of Deposition of Marshall Buck, Exhibit—19, Filed on Dec. 16, 2022—Cited in IPR2022-00388, challenging U.S. Pat. No. 10,966,015.
Notice of Deposition of Marshall Buck, Exhibit—20, Filed on Dec. 16, 2022—Cited in IPR2022-00369, challenging U.S. Pat. No. 10,405,082.
Notice of Deposition of Nathaniel Polish, Ph.D., Exhibit—18, Filed on Sep. 13, 2022—Cited in IPR2022-00253, challenging U.S. Pat. No. 9,491,542.
Notice of Deposition of Nathaniel Polish, Ph.D., Exhibit—18, Filed on Sep. 13, 2022—Cited in IPR2022-00281, challenging U.S. Pat. No. 9,270,244.
Notice of Deposition of Richard M. Stern, Ph.D., Exhibit—13, Filed on Feb. 28, 2023—Cited in IPR2022-01078, challenging U.S. Pat. No. 11,057,701.
Notice of Deposition of Richard M. Stern, Ph.D., Exhibit—14, Filed on Aug. 5, 2022—Cited in IPR2022-00282, challenging U.S. Pat. No. 8,315,400.
Notice of Deposition of Richard M. Stern, Ph.D., Exhibit—17, Filed on Oct. 14, 2022—Cited in IPR2022-00388, challenging U.S. Pat. No. 10,966,015.
Notice of Deposition of Richard M. Stern, Ph.D., Exhibit—18, Filed on Oct. 14, 2022—Cited in IPR2022-00369, challenging U.S. Pat. No. 10,405,082.
Notice of Filing Date Accorded To Petition, Exhibit—5, Filed on Dec. 23, 2021—Cited in IPR2022-00242, challenging U.S. Pat. No. 8,111,839.
Notice of Filing Date Accorded To Petition, Exhibit—5, Filed on Dec. 23, 2021—Cited in IPR2022-00243, challenging U.S. Pat. No. 8,111,839.
Notice of Ranking, Exhibit—4, Filed on Dec. 13, 2021—Cited in IPR2022-00242, challenging U.S. Pat. No. 8,111,839.
Notice of Ranking, Exhibit—4, Filed on Dec. 13, 2021—Cited in IPR2022-00243, challenging U.S. Pat. No. 8,111,839.
Notice of Ranking, Exhibit—4, Filed on Jun. 12, 2024—Cited in IPR2024-01003, challenging U.S. Pat. No. 9,191,083.
Notice of Ranking, Exhibit—4, Filed on Jun. 12, 2024—Cited in IPR2024-01004, challenging U.S. Pat. No. 9,614,943.
Notice Regarding Transcript of Markman Hearing, Exhibit—29, Filed on Oct. 19, 2023—Cited in IPR2022-01106, challenging U.S. Pat. No. 11,039,259.
Notice: Notice filing date accorded, Exhibit—5, Filed on Dec. 21, 2021—Cited in IPR2022-00282, challenging U.S. Pat. No. 8,315,400.
Notice: Notice filing date accorded, Exhibit—5, Filed on Feb. 27, 2024—Cited in IPR2024-00559, challenging U.S. Pat. No. 11,610,587.
Notice: Notice filing date accorded, Exhibit—5, Filed on Jun. 17, 2024—Cited in IPR2024-01003, challenging U.S. Pat. No. 9,191,083.
Notice: Notice filing date accorded, Exhibit—5, Filed on Jun. 18, 2024—Cited in IPR2024-01004, challenging U.S. Pat. No. 9,614,943.
Notice: Notice filing date accorded, Exhibit—6, Filed on Jan. 13, 2022—Cited in IPR2022-00302, challenging U.S. Pat. No. 9,609,424.
Notice: Notice filing date accorded, Exhibit—6, Filed on Jan. 13, 2022—Cited in IPR2022-00324, challenging U.S. Pat. No. 8,254,591.
Notice: Notice filing date accorded, Exhibit—6, Filed on Jan. 18, 2022—Cited in IPR2022-00253, challenging U.S. Pat. No. 9,491,542.
Notice: Notice filing date accorded, Exhibit—6, Filed on Jan. 18, 2022—Cited in IPR2022-00281, challenging U.S. Pat. No. 9,270,244.
Notice: Notice filing date accorded, Exhibit—6, Filed on Feb. 18, 2022—Cited in IPR2022-00410, challenging U.S. Pat. No. 10,979,836.
Notice: Notice filing date accorded, Exhibit—6, Filed on Jul. 7, 2022—Cited in IPR2022-01078, challenging U.S. Pat. No. 11,057,701.
Notice: Notice filing date accorded, Exhibit—6, Filed on Jul. 7, 2022—Cited in IPR2022-01099, challenging U.S. Pat. No. 11,244,666.
Notice: Notice filing date accorded, Exhibit—6, Filed on Jul. 8, 2022—Cited in IPR2022-01106, challenging U.S. Pat. No. 11,039,259.
Notice: Notice filing date accorded, Exhibit—7, Filed on Feb. 18, 2022—Cited in IPR2022-00388, challenging U.S. Pat. No. 10,966,015.
Notice: Notice filing date accorded, Exhibit—7, Filed on Jul. 7, 2022—Cited in IPR2022-01098, challenging U.S. Pat. No. 11,217,237.
Notice: Notice filing date accorded, Exhibit—8, Filed on Feb. 18, 2022—Cited in IPR2022-00369, challenging U.S. Pat. No. 10,405,082.
Notice: Notice filing date accorded, Exhibit—8, Filed on Jul. 24, 2024—Cited in IPR2024-01031, challenging U.S. Pat. No. 7,049,850.
Notice: Notice filing date accorded, Exhibit—9, Filed on Aug. 16, 2024—Cited in IPR2024-01034, challenging U.S. Pat. No. 9,279,263.
Notice: Notice filing date accorded; Exhibit—4, Filed on Dec. 21, 2021—Cited in IPR2022-00234, challenging U.S. Pat. No. 9,124,982.
Notice: Notice filing date accordedPaper4,Jun. 20, 2024—Cited in IPR2024-01033, challenging U.S. Pat. No. 8,434,966.
Notice: refund approved, Exhibit—13, Filed on Mar. 7, 2023—Cited in IPR2022-01099, challenging U.S. Pat. No. 11,244,666.
Notice: refund approved, Exhibit—14, Filed on Jan. 20, 2023—Cited in IPR2022-00410, challenging U.S. Pat. No. 10,979,836.
Notice: refund approved, Exhibit—14, Filed on Mar. 7, 2023—Cited in IPR2022-01098, challenging U.S. Pat. No. 11,217,237.
Notice: refund approved, Exhibit—18, Filed on Dec. 17, 2024—Cited in IPR2024-01003, challenging U.S. Pat. No. 9,191,083.
Notice: refund approved, Exhibit—18, Filed on Dec. 17, 2024—Cited in IPR2024-01004, challenging U.S. Pat. No. 9,614,943.
Notice: refund approved, Exhibit—18, Filed on Dec. 17, 2024—Cited in IPR2024-01031, challenging U.S. Pat. No. 7,049,850.

(56) References Cited

OTHER PUBLICATIONS

Notice: refund approved, Exhibit—19, Filed on Dec. 17, 2024—Cited in IPR2024-01034, challenging U.S. Pat. No. 9,279,263.
Notice: refund approvedPaper17, Dec. 17, 2024—Cited in IPR2024-01033, challenging U.S. Pat. No. 8,434,966.
Olwal 2005, Exhibit—1023, Filed on Dec. 21, 2021—Cited in IPR2022-00281, challenging U.S. Pat. No. 9,270,244.
Order Adopting Claim Construction Order, Exhibit—2015, Filed on Apr. 10, 2023—Cited in IPR2022-01106, challenging U.S. Pat. No. 11,039,259.
Order Clarifying Claim Construction Order, Exhibit—2014, Filed on Apr. 10, 2023v—Cited in IPR2022-01106, challenging U.S. Pat. No. 11,039,259.
Order Conditionally Granting Patent Owner's Motion to Withdraw and Substitute Counsel 37 C.F.R. § 42.10, Exhibit—12, Filed on Dec. 9, 2024—Cited in IPR2024-01003, challenging U.S. Pat. No. 9,191,083.
Order Conditionally Granting Patent Owner's Motion to Withdraw and Substitute Counsel 37 C.F.R. § 42.10, Exhibit—12, Filed on Dec. 9, 2024—Cited in IPR2024-01004, challenging U.S. Pat. No. 9,614,943.
Order Conditionally Granting Patent Owner's Motion to Withdraw and Substitute Counsel 37 C.F.R. § 42.10, Exhibit—12, Filed on Dec. 9, 2024—Cited in IPR2024-01031, challenging U.S. Pat. No. 7,049,850.
Order Conditionally Granting Patent Owner's Motion to Withdraw and Substitute Counsel 37 C.F.R. § 42.10, Exhibit—13, Filed on Dec. 9, 2024—Cited in IPR2024-01034, challenging U.S. Pat. No. 9,279,263.
Order Conditionally Granting Patent Owner's Motion to Withdraw and Substitute Counsel 37 C.F.R. § 42.10Paper11, Dec. 9, 2024—Cited in IPR2024-01033, challenging U.S. Pat. No. 8,434,966.
Order Conditionally Granting Patent Owner's Motion to Withdraw and Substitute Counsel, Exhibit—13, Filed on Dec. 5, 2024—Cited in IPR2024-00559, challenging U.S. Pat. No. 11,610,587.
Order Granting Patent Owner's Motions for Pro Hac Vice Admission of Roy Falik 37 C.F.R. § 42.10(c), Exhibit—9, Filed on Sep. 23, 2024—Cited in IPR2024-01031, challenging U.S. Pat. No. 7,049,850.
Order Trial Hearing 37 C.F.R. 42.70, Exhibit—23, Filed on Feb. 6, 2023—Cited in IPR2022-00282, challenging U.S. Pat. No. 8,315,400.
Order Trial Hearing 37 C.F.R. 42.70; Exhibit—24, Filed on Feb. 6, 2023—Cited in IPR2022-00234, challenging U.S. Pat. No. 9,124,982.
Order Trial Hearing 37 C.F.R. § 42.70, Exhibit—24, Filed on Mar. 1, 2023—Cited in IPR2022-00302, challenging U.S. Pat. No. 9,609,424.
Order Trial Hearing 37 C.F.R. § 42.70, Exhibit—26, Filed on Oct. 10, 2023—Cited in IPR2022-01106, challenging U.S. Pat. No. 11,039,259.
Order Trial Hearing 37 C.F.R. § 42.70, Exhibit—26, Filed on Mar. 1, 2023—Cited in IPR2022-00324, challenging U.S. Pat. No. 8,254,591.
Order Trial Hearing 37 C.F.R. sec 42.70, Exhibit—28, Filed on Feb. 8, 2023—Cited in IPR2022-00243, challenging U.S. Pat. No. 8,111,839.
Order Trial Hearing 37 C.F.R. sec 42.70, Exhibit—29, Filed on Feb. 8, 2023—Cited in IPR2022-00242, challenging U.S. Pat. No. 8,111,839.
Order Trial Hearing, Exhibit—25, Filed on Mar. 1, 2023—Cited in IPR2022-00281, challenging U.S. Pat. No. 9,270,244.
Order Vacating Standing Orders, Exhibit—2005, Filed on Jul. 1, 2022—Cited in IPR2022-00253, challenging U.S. Pat. No. 9,491,542.
Order Vacating Standing Orders, Exhibit—2005, Filed on Jul. 1, 2022—Cited in IPR2022-00281, challenging U.S. Pat. No. 9,270,244.
Order Vacating Standing Orders, Exhibit—2005, Filed on Jul. 1, 2022—Cited in IPR2022-00302, challenging U.S. Pat. No. 9,609,424.
Order Vacating Standing Orders, Exhibit—2005, Filed on Jul. 1, 2022—Cited in IPR2022-00324, challenging U.S. Pat. No. 8,254,591.
Order Vacating Standing Orders, Exhibit—2006, Filed on Jul. 1, 2022—Cited in IPR2022-00369, challenging U.S. Pat. No. 10,405,082.
Order Vacating Standing Orders, Exhibit—2006, Filed on Jul. 1, 2022—Cited in IPR2022-00410, challenging U.S. Pat. No. 10,979,836.
Order Vacating Standing Orders, Exhibit—2007, Filed on Jul. 1, 2022—Cited in IPR2022-00388, challenging U.S. Pat. No. 10,966,015.
Order: Conduct of the Proceeding 37 C.F.R. sec. 42.5, Exhibit—18, Filed on Jan. 5, 2023—Cited in IPR2022-00282, challenging U.S. Pat. No. 8,315,400.
Order: Granting Patent Owner's Motion for Pro Hac Vice Admission of Roy Falik 37 C.F.R. § 42.10, Exhibit—10, Filed on Oct. 4, 2024—Cited in IPR2024-01034, challenging U.S. Pat. No. 9,279,263.
Order: Granting Patent Owner's Motions for Admission Pro Hac Vice of Roy Falik 37 C.F.R. § 42.10, Exhibit—9, Filed on 10/4/2024—Cited in IPR2024-01004, challenging U.S. Pat. No. 9,614,943.
Order: Granting Patent Owner's Motions for Admission Pro Hac Vice of Roy Falik 37 C.F.R. § 42.10Paper8, Oct. 4, 2024—Cited in IPR2024-01033, challenging U.S. Pat. No. 8,434,966.
Order: on Motion, Exhibit—9, Filed on Oct. 4, 2024—Cited in IPR2024-01003, challenging U.S. Pat. No. 9,191,083.
Order: Order Setting Oral Argument 37 C.F.R. § 42.70, Exhibit—22, Filed on Aug. 21, 2023—Cited in IPR2022-01078, challenging U.S. Pat. No. 11,057,701.
Order: Other, Exhibit—12, Filed on Feb. 22, 2023—Cited in IPR2022-01078, challenging U.S. Pat. No. 11,057,701.
Order: Panel Change Order, Exhibit—22, Filed on Feb. 10, 2023—Cited in IPR2022-00253, challenging U.S. Pat. No. 9,491,542.
Order: Scheduling Order, Exhibit—13, Filed on Jun. 17, 2022—Cited in IPR2022-00282, challenging U.S. Pat. No. 8,315,400.
Order: Scheduling Order; Exhibit—13, Filed on Jun. 17, 2022—Cited in IPR2022-00234, challenging U.S. Pat. No. 9,124,982.
Order: Trial Hearing (Revised), Exhibit—27, Filed on Mar. 3, 2023—Cited in IPR2022-00324, challenging U.S. Pat. No. 8,254,591.
Order: Trial Hearing—37 CFR 42.70, Exhibit—26, Filed on Mar. 2, 2023—Cited in IPR2022-00253, challenging U.S. Pat. No. 9,491,542.
Order: Hearing Order, Exhibit—26, Filed on Apr. 7, 2023—Cited in IPR2022-00388, challenging U.S. Pat. No. 10,966,015.
Order: Hearing Order, Exhibit—27, Filed on Apr. 7, 2023—Cited in IPR2022-00369, challenging U.S. Pat. No. 10,405,082.
Order: Trial Hearing (Revised), Exhibit—25, Filed on Mar. 3, 2023—Cited in IPR2022-00302, challenging U.S. Pat. No. 9,609,424.
Osha, Appx A to 1910.95—Noise Exposure Computation, Exhibit—2014, Filed on Sep. 13, 2022—Cited in IPR2022-00242, challenging U.S. Pat. No. 8,111,839.
Osha, Appx A to 1910.95—Noise Exposure Computation; Exhibit—2013, Filed on Sep. 9, 2022—Cited in IPR2022-00234, challenging U.S. Pat. No. 9,124,982.
Oshana, Chapters 3-4, Exhibit—1017, Filed on Jan. 14, 2022—Cited in IPR2022-00410, challenging U.S. Pat. No. 10,979,836.
Other: Hearing transcript, Exhibit—25, Filed on Oct. 16, 2023—Cited in IPR2022-01078, challenging U.S. Pat. No. 11,057,701.
Other: Hearing transcript, Exhibit—27, Filed on Apr. 18, 2023—Cited in IPR2022-00282, challenging U.S. Pat. No. 8,315,400.
Other: Hearing transcript, Exhibit—30, Filed on Jul. 25, 2023—Cited in IPR2022-00388, challenging U.S. Pat. No. 10,966,015.
Other: Hearing transcript, Exhibit—31, Filed on Dec. 13, 2023—Cited in IPR2022-01106, challenging U.S. Pat. No. 11,039,259.
Other: Hearing transcript, Exhibit—31, Filed on Jul. 25, 2023—Cited in IPR2022-00369, challenging U.S. Pat. No. 10,405,082.
Other: Hearing transcript, Exhibit—32, Filed on Jul. 3, 2023—Cited in IPR2022-00324, challenging U.S. Pat. No. 8,254,591.
Other: Hearing transcript, Exhibit—32, Filed on Jul. 31, 2023—Cited in IPR2022-00281, challenging U.S. Pat. No. 9,270,244.
Other: Hearing transcript, Exhibit—32, Filed on Jul. 6, 2023—Cited in IPR2022-00253, challenging U.S. Pat. No. 9,491,542.
Other: Hearing transcript, Exhibit—34, Filed on Jun. 1, 2023—Cited in IPR2022-00243, challenging U.S. Pat. No. 8,111,839.
Other: Hearing transcript, Exhibit—34, Filed on Jun. 22, 2023—Cited in IPR2022-00302, challenging U.S. Pat. No. 9,609,424.
Other: Hearing transcript, Exhibit—35, Filed on Jun. 1, 2023—Cited in IPR2022-00242, challenging U.S. Pat. No. 8,111,839.
Other: Hearing transcript, Exhibit—36, Filed on Jul. 6, 2023—Cited in IPR2022-00302, challenging U.S. Pat. No. 9,609,424.
Other: Hearing transcript; Exhibit—28, Filed on Apr. 18, 2023—Cited in IPR2022-00234, challenging U.S. Pat. No. 9,124,982.
Other: Order Granting Motion for Leave to File Corrected Petition, Exhibit—10, Filed on Feb. 2, 2022—Cited in IPR2022-00243, challenging U.S. Pat. No. 8,111,839.

(56) References Cited

OTHER PUBLICATIONS

Other: Order Granting Motion for Leave to File Corrected Petition, Exhibit—11, Filed on Feb. 2, 2022—Cited in IPR2022-00242, challenging U.S. Pat. No. 8,111,839.
Other: Fed Circuit mandate, Exhibit—34, Filed on Jun. 27, 2024—Cited in IPR2022-01106, challenging U.S. Pat. No. 11,039,259.
Other: Fed Circuit mandate, Exhibit—36, Filed on Jun. 27, 2024—Cited in IPR2022-00324, challenging U.S. Pat. No. 8,254,591.
Oxford Dictionary of Elecs and Electrical Eng (excerpts), Exhibit—2005, Filed on Mar. 21, 2022—Cited in IPR2022-00282, challenging U.S. Pat. No. 8,315,400.
P.R. 4-5(d) Joint Claim Construction Chart, Exhibit—2009, Filed on Feb. 22, 2023—Cited in IPR2022-00253, challenging U.S. Pat. No. 9,491,542.
P.R. 4-5(d) Joint Claim Construction Chart, Exhibit—2009, Filed on Feb. 22, 2023—Cited in IPR2022-00281, challenging U.S. Pat. No. 9,270,244.
Panel Change Order, Exhibit—12, Filed on Feb. 3, 2023—Cited in IPR2022-01106, challenging U.S. Pat. No. 11,039,259.
Patent Owner Brief Regarding Interim Procedure for Discretionary Denials, Exhibit—12, Filed on Jul. 1, 2022—Cited in IPR2022-00253, challenging U.S. Pat. No. 9,491,542.
Patent Owner Response; Exhibit—17, Filed on Sep. 9, 2022—Cited in IPR2022-00234, challenging U.S. Pat. No. 9,124,982.
Patent Owner Stanton Techiya LLC's Mandatory NoticePaper6,Jul. 3, 2024—Cited in IPR2024-01033, challenging U.S. Pat. No. 8,434,966.
Patent Owner Staton Techiya, LLC's Mandatory Notice, Exhibit—7, Filed on Jul. 3, 2024—Cited in IPR2024-01004, challenging U.S. Pat. No. 9,614,943.
Patent Owner Staton Techiya, LLC's Mandatory Notices, Exhibit—7, Filed on Jul. 3, 2024—Cited in IPR2024-01003, challenging U.S. Pat. No. 9,191,083.
Patent Owner Staton Techiya, LLC's Motion for the Pro Hac Vice Admission of Roy Falik, Exhibit—8, Filed on Jul. 5, 2024—Cited in IPR2024-01003, challenging U.S. Pat. No. 9,191,083.
Patent Owner Staton Techiya, LLC's Motion for the Pro Hac Vice Admission of Roy Falik, Exhibit—8, Filed on Jul. 5, 2024—Cited in IPR2024-01004, challenging U.S. Pat. No. 9,614,943.
Patent Owner Staton Techiya, LLC's Motion for the Pro Hac Vice Admission of Roy FalikPaper7,Jul. 5, 2024—Cited in IPR2024-01033, challenging U.S. Pat. No. 8,434,966.
Patent Owner Staton Techiya, LLC's Power of Attorney, Exhibit—6, Filed on Jul. 3, 2024—Cited in IPR2024-01003, challenging U.S. Pat. No. 9,191,083.
Patent Owner Staton Techiya, LLC's Power of Attorney, Exhibit—6, Filed on Jul. 3, 2024—Cited in IPR2024-01004, challenging U.S. Pat. No. 9,614,943.
Patent Owner Staton Techiya, LLC's Power of AttorneyPaper5,Jul. 3, 2024—Cited in IPR2024-01033, challenging U.S. Pat. No. 8,434,966.
Patent Owner's Brief Regarding Interim Procedure for Discretionary Denials, Exhibit—11, Filed on Jul. 1, 2022—Cited in IPR2022-00410, challenging U.S. Pat. No. 10,979,836.
Patent Owner's Brief Regarding Interim Procedure for Discretionary Denials, Exhibiter—12, Filed on Jul. 1, 2022—Cited in IPR2022-00281, challenging U.S. Pat. No. 9,270,244.
Patent Owner's Brief Regarding Interim Procedure for Discretionary Denials, Exhibit—12, Filed on Jul. 1, 2022—Cited in IPR2022-00302, challenging U.S. Pat. No. 9,609,424.
Patent Owner's Brief Regarding Interim Procedure for Discretionary Denials, Exhibit—12, Filed on Jul. 1, 2022—Cited in IPR2022-00324, challenging U.S. Pat. No. 8,254,591.
Patent Owner's Brief Regarding Interim Procedure for Discretionary Denials, Exhibit—12, Filed on Jul. 1, 2022—Cited in IPR2022-00388, challenging U.S. Pat. No. 10,966,015.
Patent Owner's Brief Regarding Interim Procedure for Discretionary Denials, Exhibit—13, Filed on Jul. 1, 2022—Cited in IPR2022-00369, challenging U.S. Pat. No. 10,405,082.
Patent Owner's Corrected Notice of Appeal, Exhibit—38, Filed on Aug. 15, 2023—Cited in IPR2022-00243, challenging U.S. Pat. No. 8,111,839.
Patent Owner's Demonstratives, Exhibit—2008, Filed on Apr. 11, 2023—Cited in IPR2022-00302, challenging U.S. Pat. No. 9,609,424.
Patent Owner's Demonstratives, Exhibit—2010, Filed on Apr. 12, 2023—Cited in IPR2022-00253, challenging U.S. Pat. No. 9,491,542.
Patent Owner's Demonstratives, Exhibit—2010, Filed on Apr. 13, 2023—Cited in IPR2022-00281, challenging U.S. Pat. No. 9,270,244.
Patent Owner's Demonstratives, Exhibit—2010, Filed on Apr. 4, 2023—Cited in IPR2022-00324, challenging U.S. Pat. No. 8,254,591.
Patent Owner's Demonstratives, Exhibit—2012, Filed on May 9, 2023—Cited in IPR2022-00369, challenging U.S. Pat. No. 10,405,082.
Patent Owner's Demonstratives, Exhibit—2012, Filed on May 9, 2023—Cited in IPR2022-00388, challenging U.S. Pat. No. 10,966,015.
Patent Owner's Demonstratives, Exhibit—2014, Filed on Mar. 14, 2023—Cited in IPR2022-00282, challenging U.S. Pat. No. 8,315,400.
Patent Owner's Demonstratives, Exhibit—2014, Filed on Sep. 25, 2023—Cited in IPR2022-01078, challenging U.S. Pat. No. 11,057,701.
Patent Owner's Demonstratives, Exhibit—2015, Filed on Mar. 16, 2023—Cited in IPR2022-00242, challenging U.S. Pat. No. 8,111,839.
Patent Owner's Demonstratives, Exhibit—2015, Filed on Mar. 16, 2023—Cited in IPR2022-00243, challenging U.S. Pat. No. 8,111,839.
Patent Owner's Demonstratives, Exhibit—2021, Filed on Oct. 11, 2023—Cited in IPR2022-01106, challenging U.S. Pat. No. 11,039,259.
Patent Owner's Demonstratives; Exhibit—2014, Filed on Mar. 14, 2023—Cited in IPR2022-00234, challenging U.S. Pat. No. 9,124,982.
Patent Owner's Mandatory Notice under 37 C.F.R. 42.8, Exhibit—5, Filed on Jan. 19, 2022—Cited in IPR2022-00388, challenging U.S. Pat. No. 10,966,015.
Patent Owner's Mandatory Notice under 37 C.F.R. 42.8, Exhibit—5, Filed on Jan. 19, 2022—Cited in IPR2022-00410, challenging U.S. Pat. No. 10,979,836.
Patent Owner's Mandatory Notice under 37 C.F.R. 42.8, Exhibit—5, Filed on Dec. 28, 2021—Cited in IPR2022-00253, challenging U.S. Pat. No. 9,491,542.
Patent Owner's Mandatory Notice under 37 C.F.R. 42.8, Exhibit—5, Filed on Dec. 28, 2021—Cited in IPR2022-00281, challenging U.S. Pat. No. 9,270,244.
Patent Owner's Mandatory Notice under 37 C.F.R. 42.8, Exhibit—5, Filed on Dec. 28, 2021—Cited in IPR2022-00302, challenging U.S. Pat. No. 9,609,424.
Patent Owner's Mandatory Notice under 37 C.F.R. 42.8, Exhibit—5, Filed on Dec. 28, 2021—Cited in IPR2022-00324, challenging U.S. Pat. No. 8,254,591.
Patent Owner's Mandatory Notice under 37 C.F.R. 42.8, Exhibit—5, Filed on Jun. 22, 2022—Cited in IPR2022-01078, challenging U.S. Pat. No. 11,057,701.
Patent Owner's Mandatory Notice under 37 C.F.R. 42.8, Exhibit—5, Filed on Jun. 22, 2022—Cited in IPR2022-01099, challenging U.S. Pat. No. 11,244,666.
Patent Owner's Mandatory Notice under 37 C.F.R. 42.8, Exhibit—5, Filed on Jun. 22, 2022—Cited in IPR2022-01106, challenging U.S. Pat. No. 11,039,259.
Patent Owner's Mandatory Notice under 37 C.F.R. 42.8, Exhibit—6, Filed on Jun. 22, 2022—Cited in IPR2022-01098, challenging U.S. Pat. No. 11,217,237.
Patent Owner's Mandatory Notice under 37 C.F.R. 42.8, Exhibit—7, Filed on Dec. 28, 2021—Cited in IPR2022-00242, challenging U.S. Pat. No. 8,111,839.
Patent Owner's Mandatory Notice under 37 C.F.R. 42.8, Exhibit—7, Filed on Dec. 28, 2021—Cited in IPR2022-00243, challenging U.S. Pat. No. 8,111,839.
Patent Owner's Mandatory Notice under 37 C.F.R. 42.8, Exhibit—7, Filed on Dec. 28, 2021—Cited in IPR2022-00282, challenging U.S. Pat. No. 8,315,400.
Patent Owner's Mandatory Notice under 37 C.F.R. 42.8; Exhibit—6, Filed on Dec. 28, 2021—Cited in IPR2022-00234, challenging U.S. Pat. No. 9,124,982.
Patent Owner's Mandatory Notice under 37 CFR 42.8, Exhibit—6, Filed on Jan. 19, 2022—Cited in IPR2022-00369, challenging U.S. Pat. No. 10,405,082.
Patent Owner's Notice of Appeal, Exhibit—30, Filed on Aug. 11, 2023—Cited in IPR2022-00282, challenging U.S. Pat. No. 8,315,400.
Patent Owner's Notice of Appeal, Exhibit—33, Filed on Mar. 5, 2024—Cited in IPR2022-01106, challenging U.S. Pat. No. 11,039,259.

(56) References Cited

OTHER PUBLICATIONS

Patent Owner's Notice of Appeal, Exhibit—33, Filed on Sep. 8, 2023—Cited in IPR2022-00281, challenging U.S. Pat. No. 9,270,244.
Patent Owner's Notice of Appeal, Exhibit—34, Filed on Sep. 8, 2023—Cited in IPR2022-00253, challenging U.S. Pat. No. 9,491,542.
Patent Owner's Notice of Appeal, Exhibit—34, Filed on Sep. 8, 2023—Cited in IPR2022-00324, challenging U.S. Pat. No. 8,254,591.
Patent Owner's Notice of Appeal, Exhibit—38, Filed on Aug. 15, 2023—Cited in IPR2022-00242, challenging U.S. Pat. No. 8,111,839.
Patent Owner's Notice of Appeal; Exhibit—31, Filed on Aug. 11, 2023—Cited in IPR2022-00234, challenging U.S. Pat. No. 9,124,982.
Patent Owner's Notice of Cross-Appeal, Exhibit—39, Filed on Aug. 23, 2023—Cited in IPR2022-00302, challenging U.S. Pat. No. 9,609,424.
Patent Owner's Power of Attorney, Exhibit—4, Filed on Jan. 19, 2022—Cited in IPR2022-00388, challenging U.S. Pat. No. 10,966,015.
Patent Owner's Power of Attorney, Exhibit—4, Filed on Jan. 19, 2022—Cited in IPR2022-00410, challenging U.S. Pat. No. 10,979,836.
Patent Owner's Power of Attorney, Exhibit—4, Filed on Dec. 28, 2021—Cited in IPR2022-00253, challenging U.S. Pat. No. 9,491,542.
Patent Owner's Power of Attorney, Exhibit—4, Filed on Dec. 28, 2021—Cited in IPR2022-00281, challenging U.S. Pat. No. 9,270,244.
Patent Owner's Power of Attorney, Exhibit—4, Filed on Dec. 28, 2021—Cited in IPR2022-00302, challenging U.S. Pat. No. 9,609,424.
Patent Owner's Power of Attorney, Exhibit—4, Filed on Dec. 28, 2021—Cited in IPR2022-00324, challenging U.S. Pat. No. 8,254,591.
Patent Owner's Power of Attorney, Exhibit—4, Filed on Jun. 22, 2022—Cited in IPR2022-01078, challenging U.S. Pat. No. 11,057,701.
Patent Owner's Power of Attorney, Exhibit—4, Filed on Jun. 22, 2022—Cited in IPR2022-01099, challenging U.S. Pat. No. 11,244,666.
Patent Owner's Power of Attorney, Exhibit—4, Filed on Jun. 22, 2022—Cited in IPR2022-01106, challenging U.S. Pat. No. 11,039,259.
Patent Owner's Power of Attorney, Exhibit—5, Filed on Jun. 19, 2022—Cited in IPR2022-00369, challenging U.S. Pat. No. 10,405,082.
Patent Owner's Power of Attorney, Exhibit—5, Filed on Jun. 22, 2022—Cited in IPR2022-01098, challenging U.S. Pat. No. 11,217,237.
Patent Owner's Power of Attorney, Exhibit—6, Filed on Dec. 28, 2021—Cited in IPR2022-00242, challenging U.S. Pat. No. 8,111,839.
Patent Owner's Power of Attorney, Exhibit—6, Filed on Dec. 28, 2021—Cited in IPR2022-00243, challenging U.S. Pat. No. 8,111,839.
Patent Owner's Power of Attorney, Exhibit—6, Filed on Dec. 28, 2021—Cited in IPR2022-00282, challenging U.S. Pat. No. 8,315,400.
Patent Owner's Power of Attorney; Exhibit—5, Filed on Dec. 28, 2021—Cited in IPR2022-00234, challenging U.S. Pat. No. 9,124,982.
Patent Owner's Preliminary Response, Exhibit—12, Filed on Mar. 23, 2022—Cited in IPR2022-00243, challenging U.S. Pat. No. 8,111,839.
Patent Owner's Preliminary Response, Exhibit—13, Filed on Mar. 23, 2022—Cited in IPR2022-00242, challenging U.S. Pat. No. 8,111,839.
Patent Owner's Preliminary Response, Exhibit—7, Filed on Oct. 11, 2022—Cited in IPR2022-01106, challenging U.S. Pat. No. 11,039,259.
Patent Owner's Preliminary Response, Exhibit—7, Filed on Oct. 7, 2022—Cited in IPR2022-01078, challenging U.S. Pat. No. 11,057,701.
Patent Owner's Preliminary Response, Exhibit—7, Filed on Oct. 7, 2022—Cited in IPR2022-01099, challenging U.S. Pat. No. 11,244,666.
Patent Owner's Preliminary Response, Exhibit—7, Filed on May 18, 2022—Cited in IPR2022-00410, challenging U.S. Pat. No. 10,979,836.
Patent Owner's Preliminary Response, Exhibit—8, Filed on Oct. 7, 2022—Cited in IPR2022-01098, challenging U.S. Pat. No. 11,217,237.
Patent Owner's Preliminary Response, Exhibit—8, Filed on Apr. 13, 2022—Cited in IPR2022-00302, challenging U.S. Pat. No. 9,609,424.
Patent Owner's Preliminary Response, Exhibit—8, Filed on Apr. 13, 2022—Cited in IPR2022-00324, challenging U.S. Pat. No. 8,254,591.
Patent Owner's Preliminary Response, Exhibit—8, Filed on Apr. 18, 2022—Cited in IPR2022-00253, challenging U.S. Pat. No. 9,491,542.
Patent Owner's Preliminary Response, Exhibit—8, Filed on Apr. 18, 2022—Cited in IPR2022-00281, challenging U.S. Pat. No. 9,270,244.
Patent Owner's Preliminary Response, Exhibit—8, Filed on May 18, 2022—Cited in IPR2022-00388, challenging U.S. Pat. No. 10,966,015.
Patent Owner's Preliminary Response, Exhibit—9, Filed on Mar. 21, 2022—Cited in IPR2022-00282, challenging U.S. Pat. No. 8,315,400.
Patent Owner's Preliminary Response, Exhibit—9, Filed on May 18, 2022—Cited in IPR2022-00369, challenging U.S. Pat. No. 10,405,082.
Patent Owner's Preliminary Response; Exhibit—9, Filed on Mar. 21, 2022—Cited in IPR2022-00234, challenging U.S. Pat. No. 9,124,982.
Patent Owner's Preliminary Sur-Reply, Exhibit—10, Filed on Nov. 22, 2022—Cited in IPR2022-01098, challenging U.S. Pat. No. 11,217,237.
Patent Owner's Preliminary Sur-Reply, Exhibit—10, Filed on May 19, 2022—Cited in IPR2022-00302, challenging U.S. Pat. No. 9,609,424.
Patent Owner's Preliminary Sur-Reply, Exhibit—10, Filed on May 20, 2022—Cited in IPR2022-00324, challenging U.S. Pat. No. 8,254,591.
Patent Owner's Preliminary Sur-Reply, Exhibit—10, Filed on May 31, 2022—Cited in IPR2022-00253, challenging U.S. Pat. No. 9,491,542.
Patent Owner's Preliminary Sur-Reply, Exhibit—10, Filed on Jun. 23, 2022—Cited in IPR2022-00388, challenging U.S. Pat. No. 10,966,015.
Patent Owner's Preliminary Sur-Reply, Exhibit—10, Filed on Jun. 7, 2022—Cited in IPR2022-00281, challenging U.S. Pat. No. 9,270,244.
Patent Owner's Preliminary Sur-Reply, Exhibit—11, Filed on Apr. 29, 2022—Cited in IPR2022-00282, challenging U.S. Pat. No. 8,315,400.
Patent Owner's Preliminary Sur-Reply, Exhibit—11, Filed on Jun. 23, 2022—Cited in IPR2022-00369, challenging U.S. Pat. No. 10,405,082.
Patent Owner's Preliminary Sur-Reply, Exhibit—14, Filed on Apr. 29, 2022—Cited in IPR2022-00243, challenging U.S. Pat. No. 8,111,839.
Patent Owner's Preliminary Sur-Reply, Exhibit—15, Filed on Apr. 29, 2022—Cited in IPR2022-00242, challenging U.S. Pat. No. 8,111,839.
Patent Owner's Preliminary Sur-Reply, Exhibit—9, Filed on Nov. 17, 2022—Cited in IPR2022-01099, challenging U.S. Pat. No. 11,244,666.
Patent Owner's Preliminary Sur-Reply, Exhibit—9, Filed on Nov. 18, 2022—Cited in IPR2022-01078, challenging U.S. Pat. No. 11,057,701.
Patent Owner's Preliminary Sur-Reply, Exhibit—9, Filed on Nov. 18, 2022—Cited in IPR2022-01106, challenging U.S. Pat. No. 11,039,259.
Patent Owner's Preliminary Sur-Reply, Exhibit—9, Filed on Jun. 23, 2022—Cited in IPR2022-00410, challenging U.S. Pat. No. 10,979,836.
Patent Owner's Preliminary Sur-Reply; Exhibit—11, Filed on Apr. 29, 2022—Cited in IPR2022-00234, challenging U.S. Pat. No. 9,124,982.
Patent Owner's Request for Oral Argument, Exhibit—21, Filed on Feb. 3, 2023—Cited in IPR2022-00282, challenging U.S. Pat. No. 8,315,400.
Patent Owner's Request for Oral Argument, Exhibit—21, Filed on Aug. 17, 2023—Cited in IPR2022-01078, challenging U.S. Pat. No. 11,057,701.
Patent Owner's Request for Oral Argument, Exhibit—22, Filed on Feb. 28, 2023—Cited in IPR2022-00302, challenging U.S. Pat. No. 9,609,424.
Patent Owner's Request for Oral Argument, Exhibit—23, Filed on Mar. 1, 2023—Cited in IPR2022-00281, challenging U.S. Pat. No. 9,270,244.

(56) References Cited

OTHER PUBLICATIONS

Patent Owner's Request for Oral Argument, Exhibit—24, Filed on Feb. 28, 2023—Cited in IPR2022-00324, challenging U.S. Pat. No. 8,254,591.
Patent Owner's Request for Oral Argument, Exhibit—24, Filed on Mar. 1, 2023—Cited in IPR2022-00253, challenging U.S. Pat. No. 9,491,542.
Patent Owner's Request for Oral Argument, Exhibit—24, Filed on Apr. 4, 2023—Cited in IPR2022-00388, challenging U.S. Pat. No. 10,966,015.
Patent Owner's Request for Oral Argument, Exhibit—25, Filed on Apr. 4, 2023—Cited in IPR2022-00369, challenging U.S. Pat. No. 10,405,082.
Patent Owner's Request for Oral Argument, Exhibit—25, Filed on Aug. 28, 2023—Cited in IPR2022-01106, challenging U.S. Pat. No. 11,039,259.
Patent Owner's Request for Oral Argument, Exhibit—26, Filed on Feb. 7, 2023—Cited in IPR2022-00243, challenging U.S. Pat. No. 8,111,839.
Patent Owner's Request for Oral Argument, Exhibit—27, Filed on Feb. 7, 2023—Cited in IPR2022-00242, challenging U.S. Pat. No. 8,111,839.
Patent Owner's Request for Oral Argument; Exhibit—22, Filed on Feb. 3, 2023—Cited in IPR2022-00234, challenging U.S. Pat. No. 9,124,982.
Patent Owner's Response, Exhibit—14, Filed on Mar. 23, 2023—Cited in IPR2022-01078, challenging U.S. Pat. No. 11,057,701.
Patent Owner's Response, Exhibit—15, Filed on Sep. 9, 2022—Cited in IPR2022-00282, challenging U.S. Pat. No. 8,315,400.
Patent Owner's Response, Exhibit—16, Filed on Dec. 6, 2024—Cited in IPR2024-00559, challenging U.S. Pat. No. 11,610,587.
Patent Owner's Response, Exhibit—17, Filed on Apr. 10, 2023—Cited in IPR2022-01106, challenging U.S. Pat. No. 11,039,259.
Patent Owner's Response, Exhibit—18, Filed on Oct. 17, 2022—Cited in IPR2022-00302, challenging U.S. Pat. No. 9,609,424.
Patent Owner's Response, Exhibit—18, Filed on Nov. 8, 2022—Cited in IPR2022-00388, challenging U.S. Pat. No. 10,966,015.
Patent Owner's Response, Exhibit—19, Filed on Oct. 19, 2022—Cited in IPR2022-00253, challenging U.S. Pat. No. 9,491,542.
Patent Owner's Response, Exhibit—19, Filed on Oct. 19, 2022—Cited in IPR2022-00281, challenging U.S. Pat. No. 9,270,244.
Patent Owner's Response, Exhibit—19, Filed on Nov. 8, 2022—Cited in IPR2022-00369, challenging U.S. Pat. No. 10,405,082.
Patent Owner's Response, Exhibit—20, Filed on Oct. 17, 2022—Cited in IPR2022-00324, challenging U.S. Pat. No. 8,254,591.
Patent Owner's Response, Exhibit—21, Filed on Sep. 13, 2022—Cited in IPR2022-00243, challenging U.S. Pat. No. 8,111,839.
Patent Owner's Response, Exhibit—22, Filed on Sep. 13, 2022—Cited in IPR2022-00242, challenging U.S. Pat. No. 8,111,839.
Patent Owner's Sur-Reply, Exhibit—19, Filed on Jan. 12, 2023—Cited in IPR2022-00282, challenging U.S. Pat. No. 8,315,400.
Patent Owner's Sur-Reply, Exhibit—19, Filed on Jul. 26, 2023—Cited in IPR2022-01078, challenging U.S. Pat. No. 11,057,701.
Patent Owner's Sur-Reply, Exhibit—21, Filed on Feb. 21, 2023—Cited in IPR2022-00302, challenging U.S. Pat. No. 9,609,424.
Patent Owner's Sur-Reply, Exhibit—22, Filed on Feb. 22, 2023—Cited in IPR2022-00281, challenging U.S. Pat. No. 9,270,244.
Patent Owner's Sur-Reply, Exhibit—22, Filed on Mar. 13, 2023—Cited in IPR2022-00388, challenging U.S. Pat. No. 10,966,015.
Patent Owner's Sur-Reply, Exhibit—23, Filed on Feb. 20, 2023—Cited in IPR2022-00324, challenging U.S. Pat. No. 8,254,591.
Patent Owner's Sur-Reply, Exhibit—23, Filed on Feb. 22, 2023—Cited in IPR2022-00253, challenging U.S. Pat. No. 9,491,542.
Patent Owner's Sur-Reply, Exhibit—23, Filed on Mar. 13, 2023—Cited in IPR2022-00369, challenging U.S. Pat. No. 10,405,082.
Patent Owner's Sur-Reply, Exhibit—23, Filed on Aug. 14, 2023—Cited in IPR2022-01106, challenging U.S. Pat. No. 11,039,259.
Patent Owner's Sur-Reply, Exhibit—25, Filed on Jan. 17, 2023—Cited in IPR2022-00243, challenging U.S. Pat. No. 8,111,839.
Patent Owner's Sur-Reply, Exhibit—26, Filed on Jan. 12, 2023—Cited in IPR2022-00242, challenging U.S. Pat. No. 8,111,839.
Patent Owner's Sur-Reply; Exhibit—21, Filed on Jan. 13, 2023—Cited in IPR2022-00234, challenging U.S. Pat. No. 9,124,982.
Patent Owner's Unopposed Motion To Withdraw and Substitute Counsel Under 37 CFR 11.116, Exhibit—11, Filed on Nov. 13, 2024—Cited in IPR2024-00559, challenging U.S. Pat. No. 11,610,587.
Patent Owner's Unopposed Motion to Withdraw and Substitute Counsel Under 37 CFR 11.116, Exhibit—11, Filed on Nov. 21, 2024—Cited in IPR2024-01003, challenging U.S. Pat. No. 9,191,083.
Patent Owner's Unopposed Motion To Withdraw and Substitute Counsel Under 37 CFR 11.116, Exhibit—11, Filed on Nov. 21, 2024—Cited in IPR2024-01004, challenging U.S. Pat. No. 9,614,943.
Patent Owner's Unopposed Motion To Withdraw and Substitute Counsel Under 37 CFR 11.116, Exhibit—11, Filed on Nov. 21, 2024—Cited in IPR2024-01031, challenging U.S. Pat. No. 7,049,850.
Patent Owner's Unopposed Motion To Withdraw and Substitute Counsel Under 37 CFR 11.116, Exhibit—12, Filed on Nov. 21, 2024—Cited in IPR2024-01034, challenging U.S. Pat. No. 9,279,263.
Patent Owner's Unopposed Motion To Withdraw and Substitute Counsel Under 37 CFR 11.116Paper10, Nov. 21, 2024—Cited in IPR2024-01033, challenging U.S. Pat. No. 8,434,966.
Patent Owner's Updated Exhibit List, Exhibit—23, Filed on Sep. 25, 2023—Cited in IPR2022-01078, challenging U.S. Pat. No. 11,057,701.
Patent Owner's Updated Mandatory Notice under 37 C.F.R. 42.8, Exhibit—15, Filed on Jul. 27, 2022—Cited in IPR2022-00324, challenging U.S. Pat. No. 8,254,591.
Patent Owner's Updated Mandatory Notice under 37 C.F.R. 42.8, Exhibit—17, Filed on Jul. 27, 2022—Cited in IPR2022-00243, challenging U.S. Pat. No. 8,111,839.
Patent Owner's Updated Mandatory Notice under 37 C.F.R. 42.8, Exhibit—18, Filed on Jul. 27, 2022—Cited in IPR2022-00242, challenging U.S. Pat. No. 8,111,839.
Patent Owner's Updated Mandatory Notice under 37 C.F.R. 42.8, Exhibit—8, Filed on Dec. 28, 2021—Cited in IPR2022-00242, challenging U.S. Pat. No. 8,111,839.
Patent Owner's Updated Mandatory Notice under 37 C.F.R. 42.8; Exhibit—14, Filed on Jul. 27, 2022—Cited in IPR2022-00234, challenging U.S. Pat. No. 9,124,982.
Patent Owner's Updated Mandatory Notice under 37 C.F.R. 42.8; Exhibit—7, Filed on Dec. 28, 2021—Cited in IPR2022-00234, challenging U.S. Pat. No. 9,124,982.
Patent Owner's Updated Mandatory Notice, Exhibit—17, Filed on Sep. 13, 2022—Cited in IPR2022-00253, challenging U.S. Pat. No. 9,491,542.
Patent Owner's Updated Mandatory Notice, Exhibit—17, Filed on Sep. 13, 2022—Cited in IPR2022-00281, challenging U.S. Pat. No. 9,270,244.
Patent Owner's Updated Mandatory Notice, Exhibit—18, Filed on Jun. 28, 2023—Cited in IPR2022-01078, challenging U.S. Pat. No. 11,057,701.
Patent Owner's Updated Mandatory Notice, Exhibit—20, Filed on Jun. 28, 2023—Cited in IPR2022-01106, challenging U.S. Pat. No. 11,039,259.
Patent Owner's Updated Mandatory Notice, Exhibit—29, Filed on Jun. 28, 2023—Cited in IPR2022-00282, challenging U.S. Pat. No. 8,315,400.
Patent Owner's Updated Mandatory Notice, Exhibit—29, Filed on Jun. 28, 2023—Cited in IPR2022-00388, challenging U.S. Pat. No. 10,966,015.
Patent Owner's Updated Mandatory Notice, Exhibit—30, Filed on Jun. 28, 2023—Cited in IPR2022-00281, challenging U.S. Pat. No. 9,270,244.
Patent Owner's Updated Mandatory Notice, Exhibit—30, Filed on Jun. 28, 2023—Cited in IPR2022-00369, challenging U.S. Pat. No. 10,405,082.
Patent Owner's Updated Mandatory Notice, Exhibit—31, Filed on Jun. 28, 2023—Cited in IPR2022-00253, challenging U.S. Pat. No. 9,491,542.
Patent Owner's Updated Mandatory Notice, Exhibit—31, Filed on Jun. 28, 2023—Cited in IPR2022-00324, challenging U.S. Pat. No. 8,254,591.

(56) References Cited

OTHER PUBLICATIONS

Patent Owner's Updated Mandatory Notice, Exhibit—35, Filed on Jun. 28, 2023—Cited in IPR2022-00302, challenging U.S. Pat. No. 9,609,424.
Patent Owner's Updated Mandatory Notice, Exhibit—36, Filed on Jun. 28, 2023—Cited in IPR2022-00243, challenging U.S. Pat. No. 8,111,839.
Patent Owner's Updated Mandatory Notice, Exhibit—37, Filed on Jun. 28, 2023—Cited in IPR2022-00242, challenging U.S. Pat. No. 8,111,839.
Patent Owner's Updated Mandatory Notice; Exhibit—30, Filed on Jun. 28, 2023—Cited in IPR2022-00234, challenging U.S. Pat. No. 9,124,982.
Patent Owner's Updated Mandatory Notices, Exhibit—15, Filed on Dec. 6, 2024—Cited in IPR2024-00559, challenging U.S. Pat. No. 11,610,587.
Patent Owner's Updated Power of Attorney Pursuant to 37 CFR 41.10(b), Exhibit—14, Filed on Dec. 6, 2024—Cited in IPR2024-00559, challenging U.S. Pat. No. 11,610,587.
Petition : as filed for Inter Partes Review of U.S. Pat. No. 11,610,587, Exhibit—4, Filed on Feb. 9, 2024—Cited in IPR2024-00559, challenging U.S. Pat. No. 11,610,587.
Petition : as filed, Exhibit—3, Filed on Jun. 12, 2024—Cited in IPR2024-01003, challenging U.S. Pat. No. 9,191,083.
Petition : as filed, Exhibit—3, Filed on Jun. 12, 2024—Cited in IPR2024-01004, challenging U.S. Pat. No. 9,614,943.
Petition : as filed, Exhibit—4, Filed on Jun. 25, 2024—Cited in IPR2024-01031, challenging U.S. Pat. No. 7,049,850.
Petition : as filed, Exhibit—5, Filed on Jul. 1, 2024—Cited in IPR2024-01034, challenging U.S. Pat. No. 9,279,263.
Petition : as filedPaper3,Jun. 18, 2024—Cited in IPR2024-01033, challenging U.S. Pat. No. 8,434, 966.
Petition for Inter Partes Review of U.S. Pat. No. 11,217,237, Exhibit—4, Filed on Jun. 9, 2022—Cited in IPR2022-01098, challenging U.S. Pat. No. 11,217,237.
Petition for Inter Partes Review of U.S. Pat. No. 11,244,666, Exhibit—3, Filed on Jun. 9, 2022—Cited in IPR2022-01099, challenging U.S. Pat. No. 11,244,666.
Petition for Inter Partes Review of U.S. Pat. No. 8,254,591, Exhibit—3, Filed on Dec. 20, 2021—Cited in IPR2022-00324, challenging U.S. Pat. No. 8,254,591.
Petition for Inter Partes Review of U.S. Pat. No. 10,405,082, Exhibit—3, Filed on Dec. 30, 2021—Cited in IPR2022-00369, challenging U.S. Pat. No. 10,405,082.
Petition for Inter Partes Review of U.S. Pat. No. 10,966,015, Exhibit—3, Filed on Jan. 4, 2022—Cited in IPR2022-00388, challenging U.S. Pat. No. 10,966,015.
Petition for Inter Partes Review of U.S. Pat. No. 10,979,836, Exhibit—3, Filed on Jan. 14, 2022—Cited in IPR2022-00410, challenging U.S. Pat. No. 10,979,836.
Petition for Inter Partes Review of U.S. Pat. No. 11,039,259, Exhibit—3, Filed on Jun. 9, 2022—Cited in IPR2022-01106, challenging U.S. Pat. No. 11,039,259.
Petition for Inter Partes Review of U.S. Pat. No. 8,111,839, Exhibit—3, Filed on Dec. 13, 2021—Cited in IPR2022-00242, challenging U.S. Pat. No. 8,111,839.
Petition for Inter Partes Review of U.S. Pat. No. 8,111,839, Exhibit—3, Filed on Dec. 13, 2021—Cited in IPR2022-00243, challenging U.S. Pat. No. 8,111,839.
Petition for Inter Partes Review of U.S. Pat. No. 9,124,982; Exhibit—3, Filed on Dec. 13, 2021—Cited in IPR2022-00234, challenging U.S. Pat. No. 9,124,982.
Petition for Inter Partes Review of U.S. Pat. No. 9,270,244, Exhibit—3, Filed on Dec. 21, 2021—Cited in IPR2022-00281, challenging U.S. Pat. No. 9,270,244.
Petition for Inter Partes Review of U.S. Pat. No. 9,491,542, Exhibit—3, Filed on Dec. 17, 2021—Cited in IPR2022-00253, challenging U.S. Pat. No. 9,491,542.
Petition for Inter Partes Review of U.S. Pat. No. 9,609,424, Exhibit—3, Filed on Dec. 21, 2021—Cited in IPR2022-00302, challenging U.S. Pat. No. 9,609,424.
Petition of Inter Partes Review of U.S. Pat. No. 11,057,701, Exhibit—3, Filed on Jun. 9, 2022—Cited in IPR2022-01078, challenging U.S. Pat. No. 11,057,701.
Petition with Proposed Corrections in Redline, Exhibit—1042, Filed on Jan 31, 2022—Cited in IPR2022-00242, challenging U.S. Pat. No. 8,111,839.
Petition with Proposed Corrections in Redline, Exhibit—1042, Filed on Jan. 31, 2022—Cited in IPR2022-00243, challenging U.S. Pat. No. 8,111,839.
Petitioner's Power of Attorney from Samsung Electronics Co., Ltd.; Exhibit—1, Filed on Dec. 13, 2021—Cited in IPR2022-00234, challenging U.S. Pat. No. 9,124,982.
Petitioner's Power of Attorney from Samsung Electronics, America, Inc.; Exhibit—2, Filed on Dec. 13, 2021—Cited in IPR2022-00234, challenging U.S. Pat. No. 9,124,982.
Petitioner's Updated Mandatory Notices, Exhibit—16, Filed on Oct. 13, 2022—Cited in IPR2022-00388, challenging U.S. Pat. No. 10,966,015.
Petitioner's Updated Mandatory Notices, Exhibit—17, Filed on Oct. 13, 2022—Cited in IPR2022-00369, challenging U.S. Pat. No. 10,405,082.
Petitioner's Updated Mandatory Notices; Exhibit—27, Filed on Apr. 3, 2023—Cited in IPR2022-00234, challenging U.S. Pat. No. 9,124,982.
Petitioners Supplemental Brief on Interim Fintiv Guidance, Exhibit—10, Filed on Jul. 1, 2022—Cited in IPR2022-00410, challenging U.S. Pat. No. 10,979,836.
Petitioners Supplemental Brief on Interim Fintiv Guidance, Exhibit—11, Filed on Jul. 1, 2022—Cited in IPR2022-00253, challenging U.S. Pat. No. 9,491,542.
Petitioners Supplemental Brief on Interim Fintiv Guidance, Exhibit—11, Filed on Jul. 1, 2022—Cited in IPR2022-00281, challenging U.S. Pat. No. 9,270,244.
Petitioners Supplemental Brief on Interim Fintiv Guidance, Exhibit—11, Filed on Jul. 1, 2022—Cited in IPR2022-00302, challenging U.S. Pat. No. 9,609,424.
Petitioners Supplemental Brief on Interim Fintiv Guidance, Exhibit—11, Filed on Jul. 1, 2022—Cited in IPR2022-00324, challenging U.S. Pat. No. 8,254,591.
Petitioners Supplemental Brief on Interim Fintiv Guidance, Exhibit—11, Filed on Jul. 1, 2022—Cited in IPR2022-00388, challenging U.S. Pat. No. 10,966,015.
Petitioners Supplemental Brief on Interim Fintiv Guidance, Exhibit—12, Filed on Jul. 1, 2022—Cited in IPR2022-00369, challenging U.S. Pat. No. 10,405,082.
Petitioners' Demonstrative Exhibits for Oral Argument, Exhibit—1019, Filed on Mar. 14, 2023—Cited in IPR2022-00282, challenging U.S. Pat. No. 8,315,400.
Petitioners' Demonstrative Exhibits for Oral Argument; Exhibit—1045, Filed on Mar. 14, 2023—Cited in IPR2022-00234, challenging U.S. Pat. No. 9,124,982.
Petitioners' Motion for Leave to File Corrected Petition, Exhibit—9, Filed on Jan. 31, 2022—Cited in IPR2022-00243, challenging U.S. Pat. No. 8,111,839.
Petitioners' Motion to Submit Supplemental Information Pursuant to 37 C.F.R. §42.123(b), Exhibit—29, Filed on Apr. 13, 2023—Cited in IPR2022-00302, challenging U.S. Pat. No. 9,609,424.
Petitioners' Notice of Appeal, Exhibit—31, Filed on Aug. 11, 2023—Cited in IPR2022-00282, challenging U.S. Pat. No. 8,315,400.
Petitioners' Notice of Appeal, Exhibit—38, Filed on Aug. 11, 2023—Cited in IPR2022-00302, challenging U.S. Pat. No. 9,609,424.
Petitioners' Notice of Cross-Appeal, Exhibit—34, Filed on Sep. 20, 2023—Cited in IPR2022-00281, challenging U.S. Pat. No. 9,270,244.
Petitioners' Notice of Cross-Appeal, Exhibit—35, Filed on Sep. 20, 2023—Cited in IPR2022-00253, challenging U.S. Pat. No. 9,491,542.
Petitioners' Notice of Cross-Appeal, Exhibit—35, Filed on Sep. 20, 2023—Cited in IPR2022-00324, challenging U.S. Pat. No. 8,254,591.
Petitioners' Notice of Cross-Appeal, Exhibit—39, Filed on Aug. 24, 2023—Cited in IPR2022-00242, challenging U.S. Pat. No. 8,111,839.

(56) References Cited

OTHER PUBLICATIONS

Petitioners' Notice of Cross-Appeal; Exhibit—32, Filed on Aug. 24, 2023—Cited in IPR2022-00234, challenging U.S. Pat. No. 9,124,982.
Petitioners' Notice of Depo of Chrisotpher Struck, Exhibit—16, Filed on May 15, 2023—Cited in IPR2022-01078, challenging U.S. Pat. No. 11,057,701.
Petitioners' Notice of Deposition of Christopher Struck, Exhibit—19, Filed on Nov. 15, 2022—Cited in IPR2022-00302, challenging U.S. Pat. No. 9,609,424.
Petitioners' Notice of Deposition of Daniel P. Anagnos, Exhibit—23, Filed on Nov. 9, 2022—Cited in IPR2022-00243, challenging U.S. Pat. No. 8,111,839.
Petitioners' Notice of Deposition of Daniel P. Anagnos, Exhibit—24, Filed on Nov. 9, 2022—Cited in IPR2022-00242, challenging U.S. Pat. No. 8,111,839.
Petitioners' Notice of Deposition of Daniel P. Anagnos; Exhibit—19, Filed on Nov. 9, 2022—Cited in IPR2022-00234, challenging U.S. Pat. No. 9,124,982.
Petitioners' Notice of Deposition of David Kleinschmidt, Exhibit—19, Filed on May 24, 2023—Cited in IPR2022-01106, challenging U.S. Pat. No. 11,039,259.
Petitioners' Notice of Objections to Evidence, Exhibit—18, Filed on Apr. 19, 2023—Cited in IPR2022-01106, challenging U.S. Pat. No. 11,039,259.
Petitioners' Notice of Objections to Evidence, Exhibit—22, Filed on Sep. 20, 2022—Cited in IPR2022-00243, challenging U.S. Pat. No. 8,111,839.
Petitioners' Notice of Objections to Evidence, Exhibit—23, Filed on Sep. 20, 2022—Cited in IPR2022-00242, challenging U.S. Pat. No. 8,111,839.
Petitioners' Notice of Objections to Evidence; Exhibit—18, Filed on Sep. 16, 2022—Cited in IPR2022-00234, challenging U.S. Pat. No. 9,124,982.
Petitioners' Preliminary Reply, Exhibit—10, Filed on Apr. 20, 2022—Cited in IPR2022-00282, challenging U.S. Pat. No. 8,315,400.
Petitioners' Preliminary Reply, Exhibit—10, Filed on Jun. 14, 2022—Cited in IPR2022-00369, challenging U.S. Pat. No. 10,405,082.
Petitioners' Preliminary Reply, Exhibit—13, Filed on Apr. 20, 2022—Cited in IPR2022-00243, challenging U.S. Pat. No. 8,111,839.
Petitioners' Preliminary Reply, Exhibit—14, Filed on Apr. 20, 2022—Cited in IPR2022-00242, challenging U.S. Pat. No. 8,111,839.
Petitioners' Preliminary Reply, Exhibit—8, Filed on Nov. 10, 2022—Cited in IPR2022-01078, challenging U.S. Pat. No. 11,057,701.
Petitioners' Preliminary Reply, Exhibit—8, Filed on Nov. 10, 2022—Cited in IPR2022-01099, challenging U.S. Pat. No. 11,244,666.
Petitioners' Preliminary Reply, Exhibit—8, Filed on Nov. 10, 2022—Cited in IPR2022-01106, challenging U.S. Pat. No. 11,039,259.
Petitioners' Preliminary Reply, Exhibit—8, Filed on Jun. 14, 2022—Cited in IPR2022-00410, challenging U.S. Pat. No. 10,979,836.
Petitioners' Preliminary Reply, Exhibit—9, Filed on Nov. 15, 2022—Cited in IPR2022-01098, challenging U.S. Pat. No. 11,217,237.
Petitioners' Preliminary Reply, Exhibit—9, Filed on May 10, 2022—Cited in IPR2022-00302, challenging U.S. Pat. No. 9,609,424.
Petitioners' Preliminary Reply, Exhibit—9, Filed on May 11, 2022—Cited in IPR2022-00324, challenging U.S. Pat. No. 8,254,591.
Petitioners' Preliminary Reply, Exhibit—9, Filed on May 20, 2022—Cited in IPR2022-00253, challenging U.S. Pat. No. 9,491,542.
Petitioners' Preliminary Reply, Exhibit—9, Filed on May 27, 2022—Cited in IPR2022-00281, challenging U.S. Pat. No. 9,270,244.
Petitioners' Preliminary Reply, Exhibit—9, Filed on Jan. 14, 2022—Cited in IPR2022-00388, challenging U.S. Pat. No. 10,966,015.
Petitioners' Preliminary Reply; Exhibit—10, Filed on Apr. 20, 2022—Cited in IPR2022-00234, challenging U.S. Pat. No. 9,124,982.
Petitioners' Reply to Patent Owner's Response, Exhibit—17, Filed on Dec. 2, 2022—Cited in IPR2022-00282, challenging U.S. Pat. No. 8,315,400.
Petitioners' Reply to Patent Owner's Response, Exhibit—17, Filed on Jun. 15, 2023—Cited in IPR2022-01078, challenging U.S. Pat. No. 11,057,701.
Petitioners' Reply to Patent Owner's Response, Exhibit—20, Filed on Jan. 10, 2023—Cited in IPR2022-00302, challenging U.S. Pat. No. 9,609,424.
Petitioners' Reply to Patent Owner's Response, Exhibit—20, Filed on Jan. 31, 2023—Cited in IPR2022-00388, challenging U.S. Pat. No. 10,966,015.
Petitioners' Reply to Patent Owner's Response, Exhibit—21, Filed on Jan. 11, 2023—Cited in IPR2022-00281, challenging U.S. Pat. No. 9,270,244.
Petitioners' Reply to Patent Owner's Response, Exhibit—21, Filed on Jan. 31, 2023—Cited in IPR2022-00369, challenging U.S. Pat. No. 10,405,082.
Petitioners' Reply to Patent Owner's Response, Exhibit—21, Filed on Jun. 30, 2023—Cited in IPR2022-01106, challenging U.S. Pat. No. 11,039,259.
Petitioners' Reply to Patent Owner's Response, Exhibit—22, Filed on Jan. 10, 2023—Cited in IPR2022-00324, challenging U.S. Pat. No. 8,254,591.
Petitioners' Reply to Patent Owner's Response, Exhibit—24, Filed on Dec. 6, 2022—Cited in IPR2022-00243, challenging U.S. Pat. No. 8,111,839.
Petitioners' Reply to Patent Owner's Response, Exhibit—25, Filed on Dec. 6, 2022—Cited in IPR2022-00242, challenging U.S. Pat. No. 8,111,839.
Petitioners' Reply to Patent Owner's Response; Exhibit—20, Filed on Dec. 2, 2022—Cited in IPR2022-00234, challenging U.S. Pat. No. 9,124,982.
Petitioners' Reply to Patent Owners Response, Exhibit—21, Filed on Jan. 11, 2023—Cited in IPR2022-00253, challenging U.S. Pat. No. 9,491,542.
Petitioners' Request for Oral Argument, Exhibit—20, Filed on Aug. 17, 2023—Cited in IPR2022-01078, challenging U.S. Pat. No. 11,057,701.
Petitioners' Request for Oral Argument, Exhibit—22, Filed on Feb. 3, 2023—Cited in IPR2022-00282, challenging U.S. Pat. No. 8,315,400.
Petitioners' Request for Oral Argument, Exhibit—23, Filed on Feb. 28, 2023—Cited in IPR2022-00302, challenging U.S. Pat. No. 9,609,424.
Petitioners' Request for Oral Argument, Exhibit—24, Filed on Mar. 1, 2023—Cited in IPR2022-00281, challenging U.S. Pat. No. 9,270,244.
Petitioners' Request for Oral Argument, Exhibit—24, Filed on Aug. 28, 2023—Cited in IPR2022-01106, challenging U.S. Pat. No. 11,039,259.
Petitioners' Request for Oral Argument, Exhibit—25, Filed on Feb. 28, 2023—Cited in IPR2022-00324, challenging U.S. Pat. No. 8,254,591.
Petitioners' Request for Oral Argument, Exhibit—25, Filed on Mar. 1, 2023—Cited in IPR2022-00253, challenging U.S. Pat. No. 9,491,542.
Petitioners' Request for Oral Argument, Exhibit—25, Filed on Apr. 4, 2023—Cited in IPR2022-00388, challenging U.S. Pat. No. 10,966,015.
Petitioners' Request for Oral Argument, Exhibit—26, Filed on Mar. 4, 2023—Cited in IPR2022-00369, challenging U.S. Pat. No. 10,405,082.
Petitioners' Request for Oral Argument, Exhibit—27, Filed on Feb. 7, 2023—Cited in IPR2022-00243, challenging U.S. Pat. No. 8,111,839.
Petitioners' Request for Oral Argument, Exhibit—28, Filed on Feb. 7, 2023—Cited in IPR2022-00242, challenging U.S. Pat. No. 8,111,839.
Petitioners' Request for Oral Argument; Exhibit—23, Filed on Feb. 3, 2023—Cited in IPR2022-00234, challenging U.S. Pat. No. 9,124,982.
Petitioners' Request for Refund of Post-Institution Fee, Exhibit—12, Filed on Mar. 2, 2023—Cited in IPR2022-01099, challenging U.S. Pat. No. 11,244,666.
Petitioners' Request for Refund of Post-Institution Fee, Exhibit—13, Filed on Jan. 18, 2023—Cited in IPR2022-00410, challenging U.S. Pat. No. 10,979,836.
Petitioners' Request for Refund of Post-Institution Fee, Exhibit—13, Filed on Mar. 2, 2023—Cited in IPR2022-01098, challenging U.S. Pat. No. 11,217,237.
Petitioners' Request for Refund of Post-Institution Fees, Exhibit—17, Filed on Dec. 16, 2024—Cited in IPR2024-01003, challenging U.S. Pat. No. 9,191,083.

(56) References Cited

OTHER PUBLICATIONS

Petitioners' Request for Refund of Post-Institution Fees, Exhibit—17, Filed on Dec. 16, 2024—Cited in IPR2024-01004, challenging U.S. Pat. No. 9,614,943.
Petitioners' Request for Refund of Post-Institution Fees, Exhibit—17, Filed on Dec. 16, 2024—Cited in IPR2024-01031, challenging U.S. Pat. No. 7,049,850.
Petitioners' Request for Refund of Post-Institution Fees, Exhibit—18, Filed on Dec. 16, 2024—Cited in IPR2024-01034, challenging U.S. Pat. No. 9,279,263.
Petitioners' Request for Refund of Post-Institution FeesPaper16, Dec. 16, 2024—Cited in IPR2024-01033, challenging U.S. Pat. No. 8,434,966.
Petitioners' Submission of Supplemental Information, Exhibit—33, Filed on May 15, 2023—Cited in IPR2022-00302, challenging U.S. Pat. No. 9,609,424.
Petitioners' Sur-Sur-Reply to Patent Owner's Sur-Reply, Exhibit—20, Filed on Jan. 27, 2023—Cited in IPR2022-00282, challenging U.S. Pat. No. 8,315,400.
Petitioners' Sur-Sur-Reply to Patent Owner's Sur-Reply, Exhibit—26, Filed on Mar. 7, 2023—Cited in IPR2022-00281, challenging U.S. Pat. No. 9,270,244.
Petitioners' Sur-Sur-Reply to Patent Owner's Sur-Reply, Exhibit—27, Filed on Mar. 7, 2023—Cited in IPR2022-00253, challenging U.S. Pat. No. 9,491,542.
Petitioners' Updated Exhibit List, Exhibit—10, Filed on Nov. 20, 2024—Cited in IPR2024-01003, challenging U.S. Pat. No. 9,191,083.
Petitioners' Updated Exhibit List, Exhibit—10, Filed on Nov. 20, 2024—Cited in IPR2024-01004, challenging U.S. Pat. No. 9,614,943.
Petitioners' Updated Exhibit List, Exhibit—10, Filed on Nov. 20, 2024—Cited in IPR2024-01031, challenging U.S. Pat. No. 7,049,850.
Petitioners' Updated Exhibit List, Exhibit—11, Filed on Nov. 20, 2024—Cited in IPR2024-01034, challenging U.S. Pat. No. 9,279,263.
Petitioners' Updated Exhibit List, Exhibit—15, Filed on Dec. 11, 2024—Cited in IPR2024-01003, challenging U.S. Pat. No. 9,191,083.
Petitioners' Updated Exhibit List, Exhibit—15, Filed on Dec. 11, 2024—Cited in IPR2024-01004, challenging U.S. Pat. No. 9,614,943.
Petitioners' Updated Exhibit List, Exhibit—15, Filed on Dec. 11, 2024—Cited in IPR2024-01031, challenging U.S. Pat. No. 7,049,850.
Petitioners' Updated Exhibit List, Exhibit—16, Filed on Dec. 11, 2024—Cited in IPR2024-01034, challenging U.S. Pat. No. 9,279,263.
Petitioners' Updated Exhibit List, Exhibit—19, Filed on Dec. 11, 2024—Cited in IPR2024-00559, challenging U.S. Pat. No. 11,610,587.
Petitioners' Updated Exhibit List, Exhibit—24, Filed on Mar. 14, 2023—Cited in IPR2022-00282, challenging U.S. Pat. No. 8,315,400.
Petitioners' Updated Exhibit List, Exhibit—24, Filed on Sep. 26, 2023—Cited in IPR2022-01078, challenging U.S. Pat. No. 11,057,701.
Petitioners' Updated Exhibit List, Exhibit—27, Filed on May 9, 2023—Cited in IPR2022-00388, challenging U.S. Pat. No. 10,966,015.
Petitioners' Updated Exhibit List, Exhibit—28, Filed on Oct. 11, 2023—Cited in IPR2022-01106, challenging U.S. Pat. No. 11,039,259.
Petitioners' Updated Exhibit List, Exhibit—28, Filed on Apr. 11, 2023—Cited in IPR2022-00302, challenging U.S. Pat. No. 9,609,424.
Petitioners' Updated Exhibit List, Exhibit—28, Filed on Apr. 13, 2023—Cited in IPR2022-00281, challenging U.S. Pat. No. 9,270,244.
Petitioners' Updated Exhibit List, Exhibit—28, Filed on May 9, 2023—Cited in IPR2022-00369, challenging U.S. Pat. No. 10,405,082.
Petitioners' Updated Exhibit List, Exhibit—30, Filed on Apr. 12, 2023—Cited in IPR2022-00253, challenging U.S. Pat. No. 9,491,542.
Petitioners' Updated Exhibit List, Exhibit—30, Filed on Apr. 13, 2023—Cited in IPR2022-00302, challenging U.S. Pat. No. 9,609,424.
Petitioners' Updated Exhibit List, Exhibit—30, Filed on Apr. 4, 2023—Cited in IPR2022-00324, challenging U.S. Pat. No. 8,254,591.
Petitioners' Updated Exhibit List, Exhibit—31, Filed on 3/16/2023—Cited in IPR2022-00243, challenging U.S. Pat. No. 8,111,839.
Petitioners' Updated Exhibit List, Exhibit—31, Filed on Apr. 13, 2023—Cited in IPR2022-00302, challenging U.S. Pat. No. 9,609,424.
Petitioners' Updated Exhibit List, Exhibit—32, Filed on 3/16/2023—Cited in IPR2022-00242, challenging U.S. Pat. No. 8,111,839.
Petitioners' Updated Exhibit List; Exhibit—25, Filed on Mar. 14, 2023—Cited in IPR2022-00234, challenging U.S. Pat. No. 9,124,982.
Petitioners' Updated Exhibit ListPaper14, Dec. 11, 2024—Cited in IPR2024-01033, challenging U.S. Pat. No. 8,434,966.
Petitioners' Updated Exhibit ListPaper9, Nov. 20, 2024—Cited in IPR2024-01033, challenging U.S. Pat. No. 8,434,966.
Petitioners' Updated Mandatory Notices, Exhibit—15, Filed on Apr. 3, 2023—Cited in IPR2022-01078, challenging U.S. Pat. No. 11,057,701.
Petitioners' Updated Mandatory Notices, Exhibit—16, Filed on Mar. 28, 2023—Cited in IPR2022-01106, challenging U.S. Pat. No. 11,039,259.
Petitioners' Updated Mandatory Notices, Exhibit—18, Filed on Aug. 10, 2022—Cited in IPR2022-00324, challenging U.S. Pat. No. 8,254,591.
Petitioners' Updated Mandatory Notices, Exhibit—20, Filed on Aug. 10, 2022—Cited in IPR2022-00243, challenging U.S. Pat. No. 8,111,839.
Petitioners' Updated Mandatory Notices, Exhibit—21, Filed on Feb. 8, 2023—Cited in IPR2022-00388, challenging U.S. Pat. No. 10,966,015.
Petitioners' Updated Mandatory Notices, Exhibit—21, Filed on Aug. 10, 2022—Cited in IPR2022-00242, challenging U.S. Pat. No. 8,111,839.
Petitioners' Updated Mandatory Notices, Exhibit—22, Filed on Feb. 8, 2023—Cited in IPR2022-00369, challenging U.S. Pat. No. 10,405,082.
Petitioners' Updated Mandatory Notices, Exhibit—23, Filed on Apr. 3, 2023—Cited in IPR2022-00388, challenging U.S. Pat. No. 10,966,015.
Petitioners' Updated Mandatory Notices, Exhibit—24, Filed on Apr. 3, 2023 Cited in IPR2022-00369, challenging U.S. Pat. No. 10,405,082.
Petitioners' Updated Mandatory Notices, Exhibit—26, Filed on Apr. 3, 2023—Cited in IPR2022-00282, challenging U.S. Pat. No. 8,315,400.
Petitioners' Updated Mandatory Notices, Exhibit—26, Filed on Apr. 3, 2023—Cited in IPR2022-00302, challenging U.S. Pat. No. 9,609,424.
Petitioners' Updated Mandatory Notices, Exhibit—27, Filed on Apr. 3, 2023—Cited in IPR2022-00281, challenging U.S. Pat. No. 9,270,244.
Petitioners' Updated Mandatory Notices, Exhibit—28, Filed on Apr. 3, 2023—Cited in IPR2022-00253, challenging U.S. Pat. No. 9,491,542.
Petitioners' Updated Mandatory Notices, Exhibit—28, Filed on Apr. 3, 2023—Cited in IPR2022-00324, challenging U.S. Pat. No. 8,254,591.
Petitioners' Updated Mandatory Notices, Exhibit—33, Filed on Apr. 3, 2023—Cited in IPR2022-00243, challenging U.S. Pat. No. 8,111,839.
Petitioners' Updated Mandatory Notices, Exhibit—34, Filed on Apr. 3, 2023—Cited in IPR2022-00242, challenging U.S. Pat. No. 8,111,839.
Petitioners' Updated Mandatory Notices, Exhibit—4, Filed on Jan. 6, 2022—Cited in IPR2022-00369, challenging U.S. Pat. No. 10,405,082.
Petitioners' Updated Mandatory Notices, Exhibit—6, Filed on Jan. 20, 2022—Cited in IPR2022-00388, challenging U.S. Pat. No. 10,966,015.
Petitioners' Updated Mandatory Notices, Exhibit—7, Filed on Jan. 20, 2022—Cited in IPR2022-00253, challenging U.S. Pat. No. 9,491,542.
Petitioners' Updated Mandatory Notices, Exhibit—7, Filed on Jan. 20, 2022—Cited in IPR2022-00281, challenging U.S. Pat. No. 9,270,244.
Petitioners' Updated Mandatory Notices, Exhibit—7, Filed on Jan. 20, 2022—Cited in IPR2022-00302, challenging U.S. Pat. No. 9,609,424.
Petitioners' Updated Mandatory Notices, Exhibit—7, Filed on Jan. 20, 2022—Cited in IPR2022-00324, challenging U.S. Pat. No. 8,254,591.

(56) References Cited

OTHER PUBLICATIONS

Petitioners' Updated Mandatory Notices, Exhibit—7, Filed on Jan. 20, 2022—Cited in IPR2022-00369, challenging U.S. Pat. No. 10,405,082.
Petitioners' Updated Mandatory Notices, Exhibit—8, Filed on Jan. 20, 2022—Cited in IPR2022-00243, challenging U.S. Pat. No. 8,111,839.
Petitioners' Updated Mandatory Notices, Exhibit—8, Filed on Jan. 20, 2022—Cited in IPR2022-00282, challenging U.S. Pat. No. 8,315,400.
Petitioners' Updated Mandatory Notices, Exhibit—9, Filed on Jan. 20, 2022—Cited in IPR2022-00242, challenging U.S. Pat. No. 8,111,839.
Petitioners' Updated Mandatory Notices; Exhibit—16, Filed on Aug. 10, 2022—Cited in IPR2022-00234, challenging U.S. Pat. No. 9,124,982.
Petitioners' Updated Mandatory Notices; Exhibit—8, Filed on Jan. 20, 2022—Cited in IPR2022-00234, challenging U.S. Pat. No. 9,124,982.
PO's Opposition to Motion to File Supplemental Information, Exhibit—32, Filed on Apr. 17, 2023—Cited in IPR2022-00302, challenging U.S. Pat. No. 9,609,424.
PO's Updated Exhibit List, Exhibit—25, Filed on Mar. 14, 2023—Cited in IPR2022-00282, challenging U.S. Pat. No. 8,315,400.
PO's Updated Exhibit List, Exhibit—27, Filed on Oct. 11, 2023—Cited in IPR2022-01106, challenging U.S. Pat. No. 11,039,259.
PO's Updated Exhibit List, Exhibit—27, Filed on Apr. 11, 2023—Cited in IPR2022-00302, challenging U.S. Pat. No. 9,609,424.
PO's Updated Exhibit List, Exhibit—28, Filed on May 9, 2023—Cited in IPR2022-00388, challenging U.S. Pat. No. 10,966,015.
PO's Updated Exhibit List, Exhibit—29, Filed on Apr. 12, 2023—Cited in IPR2022-00253, challenging U.S. Pat. No. 9,491,542.
PO's Updated Exhibit List, Exhibit—29, Filed on Apr. 13, 2023—Cited in IPR2022-00281, challenging U.S. Pat. No. 9,270,244.
PO's Updated Exhibit List, Exhibit—29, Filed on Apr. 4, 2023—Cited in IPR2022-00324, challenging U.S. Pat. No. 8,254,591.
PO's Updated Exhibit List, Exhibit—29, Filed on May 9, 2023—Cited in IPR2022-00369, challenging U.S. Pat. No. 10,405,082.
PO's Updated Exhibit List, Exhibit—30, Filed on Oct. 19, 2023—Cited in IPR2022-01106, challenging U.S. Pat. No. 11,039,259.
PO's Updated Exhibit List, Exhibit—32, Filed on Mar. 16, 2023—Cited in IPR2022-00243, challenging U.S. Pat. No. 8,111,839.
PO's Updated Exhibit List, Exhibit—33, Filed on Mar. 16, 2023—Cited in IPR2022-00242, challenging U.S. Pat. No. 8,111,839.
PO's Updated Exhibit List; Exhibit—26, Filed on Mar. 14, 2023—Cited in IPR2022-00234, challenging U.S. Pat. No. 9,124,982.
Power of Attorney for Samsung Electronics America, Inc., Exhibit—2, Filed on Dec. 30, 2021—Cited in IPR2022-00369, challenging U.S. Pat. No. 10,405,082.
Power of Attorney for Samsung Electronics America, Inc., Exhibit—2, Filed on Jun. 9, 2022—Cited in IPR2022-01078, challenging U.S. Pat. No. 11,057,701.
Power of Attorney for Samsung Electronics America, Inc., Exhibit—2, Filed on Jun. 9, 2022—Cited in IPR2022-01098, challenging U.S. Pat. No. 11,217,237.
Power of Attorney for Samsung Electronics America, Inc., Exhibit—2, Filed on Jun. 9, 2022—Cited in IPR2022-01099, challenging U.S. Pat. No. 11,244,666.
Power of Attorney for Samsung Electronics America, Inc., Exhibit—2, Filed on Jun. 9, 2022—Cited in IPR2022-01106, challenging U.S. Pat. No. 11,039,259.
Power of Attorney for Samsung Electronics Co. Ltd., Exhibit—1, Filed on Jun. 9, 2022—Cited in IPR2022-01078, challenging U.S. Pat. No. 11,057,701.
Power of Attorney for Samsung Electronics Co., Ltd., Exhibit—1, Filed on Dec. 10, 2021—Cited in IPR2022-00282, challenging U.S. Pat. No. 8,315,400.
Power of Attorney for Samsung Electronics Co., Ltd., Exhibit—1, Filed on Dec. 30, 2021—Cited in IPR2022-00369, challenging U.S. Pat. No. 10,405,082.
Power of Attorney for Samsung Electronics Co., Ltd., Exhibit—1, Filed on Jun. 9, 2022—Cited in IPR2022-01098, challenging U.S. Pat. No. 11,217,237.
Power of Attorney for Samsung Electronics Co., Ltd., Exhibit—1, Filed on Jun. 9, 2022—Cited in IPR2022-01099, challenging U.S. Pat. No. 11,244,666.
Power of Attorney for Samsung Electronics Co., Ltd., Exhibit—1, Filed on Jun. 9, 2022—Cited in IPR2022-01106, challenging U.S. Pat. No. 11,039,259.
Power of Attorney for Samsung Electronics, America, Inc., Exhibit—2, Filed on Dec. 10, 2021—Cited in IPR2022-00282, challenging U.S. Pat. No. 8,315,400.
Power of Attorney from Samsung Electronics America, Inc., Exhibit—2, Filed on Jan. 14, 2022—Cited in IPR2022-00410, challenging U.S. Pat. No. 10,979,836.
Power of Attorney from Samsung Electronics America, Inc., Exhibit—2, Filed on Jan. 4, 2022—Cited in IPR2022-00388, challenging U.S. Pat. No. 10,966,015.
Power of Attorney from Samsung Electronics America, Inc., Exhibit—2, Filed on Dec. 13, 2021—Cited in IPR2022-00242, challenging U.S. Pat. No. 8,111,839.
Power of Attorney from Samsung Electronics America, Inc., Exhibit—2, Filed on Dec. 13, 2021—Cited in IPR2022-00243, challenging U.S. Pat. No. 8,111,839.
Power of Attorney from Samsung Electronics America, Inc., Exhibit—2, Filed on Dec. 17, 2021—Cited in IPR2022-00253, challenging U.S. Pat. No. 9,491,542.
Power of Attorney from Samsung Electronics America, Inc., Exhibit—2, Filed on Dec. 20, 2021—Cited in IPR2022-00324, challenging U.S. Pat. No. 8,254,591.
Power of Attorney from Samsung Electronics America, Inc., Exhibit—2, Filed on Dec. 21, 2021—Cited in IPR2022-00281, challenging U.S. Pat. No. 9,270,244.
Power of Attorney from Samsung Electronics America, Inc., Exhibit—2, Filed on Dec. 21, 2021—Cited in IPR2022-00302, challenging U.S. Pat. No. 9,609,424.
Power of Attorney from Samsung Electronics Co., Ltd., Exhibit—1, Filed on Jan. 14, 2022—Cited in IPR2022-00410, challenging U.S. Pat. No. 10,979,836.
Power of Attorney from Samsung Electronics Co., Ltd., Exhibit—1, Filed on Jan. 4, 2022—Cited in IPR2022-00388, challenging U.S. Pat. No. 10,966,015.
Power of Attorney from Samsung Electronics Co., Ltd., Exhibit—1, Filed on Dec. 13, 2021—Cited in IPR2022-00242, challenging U.S. Pat. No. 8,111,839.
Power of Attorney from Samsung Electronics Co., Ltd., Exhibit—1, Filed on Dec. 13, 2021—Cited in IPR2022-00243, challenging U.S. Pat. No. 8,111,839.
Power of Attorney from Samsung Electronics Co., Ltd., Exhibit—1, Filed on Dec. 17, 2021—Cited in IPR2022-00253, challenging U.S. Pat. No. 9,491,542.
Power of Attorney from Samsung Electronics Co., Ltd., Exhibit—1, Filed on Dec. 20, 2021—Cited in IPR2022-00324, challenging U.S. Pat. No. 8,254,591.
Power of Attorney from Samsung Electronics Co., Ltd., Exhibit—1, Filed on Dec. 21, 2021—Cited in IPR2022-00281, challenging U.S. Pat. No. 9,270,244.
Power of Attorney from Samsung Electronics Co., Ltd., Exhibit—1, Filed on Dec. 21, 2021—Cited in IPR2022-00302, challenging U.S. Pat. No. 9,609,424.
PR 4-3 JCC Statement, Exhibit—2013, Filed on Jan. 12, 2023—Cited in IPR2022-00282, challenging U.S. Pat. No. 8,315,400.
PR 4-5(d) JCC Chart, Exhibit—2011, Filed on Jan. 12, 2023—Cited in IPR2022-00282, challenging U.S. Pat. No. 8,315,400.
Revised Scheduling Order, Exhibit—22, Filed on Jul. 12, 2023—Cited in IPR2022-01106, challenging U.S. Pat. No. 11,039,259.
Roy Falik, Exhibit—7, Filed on Jul. 18, 2024—Cited in IPR2024-01031, challenging U.S. Pat. No. 7,049,850.
Roy Falik, Exhibit—8, Filed on Jul. 18, 2024—Cited in IPR2024-01034, challenging U.S. Pat. No. 9,279,263.
Sage Journal, The Future of Hearing Aid Technology, Exhibit—2008, Filed on Oct. 17, 2022—Cited in IPR2022-00324, challenging U.S. Pat. No. 8,254,591.

(56) References Cited

OTHER PUBLICATIONS

*Samsung Elecs. Co., Ltd., et al.* v. *Staton Techiya, LLC*, IPR2022-00302, Paper 11, Exhibit—2006, Filed on Oct. 11, 2022—Cited in IPR2022-01106, challenging U.S. Pat. No. 11,039,259.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01078, challenging U.S. Pat. No. 11,057,701.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01098, challenging U.S. Pat. No. 11,217,237.
*Samsung Elecs. Co., Ltd., et al.* v. *Staton Techiya, LLC*, IPR2022-00302, Paper 11, Exhibit—2006, Filed on Oct. 7, 2022—Cited in IPR2022-01099, challenging U.S. Pat. No. 11,244,666.
Samsung's Claim Construction Brief, Exhibit—2012, Filed on Jan. 12, 2023—Cited in IPR2022-00282, challenging U.S. Pat. No. 8,315,400.
Samsung's Responsive Claim Construction Brief, Exhibit—2012, Filed on Apr. 10, 2023—Cited in IPR2022-01106, challenging U.S. Pat. No. 11,039,259.
Scheduling Order, Exhibit—11, Filed on Jan. 9, 2023—Cited in IPR2022-01106, challenging U.S. Pat. No. 11,039,259.
Scheduling Order, Exhibit—11, Filed on Dec. 30, 2022—Cited in IPR2022-01078, challenging U.S. Pat. No. 11,057,701.
Scheduling Order, Exhibit—14, Filed on Jul. 12, 2022—Cited in IPR2022-00302, challenging U.S. Pat. No. 9,609,424.
Scheduling Order, Exhibit—14, Filed on Jul. 12, 2022—Cited in IPR2022-00324, challenging U.S. Pat. No. 8,254,591.
Scheduling Order, Exhibit—14, Filed on Jul. 15, 2022—Cited in IPR2022-00253, challenging U.S. Pat. No. 9,491,542.
Scheduling Order, Exhibit—14, Filed on Jul. 15, 2022—Cited in IPR2022-00281, challenging U.S. Pat. No. 9,270,244.
Scheduling Order, Exhibit—14, Filed on Aug. 16, 2022—Cited in IPR2022-00388, challenging U.S. Pat. No. 10,966,015.
Scheduling Order, Exhibit—15, Filed on Aug. 16, 2022—Cited in IPR2022-00369, challenging U.S. Pat. No. 10,405,082.
Scheduling Order, Exhibit—16, Filed on Jun. 21, 2022—Cited in IPR2022-00243, challenging U.S. Pat. No. 8,111,839.
Scheduling Order, Exhibit—17, Filed on Jun. 21, 2022—Cited in IPR2022-00242, challenging U.S. Pat. No. 8,111,839.
Scheduling Order, Exhibit—9, Filed on Aug. 22, 2024—Cited in IPR2024-00559, challenging U.S. Pat. No. 11,610,587.
*Staton Techiya* v *Samsung*—Docket Control Order, Exhibit—2003, Filed on Apr. 18, 2022—Cited in IPR2022-00253, challenging U.S. Pat. No. 9,491,542.
*Staton Techiya* v *Samsung*—Docket Control Order, Exhibit—2003, Filed on Apr. 18, 2022—Cited in IPR2022-00281, challenging U.S. Pat. No. 9,270,244.
*Staton Techiya* v *Samsung*, Docket Control Order, Exhibit—2003, Filed on Mar. 21, 2022—Cited in IPR2022-00282, challenging U.S. Pat. No. 8,315,400.
*Staton Techiya* v *Samsung*, Docket Control Order, Exhibit—2003, Filed on Apr. 13, 2022—Cited in IPR2022-00302, challenging U.S. Pat. No. 9,609,424.
*Staton Techiya* v *Samsung*, Docket Control Order, Exhibit—2003, Filed on Apr. 13, 2022—Cited in IPR2022-00324, challenging U.S. Pat. No. 8,254,591.
*Staton Techiya* v. *Samsung*, Claim Construction Order, Exhibit—2012, Filed on Mar. 23, 2023—Cited in IPR2022-01078, challenging U.S. Pat. No. 11,057,701.
*Staton Techiya* v. *Samsung*, Docket Control Order, Exhibit—2003, Filed on Mar. 23, 2022—Cited in IPR2022-00242, challenging U.S. Pat. No. 8,111,839.
*Staton Techiya* v. *Samsung*, Docket Control Order, Exhibit—2003, Filed on Mar. 23, 2022—Cited in IPR2022-00243, challenging U.S. Pat. No. 8,111,839.
*Staton Techiya* v. *Samsung*, Docket Control Order, Exhibit—2003, Filed on May 18, 2022—Cited in IPR2022-00369, challenging U.S. Pat. No. 10,405,082.
*Staton Techiya* v. *Samsung*, Docket Control Order, Exhibit—2003, Filed on May 18, 2022—Cited in IPR2022-00388, challenging U.S. Pat. No. 10,966,015.
*Staton Techiya* v. *Samsung*, Docket Control Order, Exhibit—2003, Filed on May 18, 2022—Cited in IPR2022-00410, challenging U.S. Pat. No. 10,979,836.
*Staton Techiya* v. *Samsung*, Docket Control Order; Exhibit—2003, Filed on Mar. 21, 2022—Cited in IPR2022-00234, challenging U.S. Pat. No. 9,124,982.
*Staton Techiya* v. *Samsung*, Joint Motion to Consolidate, Exhibit—2005, Filed on Apr. 29, 2022—Cited in IPR2022-00242, challenging U.S. Pat. No. 8,111,839.
*Staton Techiya* v. *Samsung*, Joint Mtn to Consolidate, Exhibit—2005, Filed on Apr. 29, 2022—Cited in IPR2022-00243, challenging U.S. Pat. No. 8,111,839.
*Staton Techiya* v. *Samsung*, Joint Mtn to Consolidate, Exhibit—2008, Filed on Apr. 29, 2022—Cited in IPR2022-00282, challenging U.S. Pat. No. 8,315,400.
*Staton Techiya* v. *Samsung*, P.R. 4-5(d) Joint Claim Construction Chart, Exhibit—2011, Filed on Mar. 23, 2023—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit—2007, Filed on Nov. 8, 2022—Cited in IPR2022-00369, challenging U.S. Pat. No. 10,405,082.
*Staton Techiya, LLC* v. *Samsung Elecs. Co., Ltd.*, Appendix B to P.R. 4-3 Statement, Exhibit—2009, Filed on Nov. 18, 2022—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit—2010, Filed on Nov. 8, 2022—Cited in IPR2022-00388, challenging U.S. Pat. No. 10,966,015.
*Staton Techiya, LLC* v. *Samsung Elecs., Co., Ltd.*, Appendix B to P.R. 4-3 Statement, Exhibit—2011, Filed on Nov. 18, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit—2004, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Defendants' P.R. 4-2 Disclosures, Exhibit—2004, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order (Dkt. No. 43), Exhibit—2005, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Docket Control Order (Dkt. No. 43), Exhibit—2005, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Docket Control Order (Dkt. No. 43), Exhibit—2005, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order, Exhibit—2005, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Joint Motion to Consolidate (Dkt. No. 39), Exhibit—2007, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Joint Motion to Consolidate (Dkt. No. 39), Exhibit—2007, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Joint Motion to Consolidate (Dkt. No. 39), Exhibit—2007, Filed on Oct. 7, 2022—Cited in IPR2022-01099, challenging U.S. Pat. No. 11,244,666.

(56) References Cited

OTHER PUBLICATIONS

*Staton Techiya, LLC, et al.* v. *Samsung Elecs. Co., Ltd., et al.,* Joint Motion to Consolidate, Exhibit—2007, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.,* Plaintiff's Infringement Contentions, dated Apr. 6, 2022, Exhibit—2008, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.,* Plaintiff's P.R. 4-2 Disclosures, Exhibit—2003, Filed on Oct/ 7, 2022—Cited in IPR2022-01099, challenging U.S. Pat. No. 11,244,666.
*Staton Techiya, LLC, et al.* v. *Samsung Elecs. Co., Ltd., et al.,* Plaintiffs' Infringement Contentions dated Apr. 6, 2022, Exhibit—2008, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.,* Plaintiffs' Infringement Contentions, dated Apr. 6, 2022, Exhibit—2008, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.,* Plaintiffs' Infringement Contentions, dated Apr. 6, 2022, Exhibit—2008, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.,* Plaintiffs' P.R. 4-2 Disclosures, Exhibit—2003, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.,* Plaintiffs' P.R. 4-2 Disclosures, Exhibit—2003, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.,* Plaintiffs' P.R. 4-2 Disclosures, Exhibit—2003, Filed on Oct. 7, 2022—Cited in IPR2022-01098, challenging U.S. Pat. No. 11,217,237.
Stipulation Letter dated Apr. 20, 2022, Exhibit—1031, Filed on May 11, 2022—Cited in IPR2022-00324, challenging U.S. Pat. No. 8,254,591.
Stipulation Letter from D. Rokach to J. Snodgrass, Exhibit—1025, Filed on Nov. 10, 2022—Cited in IPR2022-01099, challenging U.S. Pat. No. 11,244,666.
Stipulation Letter from D. Rokach to J. Snodgrass, Exhibit—1027, Filed on Nov. 10, 2022—Cited in IPR2022-01078, challenging U.S. Pat. No. 11,057,701.
Stipulation Letter from D. Rokach to J. Snodgrass, Exhibit—1030, Filed on Nov. 15, 2022—Cited in IPR2022-01098, challenging U.S. Pat. No. 11,217,237.
Stipulation Letter from D. Rokach to J. Snodgrass, Exhibit—1033, Filed on Nov. 10, 2022—Cited in IPR2022-01106, challenging U.S. Pat. No. 11,039,259.
Stipulation Letter, Exhibit—1015, Filed on Apr. 20, 2022—Cited in IPR2022-00282, challenging U.S. Pat. No. 8,315,400.
Stipulation Letter, Exhibit—1019, Filed on Jun. 14, 2022—Cited in IPR2022-00369, challenging U.S. Pat. No. 10,405,082.
Stipulation Letter, Exhibit—1019, Filed on Jun. 14, 2022—Cited in IPR2022-00388, challenging U.S. Pat. No. 10,966,015.
Stipulation Letter, Exhibit—1020, Filed on Jun. 14, 2022—Cited in IPR2022-00410, challenging U.S. Pat. No. 10,979,836.
Stipulation Letter, Exhibit—1023, Filed on May 10, 2022—Cited in IPR2022-00302, challenging U.S. Pat. No. 9,609,424.
Stipulation Letter, Exhibit—1044, Filed on Apr. 20, 2022—Cited in IPR2022-00242, challenging U.S. Pat. No. 8,111,839.
Stipulation Letter, Exhibit—1044, Filed on Apr. 20, 2022—Cited in IPR2022-00243, challenging U.S. Pat. No. 8,111,839.
Stipulation Letter; Exhibit—1034, Filed on Apr. 20, 2022—Cited in IPR2022-00234, challenging U.S. Pat. No. 9,124,982.
Summary of all applications in the '082 patent family, Exhibit—1018, Filed on Dec. 30, 2021—Cited in IPR2022-00369, challenging U.S. Pat. No. 10,405,082.
Summary of all applications in the '836 patent's family, Exhibit—1019, Filed on Jan 14, 2022—Cited in IPR2022-00410, challenging U.S. Pat. No. 10,979,836.
Summary of Application in '839 Patent Priority Chain, Exhibit—1041, Filed on Dec. 13, 2021—Cited in IPR2022-00243, challenging U.S. Pat. No. 8,111,839.
Summary of applications in '015 patent family, Exhibit—1018, Filed on Jan. 4, 2022—Cited in IPR2022-00388, challenging U.S. Pat. No. 10,966,015.
Summary of applications in '591 priority chain, Exhibit—1030, Filed on Dec. 20, 2021—Cited in IPR2022-00324, challenging U.S. Pat. No. 8,254,591.
Summary of Applications in '839 Priority Chain, Exhibit—1041, Filed on Dec. 13, 2021—Cited in IPR2022-00242, challenging U.S. Pat. No. 8,111,839.
Summary of Applications in '982 Priority Chain; Exhibit—1032, Filed on Dec. 13, 2021—Cited in IPR2022-00234, challenging U.S. Pat. No. 9,124,982.
Techopedia, Faceplate, Exhibit—2011, Filed on Sep. 13, 2022—Cited in IPR2022-00242, challenging U.S. Pat. No. 8,111,839.
Techopedia, Faceplate; Exhibit—2010, Filed on Sep. 9, 2022—Cited in IPR2022-00234, challenging U.S. Pat. No. 9,124,982.
Termination Decision: Post-DI Settlement, Exhibit—20, Filed on Dec. 12, 2024—Cited in IPR2024-00559, challenging U.S. Pat. No. 11,610,587.
Termination Decision: Pre-DI settlement, Exhibit—16, Filed on Dec. 12, 2024—Cited in IPR2024-01003, challenging U.S. Pat. No. 9,191,083.
Termination Decision: Pre-DI settlement, Exhibit—16, Filed on Dec. 12, 2024—Cited in IPR2024-01004, challenging U.S. Pat. No. 9,614,943.
Termination Decision: Pre-DI settlement, Exhibit—16, Filed on Dec. 12, 2024—Cited in IPR2024-01031, challenging U.S. Pat. No. 7,049,850.
Termination Decision: Pre-DI settlement, Exhibit—17, Filed on Dec. 12, 2024—Cited in IPR2024-01034, challenging U.S. Pat. No. 9,279,263.
Termination Decision: Pre-DI settlementPaper15, Dec. 12, 2024—Cited in IPR2024-01033, challenging U.S. Pat. No. 8,434,966.
Transcript of Deposition of Chris Kyriakakis, Ph.D. taken Oct. 7, 2022, Exhibit—2007, Filed on Oct. 17, 2022—Cited in IPR2022-00302, challenging U.S. Pat. No. 9,609,424.
Transcript of Deposition of Christopher Struck, Exhibit—1028, Filed on Jun. 15, 2023—Cited in IPR2022-01078, challenging U.S. Pat. No. 11,057,701.
Transcript of Deposition of Dr. Les Atlas, Exhibit—2007, Filed on Oct. 17, 2022—Cited in IPR2022-00324, challenging U.S. Pat. No. 8,254,591.
Transcript of Deposition of Dr. Les Atlas; Exhibit—2007, Filed on Sep. 9, 2022—Cited in IPR2022-00234, challenging U.S. Pat. No. 9,124,982.
Transcript of Deposition of Les Atlas, Ph.D., Aug. 18, 2022, Exhibit—2007, Filed on Sep. 13, 2022—Cited in IPR2022-00242, challenging U.S. Pat. No. 8,111,839.
Transcript of Deposition of Les Atlas, Ph.D., Aug. 18, 2022, Exhibit—2007, Filed on Sep. 13, 2022—Cited in IPR2022-00243, challenging U.S. Pat. No. 8,111,839.
Transcript of Deposition of Les Atlas, Ph.D., Exhibit—2016, Filed on Apr. 10, 2023—Cited in IPR2022-01106, challenging U.S. Pat. No. 11,039,259.
Transcript of Deposition of Nathaniel Polish, Ph.D., taken Sep. 29, 2022, Exhibit—2007, Filed on Oct. 19, 2022—Cited in IPR2022-00253, challenging U.S. Pat. No. 9,491,542.
Transcript of Deposition of Nathaniel Polish, Ph.D., taken Sep. 29, 2022, Exhibit—2007, Filed on Oct. 19, 2022—Cited in IPR2022-00281, challenging U.S. Pat. No. 9,270,244.
Transcript of Deposition of Richard M. Stern, Exhibit—2010, Filed on Mar. 23, 2023—Cited in IPR2022-01078, challenging U.S. Pat. No. 11,057,701.
Transcript of Deposition of Richard M. Stern, Ph.D., taken Oct. 27, 2022, Exhibit—2009, Filed on Nov. 8, 2022—Cited in IPR2022-00369, challenging U.S. Pat. No. 10,405,082.
Transcript of Deposition of Richard M. Stern, Ph.D., taken Oct. 27, 2022, Exhibit—2009, Filed on Nov. 8, 2022—Cited in IPR2022-00388, challenging U.S. Pat. No. 10,966,015.

(56) References Cited

OTHER PUBLICATIONS

Transcript of Deposition of Richard Stern, Ph.D., Exhibit—2010, Filed on Sep. 9, 2022—Cited in IPR2022-00282, challenging U.S. Pat. No. 8,315,400.
U.S. Appl. No. 09/653,869, Exhibit—1007, Filed on Dec. 20, 2021—Cited in IPR2022-00324, challenging U.S. Pat. No. 8,254,591.
U.S. Pat. No. 10,405,082, Exhibit—1001, Filed on Dec. 30, 2021—Cited in IPR2022-00369, challenging U.S. Pat. No. 10,405,082.
U.S. Appl. No. 61/778,737, Exhibit—1008, Filed on Dec. 21, 2021—Cited in IPR2022-00281, challenging U.S. Pat. No. 9,270,244.
U.S. Appl. No. 62/575,713, Exhibit—1006, Filed on Dec. 30, 2021—Cited in IPR2022-00369, challenging U.S. Pat. No. 10,405,082.
U.S. Appl. No. 62/575,713, Exhibit—1006, Filed on Jan. 4, 2022-Cited in IPR2022-00388, challenging U.S. Pat. No. 10,966,015.
Wikipedia, Apple headphones, Exhibit—2010, Filed on Sep. 13, 2022—Cited in IPR2022-00243, challenging U.S. Pat. No. 8,111,839.
Wikipedia, Microphone, Exhibit—2012, Filed on Sep. 13, 2022—Cited in IPR2022-00242, challenging U.S. Pat. No. 8,111,839.
Wikipedia, Microphone; Exhibit—2011, Filed on Sep. 9, 2022—Cited in IPR2022-00234, challenging U.S. Pat. No. 9,124,982.
Wiley Elec and Elecs Eng Dictionary (excerpts), Exhibit—2004, Filed on Mar. 21, 2022—Cited in IPR2022-00282, challenging U.S. Pat. No. 8,315,400.
Wiley Electrical and Electronics Engineering Dictionary (excerpt), Exhibit—2009, Filed on Oct. 7, 2022—Cited in IPR2022-01098, challenging U.S. Pat. No. 11,217,237.

* cited by examiner

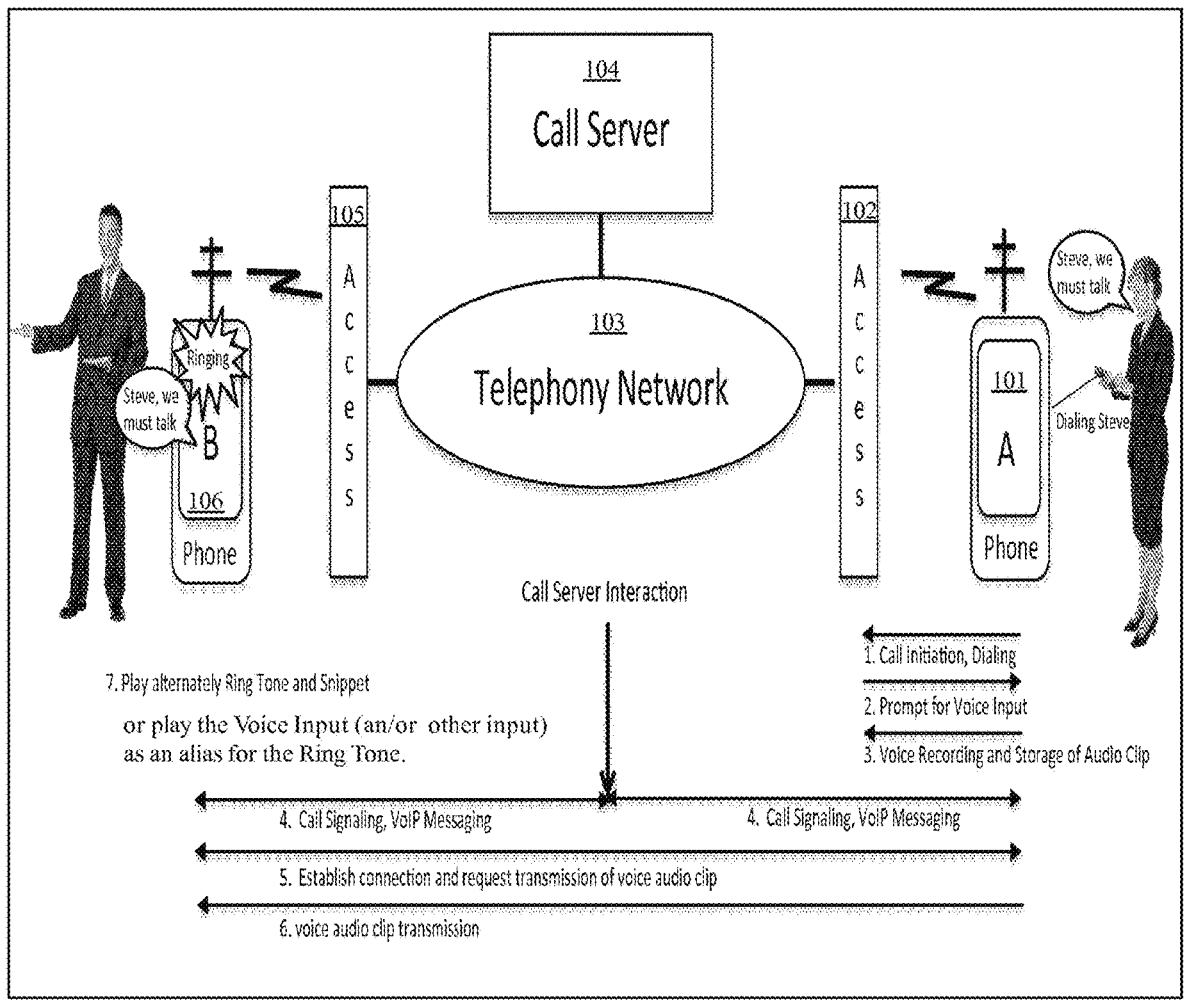
Figure 1: Telephone Call with Ring Tone Voice Alias

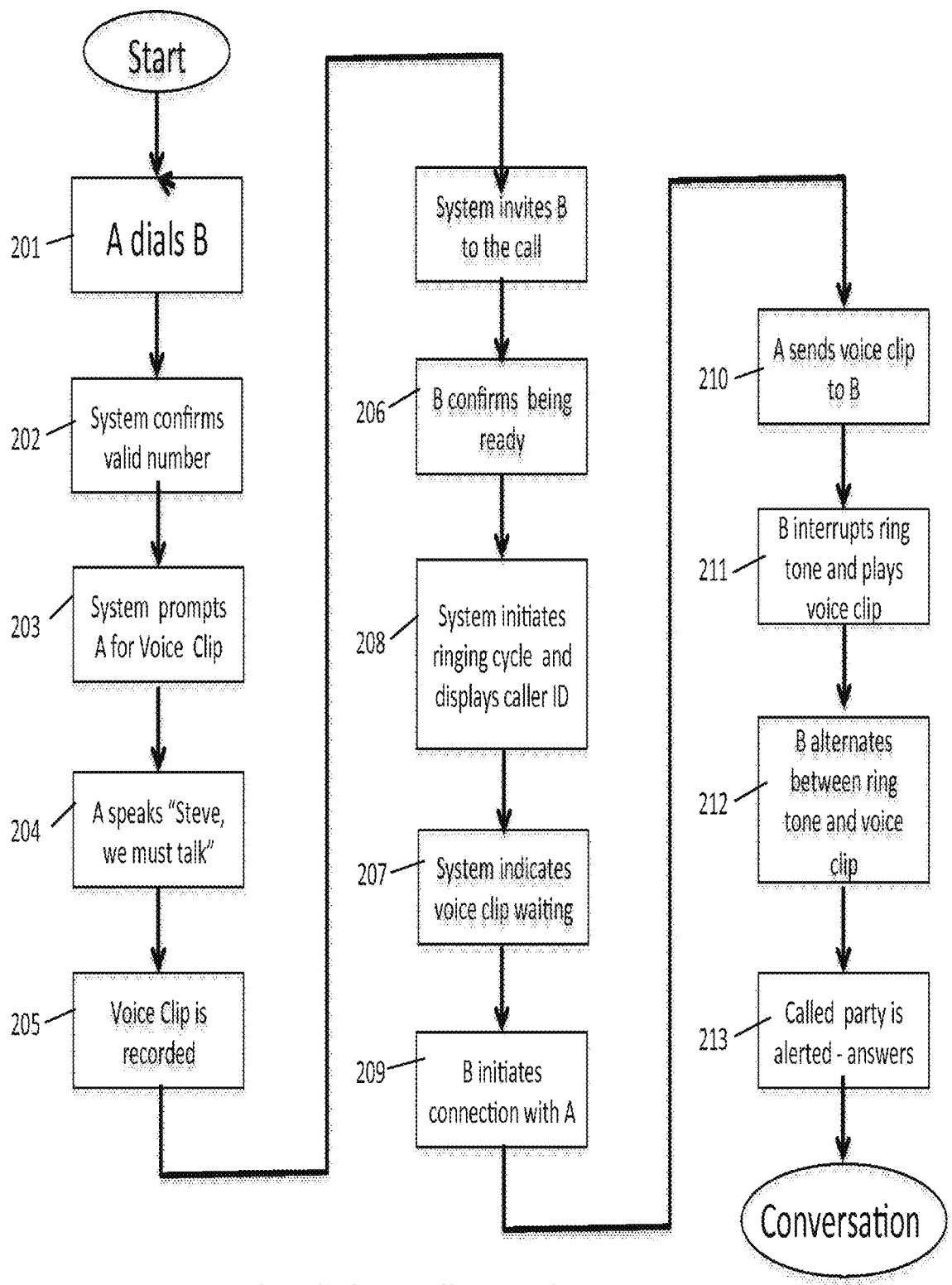
Figure 2: Example Call Flow as illustrated in Fig. 1

Voice and Signal Paths

Gateway Circuit Method

300

Gateway IP Method

320

App-to-App Method

330

400

500

600

800

REAL-TIME VOICE PAGING VOICE AUGMENTED CALLER ID/RING TONE ALIAS

CROSS-REFERENCE TO RELATED APPLICATION(S)

This application is a continuation of and claims priority to U.S. patent application Ser. No. 17/537,884, filed 30 Nov. 2021, which is a continuation of and claims priority to U.S. patent application Ser. No. 17/002,981 filed 26 Aug. 2020 which is a continuation of and claims priority to U.S. patent application Ser. No. 16/593,742, filed 4 Oct. 2019, now U.S. Pat. No. 10,812,652, which is a continuation of and claims priority to U.S. patent application Ser. No. 14/923,632, filed on Oct. 27, 2015, now U.S. Pat. No. 10,440,176, which is a continuation of and claims priority to both U.S. patent application Ser. No. 14/886,133, filed on Oct. 19, 2015, now U.S. Pat. No. 9,578,164, and U.S. patent application Ser. No. 14/511,154, filed on Oct. 9, 2014, now U.S. Pat. No. 9,172,794, which is a continuation of and claims priority to U.S. patent application Ser. No. 14/493,270, filed on Sep. 22, 2014, now U.S. Pat. No. 9,167,082, which claims the benefit of and claims priority to U.S. Provisional Patent Application Ser. No. 61/880,963, filed on Sep. 22, 2013, and where U.S. patent application Ser. No. 14/511,154 also claims the benefit of and claims priority to U.S. Provisional Patent Application Ser. No. 61/889,002, filed on Oct. 9, 2013, and where the present application claims priority to all and of which all are herein incorporated by reference in their entireties.

FIELD OF THE INVENTION

The embodiments herein generally disclose methods and systems for caller identification in modem communications technologies. Application of the embodiments can apply to all forms mobile and non-mobile forms of communications devices including wearable and body-borne computing. Some embodiments incorporate voice or audio clips in the caller identification procedure during a call setup of a telephone call. Some embodiments incorporate real-time voice paging voice augmented caller ID as a ring tone alias.

BACKGROUND OF THE INVENTION

Speech signals include information about the creator of the speech. It is well researched that humans can identify individuals from their voice, suggesting providing the existence of a perceptual representation of voice identity. The spoken word contains information about: who is calling as well as the emotional state of the speaker; it can signal happiness, dissatisfaction, urgency, anger, stress, and many more conditions reflective of the state of mind of the speaker. Additionally gender, age, ethnicity and nationality can also be discovered by one's voice.

BRIEF DESCRIPTION OF THE FIGURES

The embodiment and the following detailed description of certain embodiments thereof may be understood by reference to the following figures:

FIG. 1 depicts a network scenario of party A (the calling party) calling party B (the called party) and submitting a voice audio clip to be played at the B party device during the ringing cycle in accordance with the embodiments;

FIG. 2 depicts the action and call flow for the illustration in FIG. 1 in accordance with the embodiments;

DETAILED DESCRIPTION

Figure 3A:
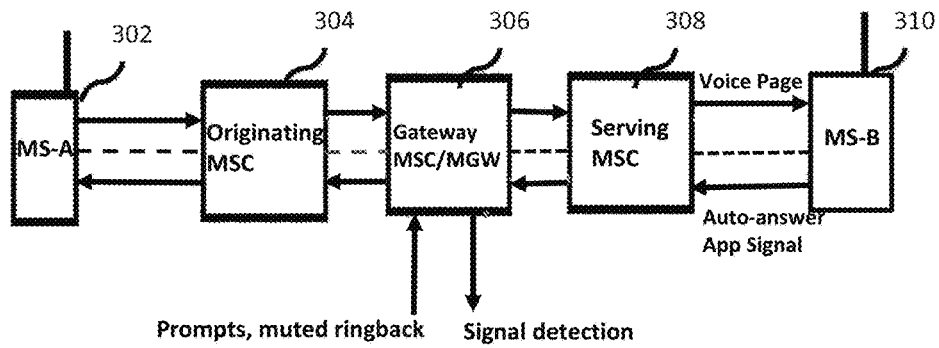
FIG. 3a depicts the voice and signaling paths for a gateway circuit method in accordance with an embodiment.

In today's telephony communication systems information about who is calling as well as the emotional state of the speaker as well as gender, age, ethnicity and nationality is not available to the recipient (called party) of a phone call during the call setup phase (telephony signaling protocol terminology), that is during the ringing phase of the arriving call before the call is answered.

If a voice or speech or audio clip of the calling party were presented during the ringing phase, the called party would be able to potentially identify and recognize a speaker from memory who is calling and obtain an impression of the caller's state of mind or the potential subject matter of the upcoming call and therefore be able to make a better-educated decision whether to answer the call. For example, consider a case whereby the called party is engaged in a business meeting and a call arrives from his or her spouse, a few seconds of a calling party's voice could reflect a possible stress situation of the spouse that would require the immediate attention of the called party. Conceivably there are many other situations where the receiving party (recipient or called party) could benefit from hearing a voice sample of the calling party without the need to look at or to touch the communication device before the call is actually answered.

Referring to FIG. 1, a system 100 in accordance with an embodiment can initiate a call from Party A to Party B using a calling party's phone or device 101 to dial and initiate a call to the called party's device 106. The device 101, for example, can connect to the device 106 via an access point 102 within range of the device 101, a telephony network 103 using a call server 104, and an access point 105 within range of the device 106. The telephony network, access points, and devices can be part of a wired system, a wireless system or a combination of both. The interaction at the call server 104 in such an example can include: 1) receiving the call initiation as a result of the calling party dialing the called party's phone number; 2) sending a prompt to the calling party for a voice input (or other input such as a picture or video of the calling party); 3) recording and storing of the voice input (and/or other input); 4) providing call signaling to one or both of the called party and calling party; 5) establishing a connection and requesting transmission of a voice input or audio clip (and/or other input); 6) transmitting the voice input (and/or other input) to the called party's device 106; and 7) playing the voice input (and/or other input) at the called party's device as an alias for a ring tone or play the voice input (and/or other input) alternately with the ring tone until the called party answer's their device (106) or rejects the call.

Furthermore, the calling party could transmit a still photo or video to the called party instead of or in addition to the voice clip.

Most telephony service providers today offer caller-ID services for telephone users. These services enable a user to identify the name and/or the phone number of the caller before choosing to accept the call. It would be a significant enhancement to the telephone communications functionality if the presented caller-ID were either accompanied by a voice audio clip of the caller and played by acoustic transducers at the called party's communication device as an alias for the ring tone or interleaved with the ringing tone before the called party answers the call. Further note, in some embodiments, the message (whether voice or video) can be recorded at the time of the call origination. In some embodiment, the message (voice or video) can be pre-recorded at some point before the call origination. In yet another embodiment, the voice message or video message can be captured and presented live or virtually live and presented live to the called party. In any event, the voice or video message in some embodiments is "obtained" or retrieved or selected at the time of the call origination. In other words, "obtaining" the voice or video message means that the message is being currently retrieved from a previous recording, obtained from a current recording, or currently streamed to the called party.

Caller identification is a telephony feature that is widely deployed by telephony service providers. The call feature server or telephony switching system obtains and sends the caller identification (of the calling party) to the call receiving device (called party) during the call setup and ringing phase and is subsequently displayed on the communication device of the called party. In particular mobile phones have the ability and are programmed to receive the caller ID in form of a protocol message and display the calling name and number during the ringing cycle. This is standard behavior for today's generation of mobile phones or cell phones, which are connected over a Radio Access Network (RAN) or via VoIP protocols. The call server or switching system delivers the caller ID information either by encoding the information in a VOIP protocol, or over the RAN protocol. The mobile device upon receiving the caller ID information includes the data in the call announcing screen during the ringing cycle.

Some embodiments herein create an opportunity for the calling party to obtain a voice audio clip that is transported over the telephony network or internet to the called party during the call setup phase and which is replayed at the called party's device as a stand alone ring tone alias or interleaved with the ring tone of the incoming call. The microphone built into a phone or other enables the typical capture of the voice clip.

In another embodiment, the calling party hears an audible ring-back tone and then (experiences) what they perceive as their call being answered, and thus begins to speak. During the initial speaking phase, the calling party's audio (captured by a microphone at the calling party's device, for example) is actually being played back to the called party device even thought the called party hasn't yet physically answered their phone. The called party can either choose to answer the phone and engage/continue the conversation, or ignore the calling party's message. If answered, the calling party and optionally the called party would receive an indicator that the live voice conversation is ready to ensue and then the live conversation between the calling party and called party would ensue. The indicator that the live voice conversation is ready can be a text message, iconic symbol, a light, a tactile alert or an auditory signal indicative of the live message.

In another embodiment, the calling party could hear a message and or unique sound or other form of indicator (as described above including text, iconic, light, tactile, auditory, etc.) advising them that the called party's phone is playing their audio but that the called party hasn't accepted the calling party's call.

In another embodiment, the calling party audio clip could be sent to an earphone thus allowing the called party to discreetly audition the calling party's voice clip.

In another embodiment, the calling party may use this feature to convey a short message to remind, or otherwise covey to the called party an action that should or shouldn't take place. In one example, a child could simply verbalize to their parent or other caregiver/friend that they are going to a friend's house after school. In this scenario, the called party could hear the child's voice and decide if they need to take action or not. In a manner, this service operates as an alert with personalized information incorporated into in. The personalized information could be audio, photo, video or text. In other words, the calling party can modify the ring tone heard by the called party. This modification could comprise replaying a voice message played by the calling party.

In another embodiment, the calling party would hear or otherwise be texted a message confirming that their voice/audio message was played (auditioned) and otherwise that the called party was available and/or on the called party's device.

In another embodiment, the calling party could utilize speech, voice or other forms of audio to be sent over an email system, which are then played automatically on the recipient's phone.

In another embodiment, the calling party could utilize speech, voice or other forms of audio to be sent over a text system, which are then played automatically on the recipient's phone.

In another embodiment, a photo or video clip that the calling party posts, is presented during the ringing phase as an alias of the ring tone, and the called party would then be able to potentially identify and recognize the calling party from the still photo or video clip and therefore be able to make a better-educated decision whether to answer the call.

In another embodiment, depending on the characteristics of the caller ID, the call can be automatically rejected, or routed to a different number (including answer message associated with this class of caller ID). Examples of characteristics that can be analyzed from the voice or video message (and/or caller ID if a pre-existing profile or retrievable profile exists) include: age, nationality, ethnicity, or temperament, of the calling party. Methods, systems, and apparatus, including computer programs encoded on a computer storage medium, are described for collecting, transporting and replaying a voice audio clip of a caller obtained (retrieved or recorded or streamed to) at the time of initiating a telephone call, at the called party's communication device interleaved with the ring tone and in addition to displaying caller-ID. Note, the embodiments herein are distinguishable from retrieving pictures or other data stored in association with a called party's phonebook or contact book when detecting a caller ID.

In some embodiments, the method can be realized for packet switching systems or circuit switching systems or both packet and circuit switching systems.

In an embodiment and referring to FIG. 2, after the caller or calling party A dials the called party B at 201 and the system confirms party B's number as a valid number at step 202, the calling party is prompted during the call setup phase to submit a brief voice audio clip directed to the called party at step 203. The calling party provides an input (e.g., "Steve, we must talk") at 204 and the voice audio clip is recorded and stored by the originating device at step 205. The system can invite the called party to the call and the called party can confirm being ready at 206. At the point of the call setup procedure, when the called party device is instructed to apply ringing (at step 208), a new indication in the ringing message (at step 207) will inform the called party device that a voice package is waiting for delivery. The called party device then may establish a speech connection (at step 209) with the calling party device, which is used to transport the voice audio clip to the called party device (at step 210). The receiving device then may interrupt the ring tone and play the voice clip as an alias for the ring tone at step 211 or alternatively interleave the ringing tone with the voice content of the transported voice audio clip and play the voice content over the devices speaker system (at step 212). At 213, the called party is alerted and can optionally answer before a phone conversation ensues.

In some embodiments, the voice audio clip may be obtained through a 2-stage call initiation procedure and stored in computer storage memory of the switching system or one of its dedicated storage systems. This specifically applies to scenarios where the originating device lacks intelligence or memory for storing a voice audio clip.

In some embodiments, the voice audio clip may be encoded in telephony messages and protocols and transported to the called device as part of the call setup procedure, and be replayed by the receiving device during the ringing cycle interleaved with the ringing tone in addition to the caller ID notification display. The voice audio clip may be replayed either before or during the ringing cycle.

In an embodiment, a method includes modification of the telephony call setup protocols comprising:

a) Notification of the called party that in addition to applying ringing a voice packet is waiting for retrieval (207).

b) Establishing a transport connection for the voice audio clip (209).

c) Establishing a session with the caller of a phone call to obtain and store the voice audio clip in computer memory (203).

In an embodiment, a method includes identifying a caller associated with an incoming call from an originating telecommunications device and displaying the calling number and/or name at the called device.

Methods and systems disclosed herein provide for a telephony protocol expansion to include the collection, transport, and delivery of a callers voice audio clip to the called party interleaved with the ring tone.

The features of the embodiments, which are believed to be novel, are set forth with particularity in the appended claims.

The embodiments may best be understood by reference to the following description, taken in conjunction with the accompanying drawings.

While the specification concludes with the claims defining the features of the invention that are regarded as novel, it is believed that the embodiments may be better understood from a consideration of the following description in conjunction with the drawings figures, in which like reference numerals are carried forward.

The terms and phrases used herein are not intended to be limiting but rather to provide an understandable description of the invention.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

As described above, FIG. 1 illustrates one exemplary embodiment of the system for obtaining, storing, transporting, and replaying audio clips at the called device of a telephone call. Calling party A dials called party B and provides a voice audio clip in a 2-stage call initiation (First: Dialing, Second: Speaking), By design, the illustration in FIG. 1 does not necessarily depict photos, videos, or other metadata, but various embodiments can include such various inputs indicative of the caller or calling party attempting to reach the called party.

FIG. 2 provides a flow chart of individual steps that lead to the delivery of a voice audio clip to party B interleaved with ringing and caller ID display.

Example embodiments of the present invention are described herein in the context of systems, methods and computer program products for obtaining, recording, transporting, and playing back audio clips of a short duration (e.g. 5 sec). A telephony subscriber in the process of making a call may be prompted to provide a voice audio clip destined for the called party (203). The resulting audio clip may be stored either on the caller's device or in computer memory of a switching system. Telephony protocols and signaling technologies are modified to transport (209,210) the voice audio clip to the called party during the call setup phase. Upon receiving the audio clip, the called party may interleave ringing tones and the audio clip content during the ringing cycle (212) of the system, and in addition to the display of caller ID information (208).

In one exemplary embodiment, the voice audio clip may be obtained from the caller of a telephone call (203). After the caller has input the destination telephone number and after validation of the number by the switching systems (202) the caller may be prompted to submit an audio clip intended for the called party (203). The clip may be temporarily stored in local memory of the device or in computer storage memory of the switching systems or in a dedicated adjunct server.

In one exemplary embodiment, when the destination device (at the called party) or an access system for the destination device is instructed to initiate a ringing cycle, a new telephony protocol element (message or signal) may inform the destination device or its access system that an audio clip is waiting to be delivered to the destination device (207). In response, the destination device or its access system may initiate a transport connection (209) to the calling device or to the system where the audio clip is stored and receive the clip over the established transport connection (210). Upon receiving the audio clip the destination device or its access system may replay the clip repeatedly as an alias for the ringtone or may replay the clip and interleaved with the ring tone until the called party answers or rejects the call.

In one exemplary embodiment, the maximum duration for the voice audio clip may be administrable.

Some embodiments can include methods, systems, and apparatus, including computer programs encoded on a computer storage medium, for collecting and transporting a voice audio clip of a telephony caller acquired at the time of initiating a telephone call, and playing the voice audio clip at the called party's communication device before the call is answered or interleaved with a ringing tone and in addition to caller-ID notification, including:
 a. Updating telephony signaling and packet protocols for notification, collection, and transport of telephony caller originated voice audio clip(s).
 b. Storing telephony caller originated voice audio clips at the caller's communication device or at a component of the connecting switching systems
 c. Updating telephony operational procedures for the establishment of a communication session with the originator of a telephone call to obtain a voice audio clip.
 d. Updating telephony operational procedures for retrieval and transport of a caller originated voice audio clip.
 e. Updating telephony procedures for the replay of a voice audio clip at the communication device of a called party.
 f. Modifying the ringing operation at the called party device or its access system to receive a voice audio clip without a ringing tone in a repeating cycle until the associated call is answered or rejected.
 g. Modifying the ringing operation at the called party device or its access system to interleave a received voice audio clip with a ringing tone in a repeating cycle until the associated call is answered or rejected.

Some embodiments include methods, systems, and apparatus, including computer programs encoded on a computer storage medium, for collecting and transporting a voice audio clip of a telephony caller acquired at the time of initiating a telephone call, and transporting a still photo and or video at the called party's communication device before the call is answered or interleaved with a ringing tone and in addition to caller-ID notification, comprising:
 a. Updating telephony signaling and packet protocols for notification, collection, and transport of telephony caller originated still photo and or video clip.
 b. Storing telephony caller originated still photo and or video clips at the caller's communication device or at a component of the connecting switching systems
 c. Updating telephony operational procedures for the establishment of a communication session with the originator of a telephone call to obtain a still photo and or video.
 d. Updating telephony operational procedures for retrieval and transport of a caller originated still photo and or video.
 e. Updating telephony procedures for the replay of a still photo and or video at the communication device of a called party.
 f. Modifying the ringing operation at the called party device or its access system to receive a still photo and or video without a ringing tone in a repeating cycle until the associated call is answered or rejected.
 g. Modifying the ringing operation at the called party device or its access system to interleave a received still photo and or video with a ringing tone in a repeating cycle until the associated call is answered or rejected.

In some embodiments, methods, systems, or devices can have a maximum duration of the voice audio clip that is administrable. The methods and systems above can also apply to packet switched or circuit switched telephony or both. In some embodiments, permission for which parties are able to update the telephony signaling and packet protocols is given automatically by an analysis of the called parties address book. In some embodiments, permission for which parties are able to update the telephony signaling and packet protocols is given manually the called party. In some embodiments depending on the characteristics of the calling ID, the call can be automatically rejected, or routed to a different number (including answer message associated with this class of caller ID). Examples of characteristics include: age, nationality/ethnicity, or temperament of the calling party.

In some embodiments a communication device can include an audible output device, a memory having computer instructions, and one or more processors operatively coupled to the memory and the audible output device. The execution of the computer instructions can cause the one or more processors to perform operations including: receiving a call from a calling party that includes caller identification information and a voice or video message associated with the caller identification information; presenting the caller identification information; and presenting the voice message or video message as an alias to a ring tone or interleaved with the ring tone before the call from the calling party is answered. In some embodiments, the communication device is a mobile phone. In some embodiments, the communication device is one among a landline phone, a desktop computer, a laptop computer, a notebook computer, a tablet computer, or a phablet computer. It can also be a smart phone, a smart watch, an earphone, or a body worn computer or wearable computing device as further defined below.

In some embodiments, the voice or video message is a recorded voice or recorded video message retrieved or obtained or recorded at the time of initiating the call to the called party by the calling party. In some embodiments, the one or more processors presents the voice message obtained at the time of initiating the call to the called party by the calling party as the alias for the ring tone presented at the audible output device for the communication device. In some embodiments, the one or more processors presents the voice message obtained at the time of initiating the call to the called party by the calling party interleaved with the ring tone presented at the audible output device for the communication device. In some embodiments, a display coupled to the one or more processors presents the video message obtained at the time of initiating the call to the called party by the calling party as the alias for the ring tone presented at the communication device when receiving the call from the calling party. In some embodiments, the audible output device and a display coupled to the one or more processors presents the video message obtained at the time of initiating the call to the called party by the calling party interleaved with the ring tone presented at the communication device.

In some embodiments, the communication device further includes a display coupled to the one or more processors wherein the video message is a photograph taken (or retrieved or otherwise obtained) at the time of initiating the call to the called party by the calling party which is presented as the alias for the ring tone at the communication device when receiving the call from the calling party. In some embodiments, the communication device further includes a display coupled to the one or more processors wherein the recorded video message is a photograph retrieved or obtained or taken at the time of initiating the call to the called party by the calling party which is presented with the ring tone at the communication device in a repeating cycle when receiving the call from the calling party until the call is answered or rejected.

In some embodiments, the one or more processors analyze the characteristics of the caller identification information and the voice message or the video message and routes the message based on the analysis.

In some embodiments, a method at a communication device can include receiving a call from a calling party that includes caller identification information and a voice or video message associated with the caller identification information; presenting the caller identification information via a presentation device operatively coupled to the communication device; and presenting via the presentation device the voice message or video message as an alias to a ring tone or interleaved with the ring tone or presented with the ring tone in a repeating cycle until the call from the calling party is answered or rejected. In some embodiments, the presentation device is a speaker, a display, or both. In some embodiments, the voice or video message is retrieved or recorded or otherwise obtained at the time of initiating the call to the called party by the calling party.

In some embodiments, the method presents the voice message retrieved or recorded or otherwise obtained at the time of initiating the call to the called party by the calling party as the alias for the ring tone presented at the presentation device for the communication device. In some embodiments, the method presents a voice message obtained at the time of initiating the call to the called party by the calling party interleaved with the ring tone or presented in the repeating cycle at the presentation device for the communication device. In some embodiments, the method analyzes the characteristics of the caller identification information and the voice message or the video message and routes the message based on the analysis.

In some embodiments, a system for communicating with a communication device that presents a ring tone and caller identification information includes a memory having computer instructions and one or more processors operatively coupled to the memory. The execution of the computer instructions causes the one or more processors to perform operations including originating a call from a calling party to a called party that includes caller identification information and a message having a voice message, or video message or photograph associated with the caller identification information obtained at a time of the call origination; and transmitting the caller identification information and the message to the called party for presentation at the communication device of the called party. In some embodiments, the caller identification information and the message is presented at the communication device of the called party as an alias to the ring tone or interleaved with the ring tone or presented with the ring tone in a repeating cycle until the call from the calling party answers or rejects the call. In some embodiments, the system is a telephone communication system for a landline or a mobile phone. In some embodiments, the one or more processors analyze the characteristics of the caller identification information and the message and routes or rejects the message based on the analysis.

The system can be housed in any type of Wearable/Body-Borne computing. The system can further represent a single device or family of devices configured in a master-slave, master-master arrangement for example in an smartphone, smart watch or optical head-mounted display connected physically, optically or wirelessly to a either another Wearable/Body-Borne computer or an earpiece that may or may not contain a microphone or bone conduction pickup. A few definitions follow below.

Wearable and Body-Borne Computing can include: The field of wearable computing, however, extends beyond devices worn only outside the body. "Body-Borne Computing" or "wearable computing" is used as a substitute for "Wearable Computing" so as to include all manner of technology that is on or in the body, e.g. implantable devices as well as portable devices like smartphones.

A term that refers to computer-powered devices or equipment that can be worn by a user, including clothing, watches, glasses, shoes and similar items. Wearable computing devices can range from providing very specific, limited features like heart rate monitoring and pedometer capabilities to advanced "smart" functions and features similar to those in smartphones, smart watches, optical head-mounted displays and helmet-mounted displays. These more advanced wearable computing devices can typically enable the wearer to take and view pictures or video, hear audio signals, read text messages and emails, respond to voice commands, browse the web and more.

Acoustic transducers can include: acoustic, bone conduction, transdermal, magnetic, optical, Electromagnetic Acoustic Transducer (EMAT), Piezoelectric, Magnetostrictive transducers. These transducers in general can either make contact or be used in a non-contact arrangement such as with omnidirectional Transducers or directional transducers).

Microphones constitute: An acoustic-to-electric transducer or sensor that converts sound or vibrations into an optical or electrical signal. Microphones use electromagnetic induction (dynamic microphone), capacitance change (condenser microphone), piezoelectric generation, or light modulation to produce an electrical voltage signal from mechanical vibration. Microphones can also include an ear canal microphone, which is capable of capturing a voice directly from the user ear canal. These are often referred to as bone conduction microphones.

Bone conduction is the conduction of sound to the inner ear through the bones of the skull. Bone conduction transmission can be used with individuals with normal or impaired hearing.

Earphones can include: Earphones, canal phones, and headphones that can be mono or stereo as well as binaural. In addition, the term applies to hearing aids such as Behind The Ear (BTE devices). Earphones can also include in Concha, inn Canal or personal sound amplification products or PSAP's (assisted listening devices). An Earphone may also be considered an electrode array, which is a group of electrodes that collects the impulses from the stimulator and sends them to different regions of the auditory nerve.

A Gateway MSC or MSC is a mobile switching center that receives incoming calls from other carriers for a specific group of dialed Mobile Dialing Numbers (MDNs) that the wireless carrier hosts. Dialed MDNs that are not specific to a wireless carrier (e.g. they have been ported via the Number Portability (NP) database) are assigned an LRN (Location Routing Number) that is specific to the ported-to wireless carrier's MSC. A Gateway MSC is responsible for locating the dialed MDN and obtaining its International Mobile Subscriber Identity (IMSI) by query to the Home Location Register/Home Subscriber Server (HLR/HSS) and then completing the call as directed by the services identified in the HLR (including voice paging).

HLR is the Home Location Register that stores subscriber information (e.g., what services are subscribed to by the subscriber).

HSS is a combination of HLR with authentication, authorization and accounting (AAA) for combined circuit/IP wireless networks.

The Internal Mobile network subscription identifying number (IMSI) is also known as MIN on cdma2000 networks. The IMSI Identifies the operator as well as the subscription.

A mobile directory number (MDN) is a phone number assigned to a wireless device. With number portability, this no longer directly identifies the operator.

A Network Answer is the answer signal that passes from the mobile through the network and triggers a voice path connection and usually the start of billing.

Signaling System 7 or SS7 is the internal telecom signaling network used in both wireline and wireless systems. SS7 is similar in concept to IP. Note that often SS7 runs over IP instead of the SS7 physical layer.

User Answer: If a call is auto-answered, an "Answer" button can be presented to the user to trigger an action that simulates a network answer (even though that has, without the knowledge of the user, already occurred.)

A voice page or VPG is a voice recorded from the calling party that is delivered to the terminating party (or called party) in real time before the User (or called party) answers.

A Voice Page List or VPL is a list of voice pages and meta-data, similar to a list of text messages.

In some embodiments, some of the elements of a real-time voice paging service are incorporated into the concept of the ring tone alias. In some of the basic embodiments, the caller can be prompted to start talking while the phone at the number they dialed has just started ringing. The voice is played through to the called party (or terminating party), for a limited time, and the terminating party has the option to answer the call, disconnect, divert to voice mail or simply wait for the time limit of the message, at which point normal no-answer handling will occur.

Possible delivery and signaling methods include the following:

a. 1. App-to-App. Both originating and terminating party have downloaded an App for this feature. See FIG. 3C.
b. 2. Gateway with IP delivery. The terminating mobile's operator has a gateway with both circuit switched and IP connections. Voice paging and signaling are transmitted over IP. The terminating party has an App to control call processing within the device. See FIG. 3B.
c. 3. Gateway with Circuit delivery. The terminating mobile's operator has a gateway with only circuit switched connections. Voice pages are delivered over the circuit connection. Signaling may be via tones or by indirect triggering of SS7 messages. See FIG. 3A.
d. 4. Text to voice in phone. Text messages received by the App in the phone are converted to voice.
e. 5. Text to voice in the SMSC. The terminating party's SMSC converts an SMS message from text to voice and delivers the voice over an IP connection.

Methods for controlling service possibly include:

a. 1. If the service involves the terminating party's wireless operator then they will have overall control over the service based on subscription by a customer.
b. 2. The terminating party will have an On/Off switch for the service.
c. 3. In the App-to-App version, the originating party will also be able to turn the service off or on.
d. 4. The service can be turned on automatically when the speed of the party is greater than a set amount.
e. 5. The service can be automatically turned off if the ringer is set to silent or vibrate without a headphone connected.
f. 6. The service can be automatically turned off based on roaming information (e.g. outside home carrier, outside home country).
g. 7. The service, if turned off, can be turned on for one call by an additional button for an incoming call (along with the normal buttons to accept or reject the call).

Feedback to the Caller

The feedback to a calling party can be given at various levels based on knowledge of the calling party number and the number of previous times they have invoked the service. For unknown parties and those who have never previously invoked the service, a lengthy introduction can be given. For those who have called a few times a shorter message can be given. For those who have called many times no message will be given but, in all cases, a special tone will be played. The messages can be similar to:

a. 1. "Please let <name recorded at setup> known why they should answer this call. They will hear you as you talk for up to <time limit> seconds and they may answer the call if it is safe to do so."
b. 2. "Leave a voice page for <name recorded at setup>".

This message can be provided in the preferred language(s) of the called party that are supported by their wireless carrier (e.g. English and Spanish in the US, English and French in Canada).

In addition, while the caller is talking, a ring-back tone can be played faintly during the voice paging phase. If the call transfers to voice mail, this will stop. Frequent callers will soon realize the significance of this.

Actions by and Signals from the Terminating Party

The terminating party may take one of several actions during voice paging, and each will generate different signals. The word "button" could refer to any user interface object, including gestures or voice commands.

Answer

Even if the call is auto-answered, the user will still believe the call is unanswered. If the "answer" button is pressed the RAN will be informed that the call is answered (if not already done) and a special signal will be sent to either the originating App or the Gateway via IP, a feature code (e.g. *123) or by tones (MF or DTMF). This will stop recording of the voice page as the call is now connected normally.

The voice page would normally be discarded at this point (as the terminating party has the opportunity to get the caller to repeat anything they missed), although an option could be provided to retain the recording.

Disconnect/Divert

This will signal the network to reject the call. In the App-to-App version a signal will be sent to the originating App to stop the transmission of voice packets.

The voice page would normally be discarded at this point (as the terminating party is probably not interested in the call), although an option could be provided to retain the recording.

The network may well invoke Call-Forward-No-Answer or diversion to Voice Mail in response to this. If the terminating party's operator is providing the service, coordination with voice mail can be smoother.

Do Nothing:

If the terminating party does nothing, the forwarding of voice packets will cease after a timeout, along with the provision of muted ringback to the caller. The caller may be routed to voice mail immediately or, in the App-to-App case, after an independent call-forward-no-answer timer expires. The terminating party's mobile will store the voice page in a list, similar to the storage of incoming text messages, where they can be later played back. Each voice page will be annotated with available information on the calling party, time and duration.

Identified Issues with App-to-App Version

In the App-to-App version diversion to voice mail occurs independently of the App. Therefore, if the voice paging timer is set too long, diversion to voice mail could occur before the voice paging is completed, which would be confusing and annoying.

In the App-to-App version there needs to be a method to convert from a phone number (MDN) to an IP address. The easiest way is to have a "Service Box" with a known domain name/IP address in the network where all downloaded Apps can register their associated MDN (external phone number) and IMSI (wireless network identifier). This introduces security issues (e.g. spam to people with known MDN).

The voice call (unanswered at the time of voice paging) and the voice paging must be synchronized. A positive signal from the terminating app must be received before voice pages are transmitted. The Terminating Mobile must verify that the incoming call matches (e.g. via calling number ID) the voice paging information. This may require calling number id.

Identified Issues with Gateway Version:

Signals need to be sent from the terminating party back to the gateway (e.g. Reject, User Answer). A simple, old fashioned approach (given that reverse audio is not yet cut through) is to use MF/DTMF tones. This avoids the issues with setting up an IP connection (such as addressing). Another approach would be the use of feature-codes (e.g. *123) however this introduces potential incompatibilities such as systems not always sending the signal back to the HLR, use of the same signal by another service, and so on.

Auto-answer starts the billing clock. However, the operator is in charge of the call and can decide whether billing starts at this point, or with user answer. For many users with unlimited, or almost unlimited, voice plans, this would not be a big issue. For budget conscious users it could be.

The "DB" used by the Gateway MSC could be the Number Portability database, the HLR/HSS or, the Gateway MSC and Media GW could be the same device. The best method for this requires further investigation and may differ between operators and infrastructure vendors.

Additional Features

A means to retract the acoustic (voice) page

A means to process with acoustic (voice) page utilizing time compression while preserving original pitch.

A means to interface with Social Media thus a tweet, Facebook, Google+ or other can be acoustically played on the mobile phone. A TTS engine would then convert the Social media text. A means to interface with email thus sender of an email or other can be acoustically played on the mobile phone. The email would be converted by a TTS engine.

A means to interface with email thus sender of an text or other can be acoustically played on the mobile phone. The text would be converted by a TTS engine.

A means to interface for an "Amber" alert whereas the alert can be acoustically played on the mobile phone. The alert would be converted by a TTS engine.

A means to wake up the phone and for the voice paging system to be heard if phone was off or if ringer was off or in DND mode A means for the voice paging platform to begin playing the message with a lower volume than the final volume, thus not to cause interruption during a users meeting. The volume could continue to rise during the voice page sequence.

A means for the rules on the called party device to allow specific users to utilize voice paging for any feature such overriding DND, Volume off as well as turn on phone.

A means to activate the phones microphone to automatically be enabled so the calling party could hear the called party even though the called party has not answered the phone.

FIG. 3A illustrates the voice and signal paths in a gateway circuit method 300 wherein a mobile subscriber unit 302 originates a call and connects with an serving MSC 308 via an originating MSC 304 and a Gateway MSC or mobile gateway 306. The gateway 306 can prompt the caller to leave a page and can also provide a muted ringback in the case the calling party does not answer the page. When a live or "real-time" paging signal is being provided by the serving MSC 308 to the called party at device 310, the device 310 can automatically answer back to the serving MSC 308. Note that voice pages are delivered over a circuit connection and signaling may be via tones or by indirect triggering of SS7 messages.

Figure 3B:
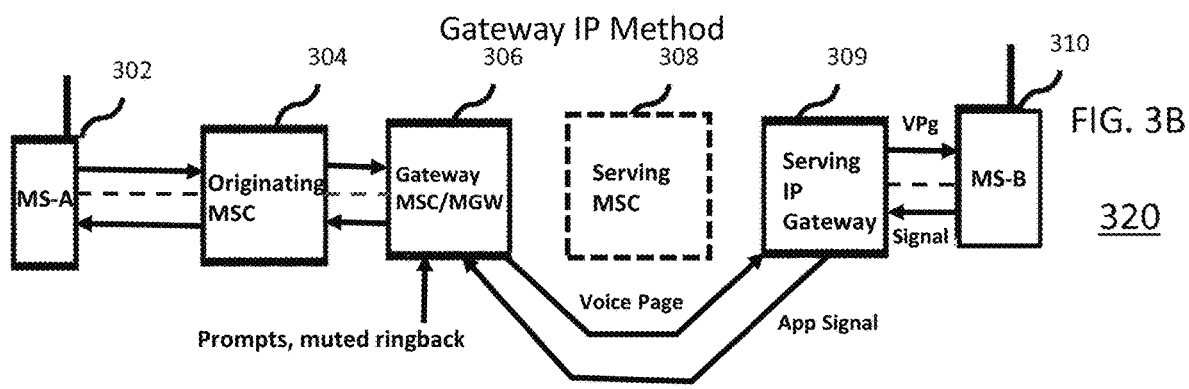
FIG. 3b depicts the voice and signaling paths for a gateway Internet Protocol (IP) method in accordance with an embodiment.

FIG. 3B illustrates the voice and signal paths in a gateway IP method 320 where a mobile subscriber unit 302 originates a call and connects with an serving IP gateway 309 (and bypassing a serving MSC 308) via an originating MSC 304 and a Gateway MSC or mobile gateway 306. The gateway 306 can prompt the caller to leave a page and can also provide a muted ringback in the case the calling party does not answer the page. When a live or "real-time" paging signal is being provided by the serving IP gateway 309 (via the gateway 306) to the called party at device 310, the device 310 can signal back to the serving IP gateway 309 (to the gateway 306, the originating MSC 304 and mobile subscriber unit 302. The terminating mobile's operator can have a gateway with both circuit switched and IP connections. Voice paging and signaling are transmitted over IP. The terminating party has an App to control call processing within the device.

Figure 3C:
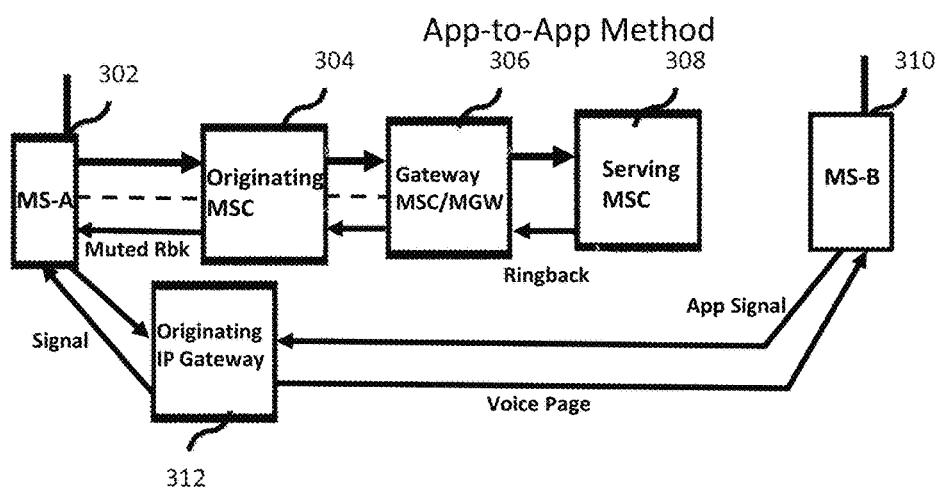
FIG. 3c depicts the voice and signaling paths for an application to application or App-to-App method between mobile phones in accordance with an embodiment.

FIG. 3C illustrates the voice and signal paths in a App-to-App method 330 where both originating and terminating party have downloaded an App for this feature and where an originating IP gateway 312 forwards the voice page from the originating mobile unit 302 to the terminating mobile unit 310. The originating IP gateway 312 also serves to send an App signal back from the terminating mobile unit 310 to the originating mobile unit 302.

Figure 4:
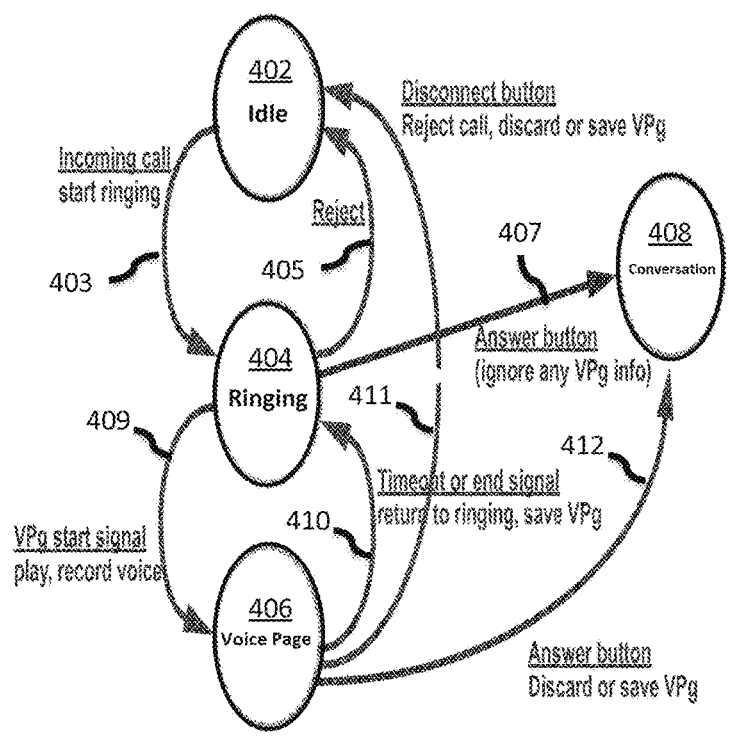
FIG. 4 illustrates a state chart for a terminating mobile device (for the called party) in accordance with an embodiment.

FIG. 4 illustrates the state diagram 400 of a terminating mobile device (such as mobile device 310 in FIGS. 3A-3C) in various embodiments. At state 402, the terminating device is idle, at state 404 the device is ringing, at state 406, the device is receiving a voice page, and at state 408 the terminating device can be in a live conversation with the originating device. When the terminating device is idle at 402, the device can receive at 403 an incoming call causing the device to go into the ringing state 404. If the device at ringing state 404 rejects at 405 the incoming call, then the device returns to the idle state 402. If the terminating device at 407 answers the incoming call (by selecting an answer button for example) before a voice paging signal starts (at 409), then the terminating device enters into a conversation and into the conversation state 408 and can ignore any voice paging information. If the call is not rejected at the ringing state 404 and not answered before the voice paging signal starts, then the voice paging signal starts at 409 and the terminal device enters the voice page state 406. In the voice page state 406, if the device at 410 times out or receives an end signal, then the terminating device returns to the ringing state 404 and causes the device to save the voice page message left by the calling party. In the voice page state 406, if the device at 411 gets a disconnect or reject signal (via a disconnection button for example), then the terminating device returns to the idle state 402 and the call is rejected and the voice paging message left by the calling party is either discarded or saved. In the voice page state 406, if the device at 412 answers the call (after the voice paging signal starts at 409), then the terminating device enters into the conversation state 408 and the voice paging message left by the calling party can either be discarded or saved.

Figure 5:
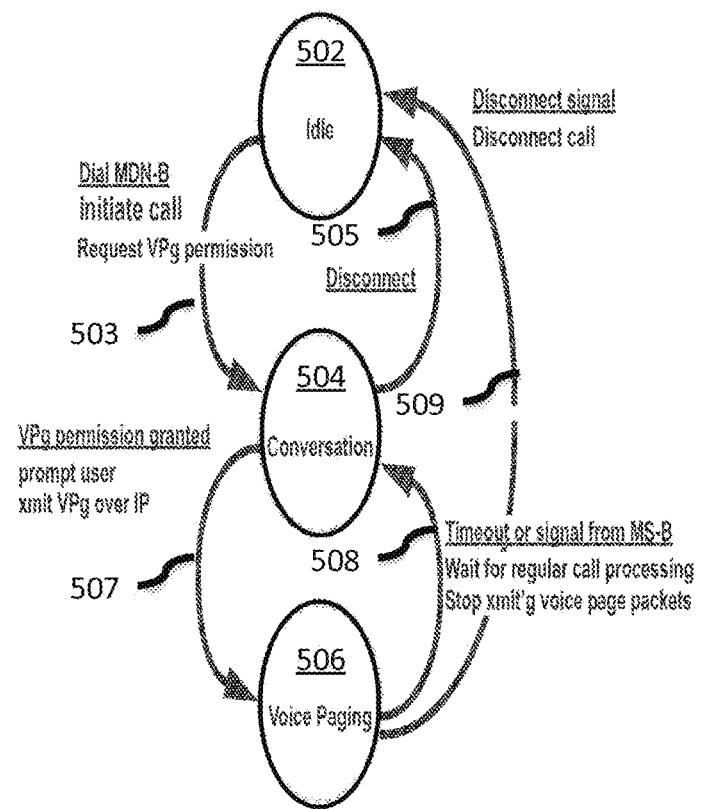
FIG. 5 illustrates a state chart for an originating mobile device (for a calling party) in accordance with an embodiment.

FIG. 5 illustrates the state diagram 500 of an originating mobile device (such as mobile device 302 in FIGS. 3A-3C) in various embodiments using an App-to-App arrangement. At state 502, the originating device is idle, awaiting the initiation of a call at 503 that would dial a terminating mobile device using a mobile directory number "B" that would further request permission for voice paging. Upon initiation of the call at 503, the originating device enters into a conversation state 504. If the call is disconnected at 505 during the conversation state 504, then the device returns to the idle state 502. If during the conversation state 504, the device is granted permission for voice paging at 507, the device prompts the user or the originating device to transmits a voice page over an IP network and enter a voice paging state 506. During the voice paging state 506, if at 508 a time out is reached or a signal is received from the terminating device to wait for regular call processing, then the originating device stops transmitting (or receiving) voice paging packets and enters into the regular conversation mode or state 504. While in the voice paging state 506, if the originating device receives at 509 a disconnect signal, then the call is disconnected and the originating mobile device returns to an idle state at 502.

Figure 6:
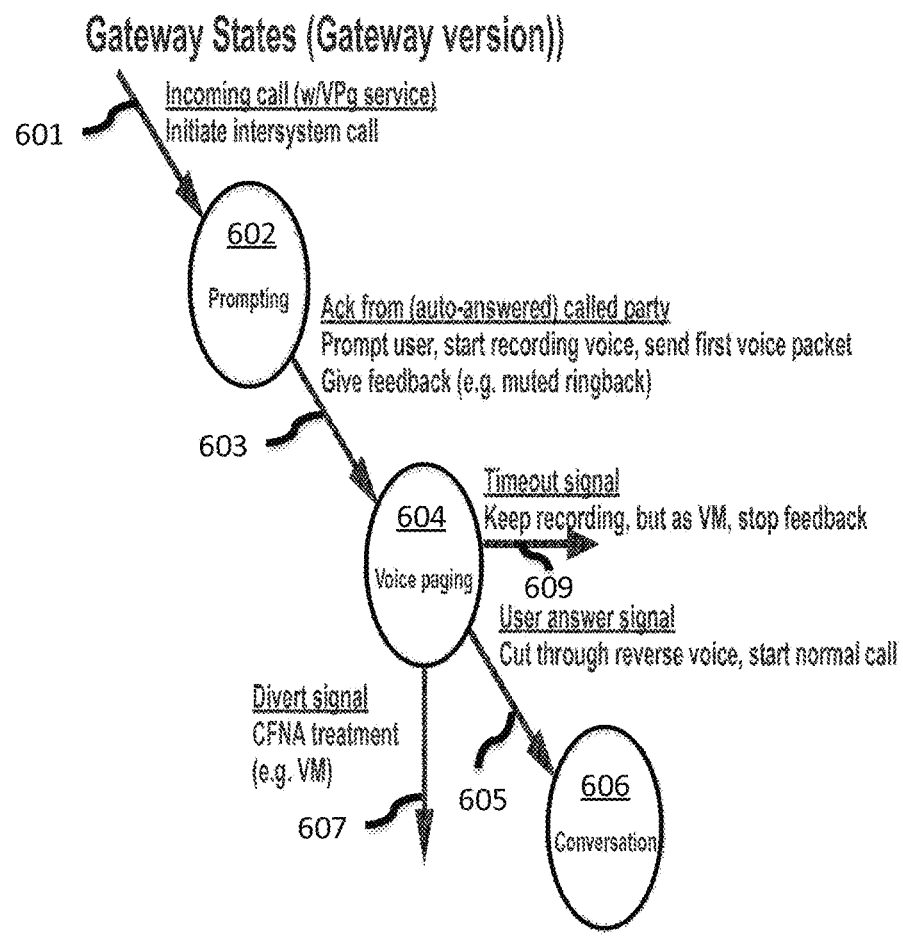
FIG. 6 illustrates a state chart for a gateway in accordance with an embodiment.

FIG. 6 illustrates the state diagram 600 of a gateway device (such as gateway device 306 in FIGS. 3A and 3B) in various embodiments. The gateway device enters a prompting state 602 when receiving an incoming call from a calling (or originating) party with a voice paging service request at 601 that initiates an intersystem call. If an appropriate acknowledgement is automatically received from the called (or terminating) party, the calling party is prompted to start a voice paging message 603 and recording of voice and transmission of voice paging packets are sent and feedback can be given back to the calling party (in the form of a muted ringback for example) as the gateway enters a voice paging state 604. In the voice paging state 604, if the "answer" button is pressed at 605, the radio access network (RAN) will be informed that the call is answered (if not already done) and a special signal will be sent to the Gateway. This will stop recording of the voice page as the call is now connected normally in the conversation state 606. The voice page would normally be discarded at this point (as the terminating party has the opportunity to get the caller to repeat anything they missed), although an option could be provided to retain the recording. In the voice paging state 604, if a timeout signal is received at 609 where the terminating party does nothing, the forwarding of voice packets will cease after a timeout, along with the provision of muted ringback to the caller. The caller may be routed to voice mail immediately or, in the App-to-App case, after an independent call-forward-no-answer timer expires. The terminating party's mobile can store the voice page in a list, similar to the storage of incoming text messages, where they can be later played back. Each voice page will be annotated with available information on the calling party, time and duration. In the voice paging state 604, if the gateway receives a divert signal at 607, the network and gateway can invoke a Call-Forward-No-Answer or diversion to Voice Mail in response to the divert signal. If the terminating party's operator is providing the service, coordination with voice mail can be smoother.

Figure 7:
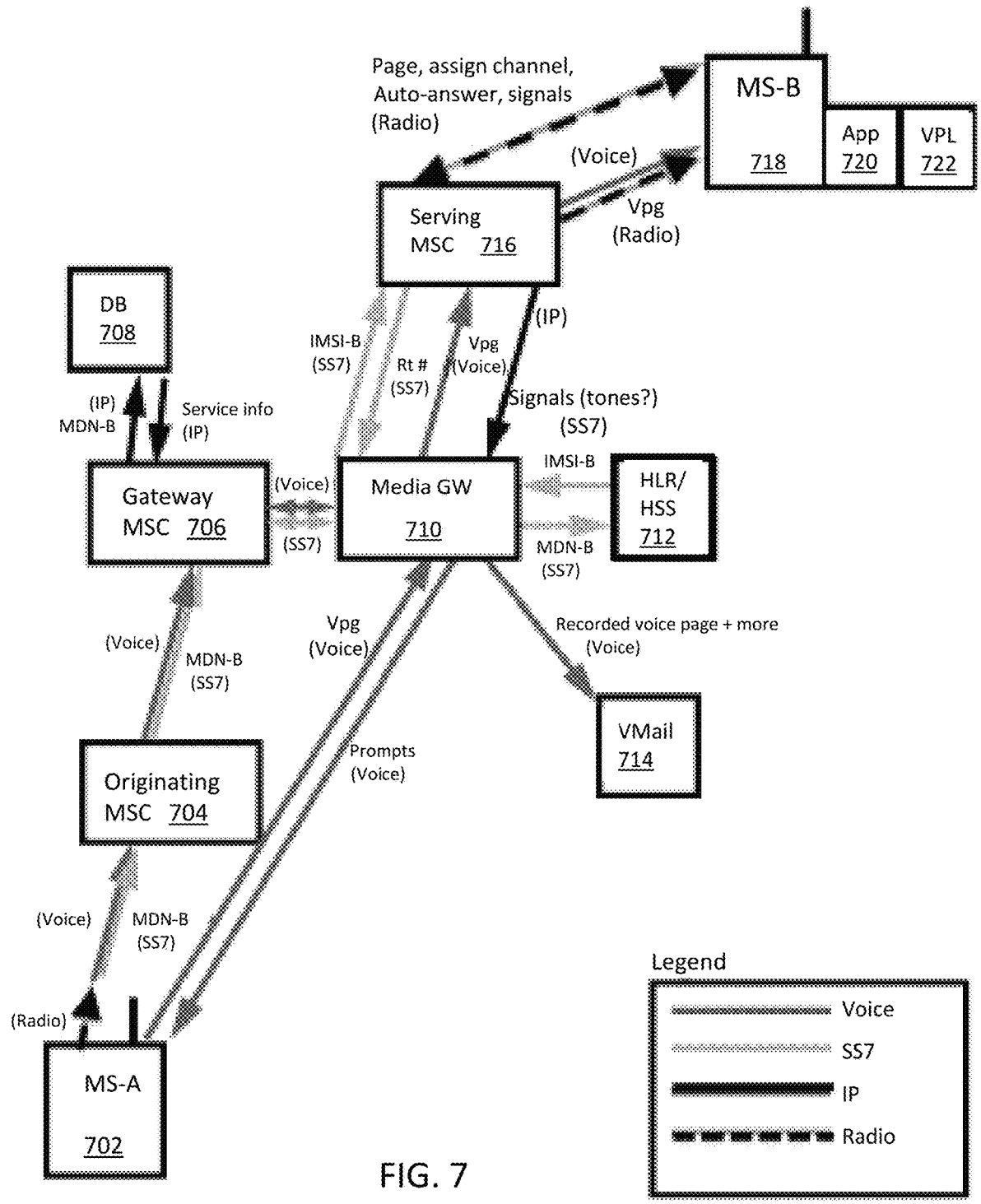
FIG. 7 depicts a flow chart of delivery of information in a scenario with real-time voice paging voice augmented caller ID using a gateway with circuit delivery in accordance with an embodiment.

FIG. 7 illustrates a signaling flow chart in a communication system 700 that includes real-time voice paging voice augmented caller id or a ring tone alias using a gateway mobile switching center 706 and a media gateway 710. Such a system includes a number of components communicating over various links over various communication protocols. System 700 can include an originating or calling party mobile subscriber unit 702 (MS-A) communicating with a called or terminating party mobile subscriber unit 718 (MS-B) via several gateway devices (706 or 710) depending on the type of communication being sent or received. Note that the various communication protocols being used in this embodiment include voice paging, SS7, IP, and radio communication protocols. The calling party unit 702 can initiate a call to the called party unit 718 using both voice and SS7 signaling to the gateway MSC 706 via an originating MSC 704. The Gateway MSC 706 accesses a database 708 using the IP protocol to retrieve service information for the called party unit 718. The gateway MSC 706 communicates (using voice and SS7 signaling) with the media gateway 710 and informs the media gateway 710 that a voice paging type of call needs to be processed and the media gateway 710 proceeds to prompt the calling party unit 702 to provide a voice page. The Gateway MSC 706 also queries a HLR/HSS 712 via the media gateway 710 as necessary using SS7 signaling. The Media gateway 710 communicates with the called party unit 718 via a servicing MSC 716 using a number of protocols as shown including SS7 signaling (to and from the media gateway 710 and Serving MSC 716), voice paging signaling (from media gateway 710 to serving MSC 716 and from serving MSC 716 to the called party unit 718), IP protocol signaling (from serving MSC 716 to media gateway 710), and over the air radio protocols between the serving MSC 716 and the called party unit 718. The called party unit 718 can include one or more applications 720 and a voice paging list 722. The media gateway also communicates with a voice mail server 714 to record and store voice page messages and other meta-data.

Figure 8:
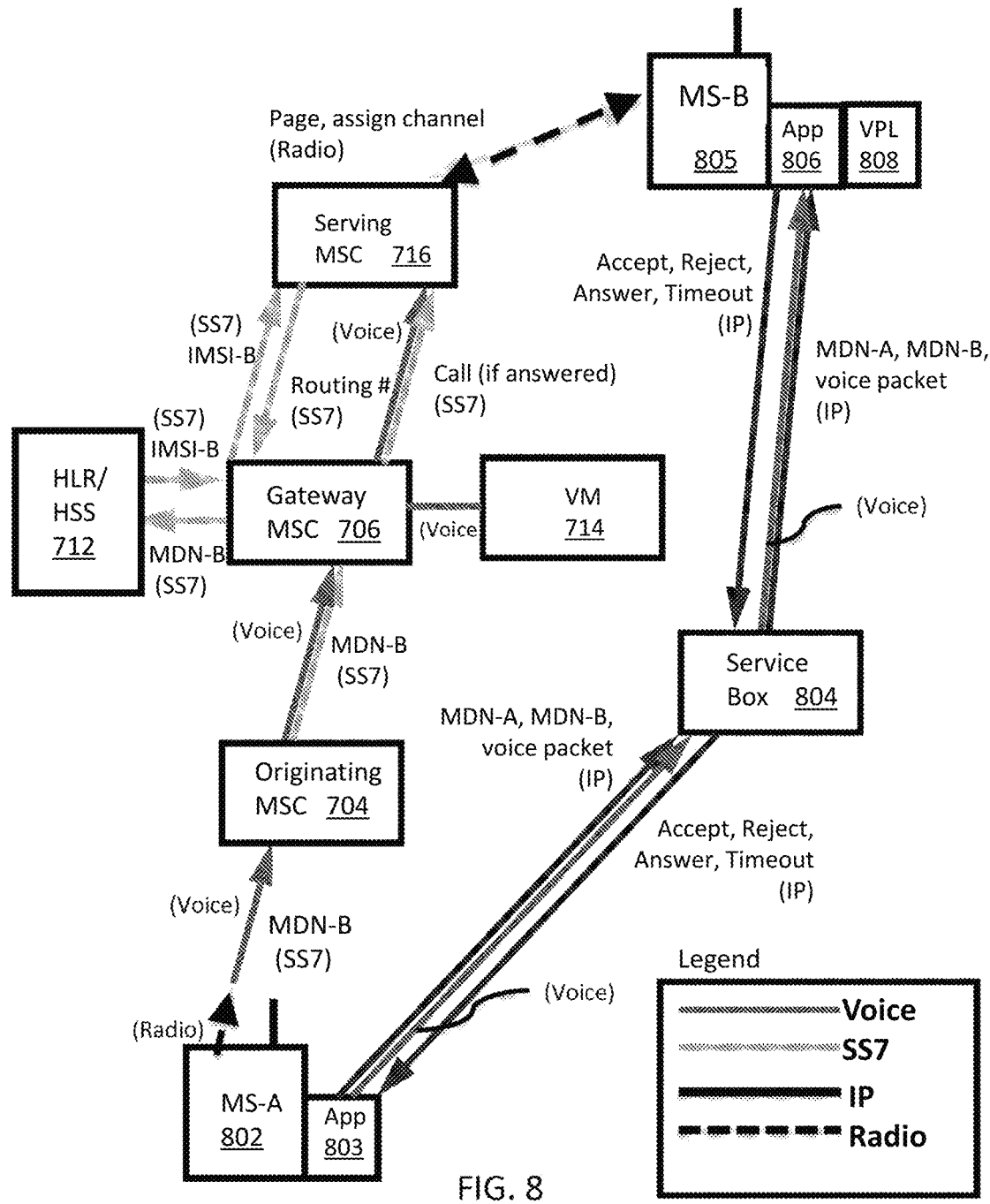
FIG. 8 depicts a flow chart of delivery of information in a scenario with real-time voice paging voice augmented caller ID using an App-to-App feature in accordance with an embodiment.

FIG. 8 illustrates a signaling flow chart in a communication system 800 that includes real-time voice paging voice augmented caller id or a ring tone alias using a App-to-App communication process for transmitting and receiving voice paging information between a calling (or originating) party unit 802 having a paging app 803 and called (or terminating) party unit 805 having a similar paging app 806. The called party unit can also include a voice paging list 808. Although the system 800 uses a gateway MSC 706 that likely belongs to a carrier, the system 800 does not generally use the carrier's infrastructure to send and receive voice paging information between the calling party unit 802 and the called party unit 805. Instead, voice paging packets using voice and other data using IP protocol are sent to from the app 803 of the calling party unit 802 to the app 806 of the called party unit 805 via a service box 804 as shown. The signaling using the IP protocol between the app 803, service box 804, and app 806 can include information for accepting a prompt for a voice page, rejecting a call, answering the call or for processing a timing out of the paging process.

System 800 can include some of the same infrastructure components found in system 700 of FIG. 7 to process calls between wireless units and forward to voice mail. For example, system 800 can include the originating or calling party mobile subscriber unit 802 (MS-A) communicating with the called or terminating party mobile subscriber unit 805 (MS-B) via the gateway MSC 706 as well as via the originating MSC 704 and the serving MSC 716. Note again that various communication protocols are used in this embodiment including voice paging, SS7, IP, and radio communication protocols. The Gateway MSC 706 queries the HLR/HSS 712 as necessary using SS7 signaling. If calls are rejected or diverted to voice mail, then the gateway MSC 706 can communicate voice messages to the voice mail server 714.

In the App-to-App version diversion to voice mail occurs independently of the App 803 (and 806). Therefore, if the voice paging timer is set too long, diversion to voice mail could occur before the voice paging is completed, which would be confusing and annoying. As noted above, the App-to-App version can also use a method to convert from a phone number (MDN) to an IP address. The easiest way is to use the "Service Box" 804 with a known domain name/IP address in the network where all downloaded Apps can register their associated MDN (external phone number) and IMSI (wireless network identifier). This introduces security issues (e.g. spam to people with known MDN), but security measures can be taken to overcome such issues. Also note that in some embodiments the voice call (unanswered at the time of voice paging) and the voice paging should be synchronized. A positive signal from the terminating app 806 must be received before voice pages are transmitted. The Terminating Mobile 805 should verify that the incoming call matches (e.g. via calling number ID) the voice paging information. This may require calling number id.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present invention.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

I claim:

1. A method, comprising:
   receiving a contact number selected by a user using the user interface;
   receiving an indication to record an audio clip from the user to send with a call;
   recording the audio clip;
   generating a time duration associated with the recording of the audio;
   generating a call signal to send to a called device, wherein the call signal includes the audio clip and the time duration;
   sending a signal to the called device associated with the contact number to initiate the call;
   receiving a confirmation from the called device that it is ready to receive the call signal verification of connection with the called device; and
   sending the call signal to the called device when the verification is received.

2. The method according to claim 1, wherein the operation of sending the call signal does not occur after receiving verification but instead occurs after receiving a request from the called device which occurs after the verification.

3. The method according to claim 1, wherein the operation of recording the audio clip occurs after receiving the verification and before the call signal is sent.

4. The method according to claim 1, wherein the call signal includes a local register.

5. The method according to claim 1, wherein the call signal includes a video clip.

6. The method according to claim 1, wherein the call signal includes a text signal.

7. The method according to claim 1, wherein the audio clip includes the user's voice.

8. The method according to claim 1, wherein the audio clip includes a recording of the environment about the user.

9. The method according to claim 7, wherein the audio clip includes at least one word cue, wherein the word cue is at least one of the phrases "emergency", or "help", or "fire", or "accident", or "attacked" or a combination thereof.

* * * * *